(12) United States Patent
Kliment et al.

(10) Patent No.: US 12,478,661 B2
(45) Date of Patent: Nov. 25, 2025

(54) LUNG CELL TREATMENTS TO PREVENT OR TREAT DISEASE

(71) Applicant: THE JOHNS HOPKINS UNIVERSITY, Baltimore, MD (US)

(72) Inventors: Corrine Kliment, Baltimore, MD (US); Douglas Robinson, Lutherville, MD (US); Ramana Sidhaye, Clarksville, MD (US); Jennifer Nguyen, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 493 days.

(21) Appl. No.: 16/652,501

(22) PCT Filed: Oct. 1, 2018

(86) PCT No.: PCT/US2018/053676
§ 371 (c)(1),
(2) Date: Mar. 31, 2020

(87) PCT Pub. No.: WO2019/070546
PCT Pub. Date: Apr. 11, 2019

(65) Prior Publication Data
US 2020/0230213 A1 Jul. 23, 2020

Related U.S. Application Data

(60) Provisional application No. 62/567,443, filed on Oct. 3, 2017.

(51) Int. Cl.
*A61K 38/45* (2006.01)
*C12N 9/12* (2006.01)
*C12N 15/86* (2006.01)
*G01N 33/50* (2006.01)

(52) U.S. Cl.
CPC ............ *A61K 38/45* (2013.01); *C12N 9/1288* (2013.01); *C12N 15/86* (2013.01); *G01N 33/502* (2013.01)

(58) Field of Classification Search
CPC ......... C12N 15/86; A61K 38/45; A61K 38/43
See application file for complete search history.

(56) References Cited

U.S. PATENT DOCUMENTS 6,299,858 B1   10/2001   Serbedzija et al.
7,105,494 B1    9/2006   Baltzer et al.

FOREIGN PATENT DOCUMENTS

| WO | 1998/19714 A1 | 5/1998 |
| WO | 2006/005195 A1 | 1/2006 |
| WO | 2009/013555 A1 | 1/2009 |
| WO | 2014/096437 A1 | 6/2014 |
| WO | 2016/040899 A1 | 3/2016 |

*Primary Examiner* — Tekchand Saidha
(74) *Attorney, Agent, or Firm* — Fox Rothschild LLP

(57) ABSTRACT

Described are method of treating or preventing lung disease in a subject comprising the steps of: administering to a subject an agent that modulates the expression, the amount, or activity, of adenine nucleotide translocase (ANT) in the lungs of a subject. The treatment enhances airway surface (ASL) thickness in the lung of a subject compared to a lung of a reference subject that has not been given the agent.

11 Claims, 41 Drawing Sheets
Specification includes a Sequence Listing.

PERCENT IDENTITY OF ANT

| SPECIES | | | | |
|---|---|---|---|---|
| DICTYOSELIUM ancA | 100 | | | |
| HUMAN ant1 | 68 | 100 | | |
| HUMAN ant2 | 68 | 89 | 100 | |
| HUMAN ant3 | 68 | 88 | 92 | 100 |
| HUMAN ant4 | 62 | 73 | 70 | 71 |

FIG. 6C

LUNG CELL TREATMENTS TO PREVENT OR TREAT DISEASE

REFERENCE TO RELATED APPLICATIONS

This application claims the benefit of U.S. Provisional Patent application 62/567,443, filed Oct. 3, 2017, that is hereby incorporated by reference for all purposes as if fully set forth herein.

STATEMENT OF GOVERNMENTAL INTEREST

This invention was made with government support under grant no. R01GM066817, F32HL129660, T32HL007534-33, and RO1HL123499 awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Sep. 24, 2018, is named P14715-02_SL.txt and is 2,338 bytes in size.

BACKGROUND OF THE INVENTION

Central to the function of human airway is the ability to maintain a surface hydration layer that allows the cilia to beat rhythmically to clear mucus, particulates and infectious organisms from the airway passages. When homeostasis of airway hydration and ciliary function are lost, lung diseases such as cystic fibrosis and chronic obstructive pulmonary disease (COPD) develop. In fact, COPD morbidity and mortality are rising and are slated to become the $3^{rd}$ leading cause of death globally by the year 2030, with cigarette smoke being a major inciting factor. However, despite the prevalence of COPD (comprised of chronic bronchitis and emphysema phenotypes) and the impact of airway dysfunction and lung diseases more generally, little to no real advances in therapeutic strategies have developed over the past 20 years. One reason is that mechanistic studies in search of unrealized, essential biology are difficult to conduct in the complex tissue of the human lung.

SUMMARY OF THE INVENTION

The inventors have short-circuited this problem by developing a comparative discovery tool leveraging the social amoeba *Diciyostelium discoideum* to identify new pathways in lung biology (FIG. 1a), and then applied this information to the mammalian system including primary human airway epithelial cells. Using the discovery tools of the present invention, the inventors discovered the canonical inner mitochondrial protein adenine nucleotide translocase (ANT; paralogs ANT1-4 in humans, with ANT1 and ANT2 present in the lung) not only regulates cellular metabolism but plays a central function in airway epithelial biology, notably airway hydration and ciliary function. Most significantly, the inventors' results show that in a role separate from mitochondria, ANT resides at the cilia in airway epithelial cells and interacts with the chemiosmotic circuit that controls airway hydration and ciliary beat frequency.

One embodiment of the present invention is a method of treating or preventing lung disease in a subject comprising the steps of: administering to a subject an agent that modulates the expression, the amount, or activity, of adenine nucleotide translocase (ANT) in the lungs of a subject; and enhancing the airway surface (ASL) thickness in the lung of a subject compared to the lungs of a reference subject who has not been given the agent. Suitable adenine nucleotide translocase (ANT) used in the present invention include adenine nucleotide translocase (ANT) 1, adenine nucleotide translocase (ANT) 2, or a combination thereof, as an example. Suitable agents of the present invention may be a chemical, a peptide, an antibody, a nucleic acid, or a combination thereof. For example, ANT 1 or ANT 2 proteins, functional parts thereof, or combinations thereof are suitable agents of the present invention. In addition, an agent of the present invention may include a vector comprising a adenine nucleotide translocase (ANT) nucleic acid sequence capable of expressing and adenine nucleotide translocase (ANT) protein or functional part thereof. Suitable vectors used in the present invention include viral vectors and/or nonviral vectors. Suitable viral vectors may be selected from the group comprising retroviral, adenoviral, adeno-association vectors (AAV), herpes simplex, pox virus, hybrid adenovirus vector, Ebstein-Bar virus (EBV), lentivirus, herpes simplex virous (HSV), or a combination thereof. Suitable nonviral vectors are selected from the group comprising catonic lipids, cationic polymers, lipid-polymers, naked DNA, DNA Bombardant, electroporation, hydrodynamic, ultrasound, cationic lipids, cationic, polymers, lipid-polymer, or a combination thereof.

The methods of the present invention are able to prevent or treat lung disease including cystic fibrosis and chronic obstructive pulmonary disease (COPD), as examples. Not to be held to a particular theory, the inventors believe the present invention prevents or treats lung disease by enhancing the airway surface liquid (ASL) thickness of the lung of a subject given an agent of the present invention compared to a lung of a reference subject not given an agent of the present invention. The ASL of a lung of a subject given an agent of the present invention is in the range of 1.2 to 5.0 greater, or 1.5 to 3.5 greater, or 2.0 to 3.0 greater, than the ASL of a lung of a reference subject. In addition, it is believed that subjects administered one or more agent(s) of the present invention may have a higher lung metabolic or respiratory capacity and/or ciliary beat frequency than the lung of a reference subject not provided an agent of the present invention.

Another embodiment of the present invention is a method of drug screening for compounds that modulate adenine nucleotide translocase (ANT), such as ANT 1 and/or ANT 2, comprising the steps of: providing cells expressing adenine nucleotide translocase (ANT); applying an agent to the cells; quantifying the expression of ANT; comparing the expression of ANT of the cells to the expression of ANT of reference cells that have not been treated with an agent; identifying modulators of adenine nucleotide translocase (ANT). Another approach includes identifying agents that when applied to airway epithelial cells phenocopy cells with upregulated ANT expression (namely compounds that meet each of the following: protect cell growth and viability from insults such as cigarette smoke, increase ATP production, promote airway surface hydration, and protect ciliary beat function when challenged with cigarette smoke in a manner dependent upon ANT translocase activity). The methods of the present invention typically identify modulators of adenine nucleotide translocase that enhance the expression of ANT, such as ANT 1 and/or ANT 2, as examples.

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

The term "activity" refers to the ability of a gene to perform its function such as Adenine Nucleotide Translocase (ANT) exporting ATP from the mitochondria matrix and importing ADP into the matrix, for example.

The term "antibody," as used in this disclosure, refers to an immunoglobulin or a fragment or a derivative thereof, and encompasses any polypeptide comprising an antigen-binding site, regardless of whether it is produced in vitro or in vivo. The term includes, but is not limited to, polyclonal, monoclonal, monospecific, polyspecific, non-specific, humanized, single-chain, chimeric, synthetic, recombinant, hybrid, mutated, and grafted antibodies. Unless otherwise modified by the term "intact," as in "intact antibodies," for the purposes of this disclosure, the term "antibody" also includes antibody fragments such as Fab, F(ab')$_2$, Fv, scFv, Fd, dAb, and other antibody fragments that retain antigen-binding function, i.e., the ability to bind, for example, PD-L1, specifically. Typically, such fragments would comprise an antigen-binding domain.

The terms "antigen-binding domain," "antigen-binding fragment," and "binding fragment" refer to a part of an antibody molecule that comprises amino acids responsible for the specific binding between the antibody and the antigen. In instances, where an antigen is large, the antigen-binding domain may only bind to a part of the antigen. A portion of the antigen molecule that is responsible for specific interactions with the antigen-binding domain is referred to as "epitope" or "antigenic determinant." An antigen-binding domain typically comprises an antibody light chain variable region ($V_L$) and an antibody heavy chain variable region ($V_H$), however, it does not necessarily have to comprise both. For example, a so-called Fd antibody fragment consists only of a $V_H$ domain, but still retains some antigen-binding function of the intact antibody.

Binding fragments of an antibody are produced by recombinant DNA techniques, or by enzymatic or chemical cleavage of intact antibodies. Binding fragments include Fab, Fab', F(ab')2, Fv, and single-chain antibodies. An antibody other than a "bispecific" or "bifunctional" antibody is understood to have each of its binding sites identical. Digestion of antibodies with the enzyme, papain, results in two identical antigen-binding fragments, known also as "Fab" fragments, and a "Fc" fragment, having no antigen-binding activity but having the ability to crystallize. Digestion of antibodies with the enzyme, pepsin, results in a F (ab') 2 fragment in which the two arms of the antibody molecule remain linked and comprise two-antigen binding sites. The F(ab')2 fragment has the ability to crosslink antigen. "Fv" when used herein refers to the minimum fragment of an antibody that retains both antigen-recognition and antigen-binding sites. "Fab" when used herein refers to a fragment of an antibody that comprises the constant domain of the light chain and the CHI domain of the heavy chain.

By "agent" is meant any small molecule chemical compound, antibody, nucleic acid molecule, or polypeptide, or fragments thereof.

By "ameliorate" is meant decrease, suppress, attenuate, diminish, arrest, or stabilize the development or progression of a disease.

By "alteration" is meant a change (increase or decrease) in the expression levels or activity of a gene or polypeptide as detected by standard art known methods such as those described herein. As used herein, an alteration includes a 10% change in expression levels, preferably a 25% change, more preferably a 40% change, and most preferably a 50% or greater change in expression levels."

By "analog" is meant a molecule that is not identical, but has analogous functional or structural features. For example, a polypeptide analog retains the biological activity of a corresponding naturally-occurring polypeptide, while having certain biochemical modifications that enhance the analog's function relative to a naturally occurring polypeptide. Such biochemical modifications could increase the analog's protease resistance, membrane permeability, or half-life, without altering, for example, ligand binding. An analog may include an unnatural amino acid.

By "ANT" is meant to adenine nucleotide translocator protein or gene.

By "anti-ANT antibody" is meant an antibody that selectively binds an adenine nucleotide translocase.

By "disease" is meant any condition or disorder that damages or interferes with the normal function of a cell, tissue, or organ. Examples of diseases include cancer.

By "effective amount" is meant the amount of a required to ameliorate the symptoms of a disease relative to an untreated patient. The effective amount of active compound(s) used to practice the present invention for therapeutic treatment of a disease varies depending upon the manner of administration, the age, body weight, and general health of the subject. Ultimately, the attending physician or veterinarian will decide the appropriate amount and dosage regimen. Such amount is referred to as an "effective" amount.

The term "express" refers to the ability of a gene to express the gene product including for example its corresponding mRNA or protein sequence (s).

By "fragment" is meant a portion of a polypeptide or nucleic acid molecule. This portion contains, preferably, at least 10%, 20%, 30%, 40%, 50%, 60%, 70%, 80%, or 90% of the entire length of the reference nucleic acid molecule or polypeptide. A fragment may contain 10, 20, 30, 40, 50, 60, 70, 80, 90, or 100, 200, 300, 400, 500, 600, 700, 800, 900, or 1000 nucleotides or amino acids.

"Hybridization" means hydrogen bonding, which may be Watson-Crick, Hoogsteen or reversed Hoogsteen hydrogen bonding, between complementary nucleobases. For example, adenine and thymine are complementary nucleobases that pair through the formation of hydrogen bonds.

"Immunoassay" is an assay that uses an antibody to specifically bind an antigen (e.g., a marker). The immunoassay is characterized by the use of specific binding properties of a particular antibody to isolate, target, and/or quantify the antigen.

The term, "obtaining" as in "obtaining an agent" includes synthesizing, purchasing, or otherwise acquiring the agent.

The term "mAb" refers to monoclonal antibody. Antibodies of the invention comprise without limitation whole native antibodies, bispecific antibodies; chimeric antibodies; Fab, Fab', single chain V region fragments (scFv), fusion polypeptides, and unconventional antibodies.

The terms "polypeptide," "peptide" and "protein" are used interchangeably herein to refer to a polymer of amino acid residues. The terms apply to amino acid polymers in which one or more amino acid residue is an analog or mimetic of a corresponding naturally occurring amino acid, as well as to naturally occurring amino acid polymers. Polypeptides can be modified, e.g., by the addition of carbohydrate residues to form glycoproteins. The terms "polypeptide," "peptide" and "protein" include glycoproteins, as well as non-glycoproteins.

By "reduces" is meant a negative alteration of at least 10%, 25%, 50%, 75%, or 100%.

A "reference" refers to a standard or control conditions such as a sample (human cells) or a subject that is a free, or substantially free, of an agent such as one or more modulators of ANT.

A "reference sequence" is a defined sequence used as a basis for sequence comparison. A reference sequence may be a subset of or the entirety of a specified sequence; for example, a segment of a full-length cDNA or gene sequence, or the complete cDNA or gene sequence. For polypeptides, the length of the reference polypeptide sequence will generally be at least about 16 amino acids, preferably at least about 20 amino acids, more preferably at least about 25 amino acids, and even more preferably about 35 amino acids, about 50 amino acids, or about 100 amino acids. For nucleic acids, the length of the reference nucleic acid sequence will generally be at least about 50 nucleotides, preferably at least about 60 nucleotides, more preferably at least about 75 nucleotides, and even more preferably about 100 nucleotides or about 300 nucleotides or any integer thereabout or there between.

As used herein, the term "sensitivity" is the percentage of subjects with a particular disease.

As used herein, the term "specificity" is the percentage of subjects correctly identified as having a particular disease i.e., normal or healthy subjects. For example, the specificity is calculated as the number of subjects with a particular disease as compared to non-cancer subjects (e.g., normal healthy subjects).

By "specifically binds" is meant a compound or antibody that recognizes and binds a polypeptide of the invention, but which does not substantially recognize and bind other molecules in a sample, for example, a biological sample, which naturally includes a polypeptide of the invention.

As used herein, the term "subject" is intended to refer to any individual or patient to which the method described herein is performed. Generally the subject is human, although as will be appreciated by those in the art, the subject may be an animal. Thus other animals, including mammals such as rodents (including mice, rats, hamsters and guinea pigs), cats, dogs, rabbits, farm animals including cows, horses, goats, sheep, pigs, etc., and primates (including monkeys, chimpanzees, orangutans and gorillas) are included within the definition of subject.

Nucleic acid molecules useful in the methods of the invention include any nucleic acid molecule that encodes a polypeptide of the invention or a fragment thereof. Such nucleic acid molecules need not be 100% identical with an endogenous nucleic acid sequence, but will typically exhibit substantial identity. Polynucleotides having "substantial identity" to an endogenous sequence are typically capable of hybridizing with at least one strand of a double-stranded nucleic acid molecule. Nucleic acid molecules useful in the methods of the invention include any nucleic acid molecule that encodes a polypeptide of the invention or a fragment thereof. Such nucleic acid molecules need not be 100% identical with an endogenous nucleic acid sequence, but will typically exhibit substantial identity. Polynucleotides having "substantial identity" to an endogenous sequence are typically capable of hybridizing with at least one strand of a double-stranded nucleic acid molecule. By "hybridize" is meant pair to form a double-stranded molecule between complementary polynucleotide sequences (e.g., a gene described herein), or portions thereof, under various conditions of stringency. (See, e.g., Wahl, G. M. and S. L. Berger (1987) Methods Enzymol. 152:399; Kimmel, A. R. (1987) Methods Enzymol. 152:507).

By "substantially identical" is meant a polypeptide or nucleic acid molecule exhibiting at least 50% identity to a reference amino acid sequence (for example, any one of the amino acid sequences described herein) or nucleic acid sequence (for example, any one of the nucleic acid sequences described herein). Preferably, such a sequence is at least 60%, more preferably 80% or 85%, and more preferably 90%, 95% or even 99% identical at the amino acid level or nucleic acid to the sequence used for comparison.

Sequence identity is typically measured using sequence analysis software (for example, Sequence Analysis Software Package of the Genetics Computer Group, University of Wisconsin Biotechnology Center, 1710 University Avenue, Madison, Wis. 53705, BLAST, BESTFIT, GAP, or PILEUP/PRETTYBOX programs). Such software matches identical or similar sequences by assigning degrees of homology to various substitutions, deletions, and/or other modifications. Conservative substitutions typically include substitutions within the following groups: glycine, alanine; valine, isoleucine, leucine; aspartic acid, glutamic acid, asparagine, glutamine; serine, threonine; lysine, arginine; and phenylalanine, tyrosine. In an exemplary approach to determining the degree of identity, a BLAST program may be used, with a probability score between $e^{-3}$ and $e^{-100}$ indicating a closely related sequence.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein, the terms "treat," "treating," "treatment," and the like refer to reducing or ameliorating a disorder and/or symptoms associated therewith. It will be appreciated that, although not precluded, treating a disorder or condition does not require that the disorder, condition or symptoms associated therewith be completely eliminated.

Unless specifically stated or obvious from context, as used herein, the term "or" is understood to be inclusive. Unless specifically stated or obvious from context, as used herein, the terms "a", "an", and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

As used herein, the terms "prevent," "preventing," "prevention," "prophylactic treatment" and the like refer to reducing the probability of developing a disorder or condition in a subject, who does not have, but is at risk of or susceptible to developing a disorder or condition.

BRIEF DESCRIPTION OF THE DRAWINGS

FIG. 6A-6G: a) *Dictyostelium* growth curves with 10-80% CSE. b) *Dictyostelium* growth curve to identify EC30 for 10-80% CSE. c) Percent identity for human ANT and *Dictyostelium* AncA, generated by Clustal2.1. d) Molecular phylogenetic tree analysis of adenine nucleotide translocase (AncA in *Dictyostelium* and ANT in humans) with bootstrap values. e) Western analysis of adenoviral overexpression (control GFP, ANT1-GFP and ANT2-GFP) in HBEKTs evaluating for GFP, mitochondrial TOM20, VDAC, COX4 and GAPDH. f) ANT1 western analysis for ANT1 overexpression. g) Representative images of HBEKTs depicting total nuclei (Drags), apoptosis (Annexin V), necrosis (ethidium homodimer) and GFP (adenovirus infection).

FIG. 7A-7K: a) Boxplot showing mitochondrial superoxide production (MitoSox) in HBEKTs after CSE with ANT overexpression. Horizontal dotted line represents the median for the 1-hr control group. Statistics performed by Kruskal-Wallis and two-tailed Mann-Whitney U tests. P-values represent differences from Control at each respective time point. n=2800-4500 cells per group. b) Measurements of total intracellular ATP in HBEKTs with ANT1 or ANT2 overexpression ±20% CSE, yielding a total intracellular [ATP] of 8 mM for HBEKT cells. Median shown, n=10 wells per group from 5 separate experiments. c-h) Cellular metabolism by the Seahorse Mitostress assay in HBEKT cells, with ANT1 or ANT2 adenoviral overexpression (c, d, e) or siRNA suppression (f, g, h). c) Basal OCR with ANT overexpression, d) Maximal OCR with ANT overexpression, e) Proton leak with ANT overexpression, f) Basal OCR ANT suppression, g) Maximal OCR with ANT suppression, h) Proton leak with ANT suppression, Data show median±SEM, n=15-26 wells from 3 separate experiments. i) Western analysis of ANT siRNA suppression probed for ANT1 (antibody 1F3H11), ANT2 (antibody 5H7), GAPDH and TOM20. j) Western analysis of ANT siRNA suppression probed for mitochondrial proteins VDAC and COX4. k) Bar graph summarizes the relative amounts of each protein across samples. Values are for n=3 per group with band intensity quantification normalized to GAPDH. Statistical analysis by ANOVA; *p<0.05.

a) Data from two different pixels from a video was normalized so that it ranged from 0 to 1 and then the readjusted to have zero mean. b) These time courses were used to compute the single-sided spectrum for each pixels, shown for the two pixels in panel a. To consider only pixels with considerable oscillatory behavior (e.g. top pixel in panel a, but not bottom), a threshold of 0.125 A.U. was set for the maximum power, shown by the dotted lines. c) The frequency was the maximal power was observed for each of the pixels was computed, and this plotted as a histogram. Shown are the histograms for all pixels, and only for those with maximum pixel intensity above the threshold. The latter was fit to a single Gaussian, shown by the dotted line. This was used to determine the average beating frequency for the sample. d) As an alternative check, the power spectrum over all pixels was computed, and fit by a Gaussian mixture model (red dotted line).

DETAILED DESCRIPTION OF THE INVENTION

Figure 1:
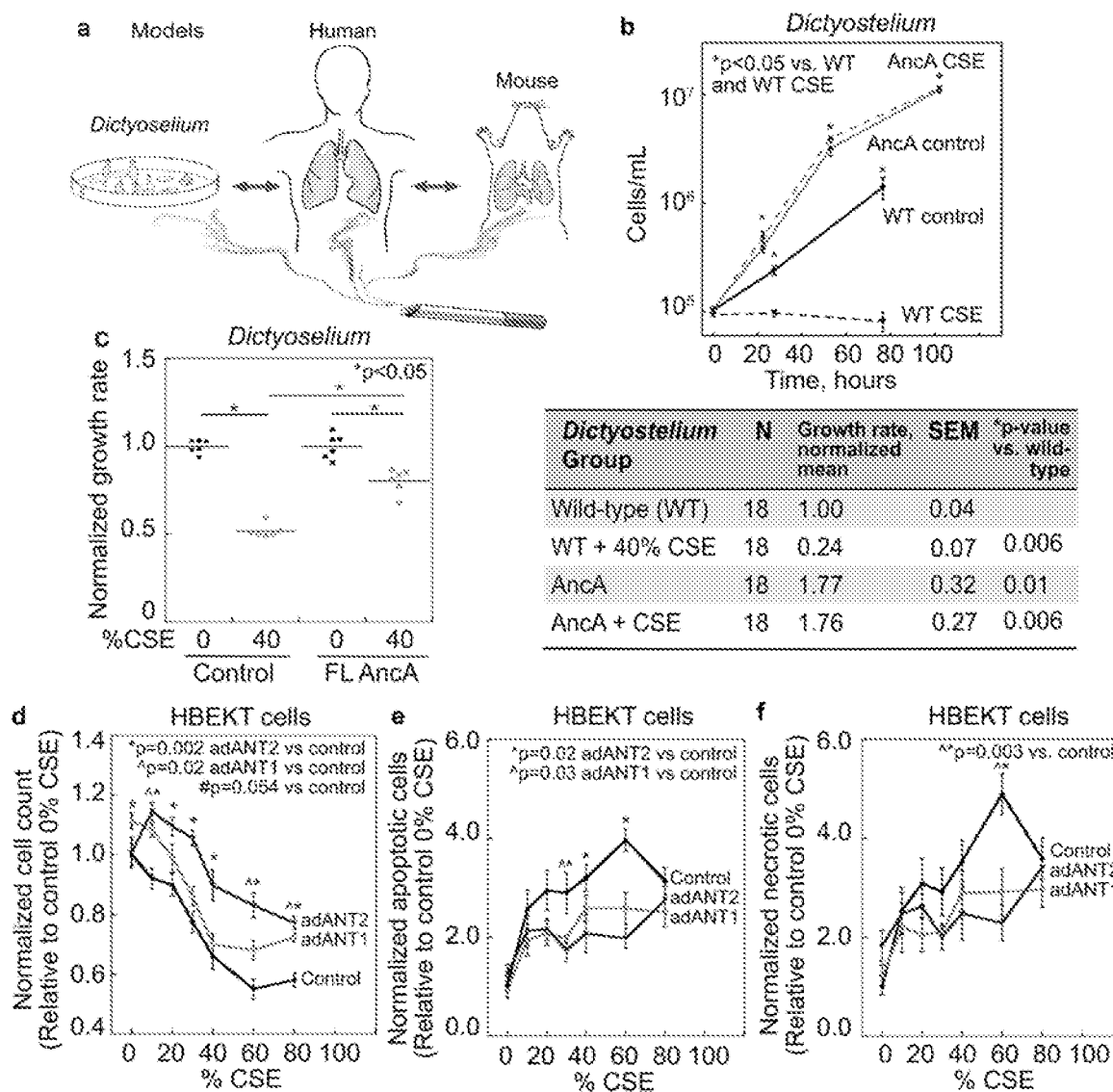
FIG. 1A-1F: ANT protects against cigarette smoke-induced cell death. a) Models leveraging *Dictyostelium* to identify relevant pathways for lung disease. b) *Dictyostelium* cDNA selection growth curve, n=12-18 per group, 6 growth courses. Representative western of ancA overexpression from cDNA clones shown below. c) Summative *Dictyostelium* growth rates. Cell viability, apoptosis and necrosis in human bronchial epithelial cells (HBEKTs) after 24 hours of CSE. d) Nuclei quantification, e) Apoptosis, annexin-V. f) Necrosis, ethidium. Data show mean±SEM, n=16 from 2-3 experiments. Representative images in Extended Data FIG. 1. Statistics by ANOVA, *p<0.05.
Figure 6A:
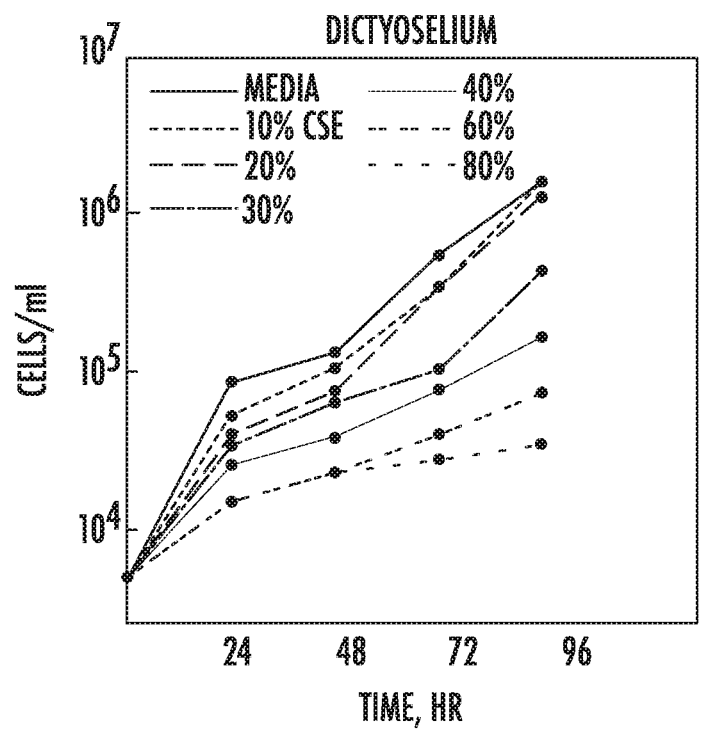

Adenine Nucleotide Translocase Identified as a Genetic Protector of Cigarette Smoke The inventors' developed the present invention by recognizing that cigarette smoke is a primary insult that leads to lung disease, specifically COPD. To identify potential genetic protectors against cigarette smoke, the inventors challenged cDNA library-transformed *Dictyostelium* cells (cells are transformed with an expression cDNA library built from vegetative (growth phase) *Dictyostelium* cells [1,2] with a cigarette smoke extract (CSE; prepared by bubbling cigarette smoke through *Dictyostelium* growth media; at the EC30 concentration (FIG. 6a, b). Over ~3 weeks, the inventors selected for 'winners' that could grow in the presence of CSE demonstrating growth like or exceeding that of untreated wild type cells. The inventors then isolated the plasmids and reintroduced them into fresh *Dictyostelium* cells to confirm the suppression effects. In the initial selection, the inventors identified that adenine nucleotide translocase (ANT, encoded by the ancA gene in *Dictyostelium*) offered complete protection from cigarette smoke extract (FIG. 1b) and was therefore the focus of our further studies. The recovered cDNA lacked the initial 46 base pairs encoding for the N-terminal amino acids of the first transmembrane span. Expression of full-length ancA gene in *Dictyostelium* also offered protection from 40% CSE (FIG. 1c). The human genome encodes four paralogs (ANT 1-4), with variable tissue expression [3] and 71-89% identity between human isoforms and 62-68% percent identity to AncA in *Dictyostelium* (FIG. 6c, d). In human and mouse lung tissue and human bronchial epithelial cells, ANT1 and ANT2 proteins are the predominant paralogs expressed (data not shown). Therefore, the inventors tested and found that human ANT1 and ANT2 overexpression similarly protect human bronchial epithelial cells (HBEKTs) cigarette smoke-induced cell death (FIG. 1d, adenovirus overexpression in FIG. 6e, f), ranging from 10 to 80% CSE. ANT1 overexpression alone may result in a slight increase in baseline growth rate in HBEKTs. We observed no change in nuclei number per cell (single nuclei per cell), indicating no inhibition of cytokinesis. Moreover, this protection via ANT1 and ANT2 is evident from increasing growth in *Dictyostelium* and HBEKT cells, but also by protection of HBEKT cells from primarily apoptotic (less so necrotic) responses to CSE (FIG. 1e, f; images in FIG. 6g).

Figure 7A:
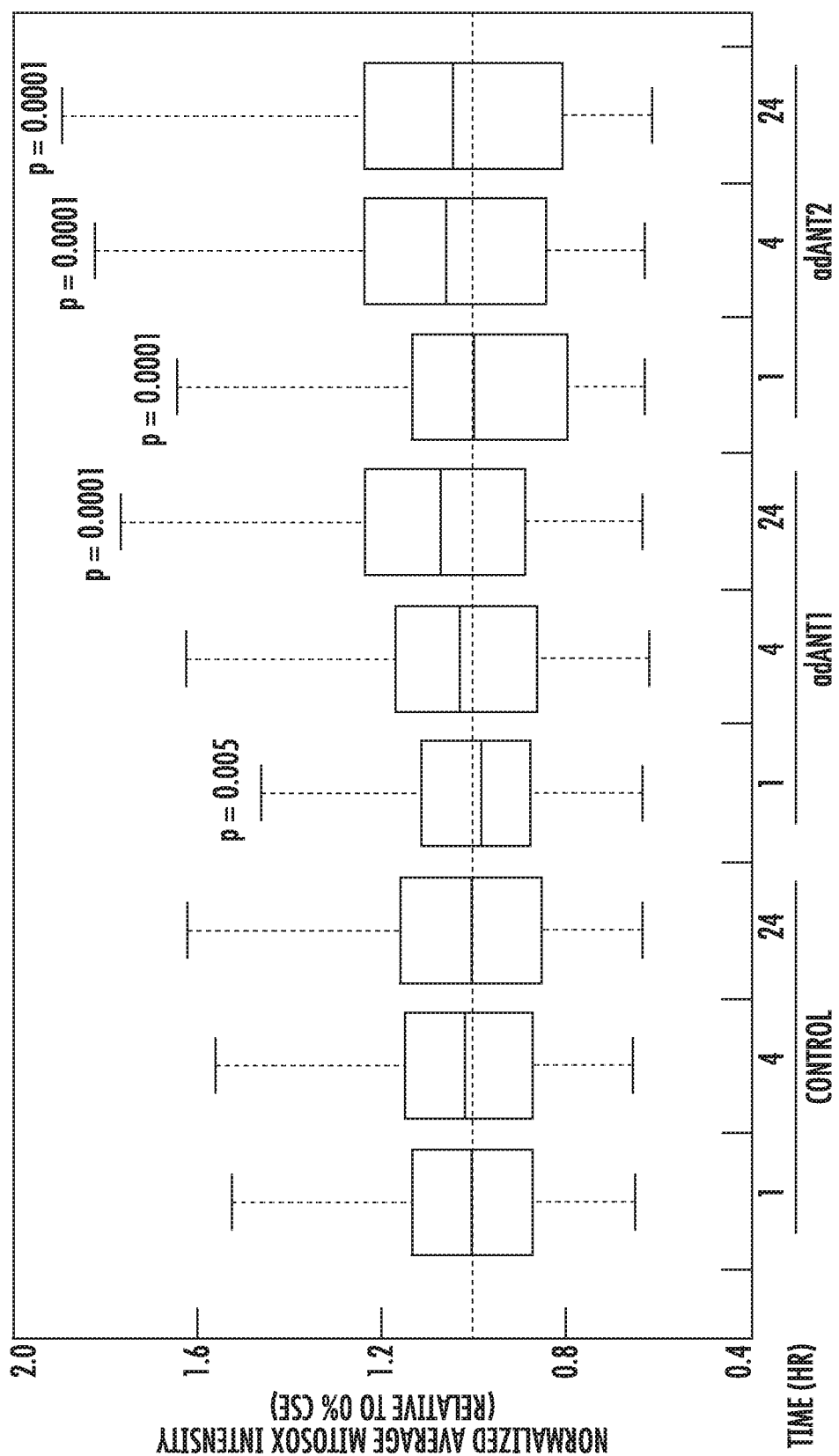

Cigarette smoke also causes an oxidative insult to lung epithelium and mitochondria, resulting in metabolic dysfunction and oxidative stress. Studies suggest that ANT influences the cellular oxidative state. ANT1 deficiency leads to increased cardiac oxidative stress, while overexpression is protective against cardiac ischemic injury and ANT2 overexpression is hepato-protective against oxidative stress and cardiac non-compaction. Therefore, the inventors examined whether changes in ANT alters superoxide levels in mitochondria in the context of CSE exposure. The inventors found that HBEKT cells experience an acute and transient increase in reactive oxygen species (ROS) within four hours of CSE exposure (FIG. 7a). ANT1 overexpression did reduce this acute increase in ROS levels relative to control cells at the 1-hour time point, but given the short time course of ROS levels, the inventors looked further to identify the other protective mechanisms by which ANTs might work.

ANT Regulates Cellular Respiration and ATP Production

Figure 2:
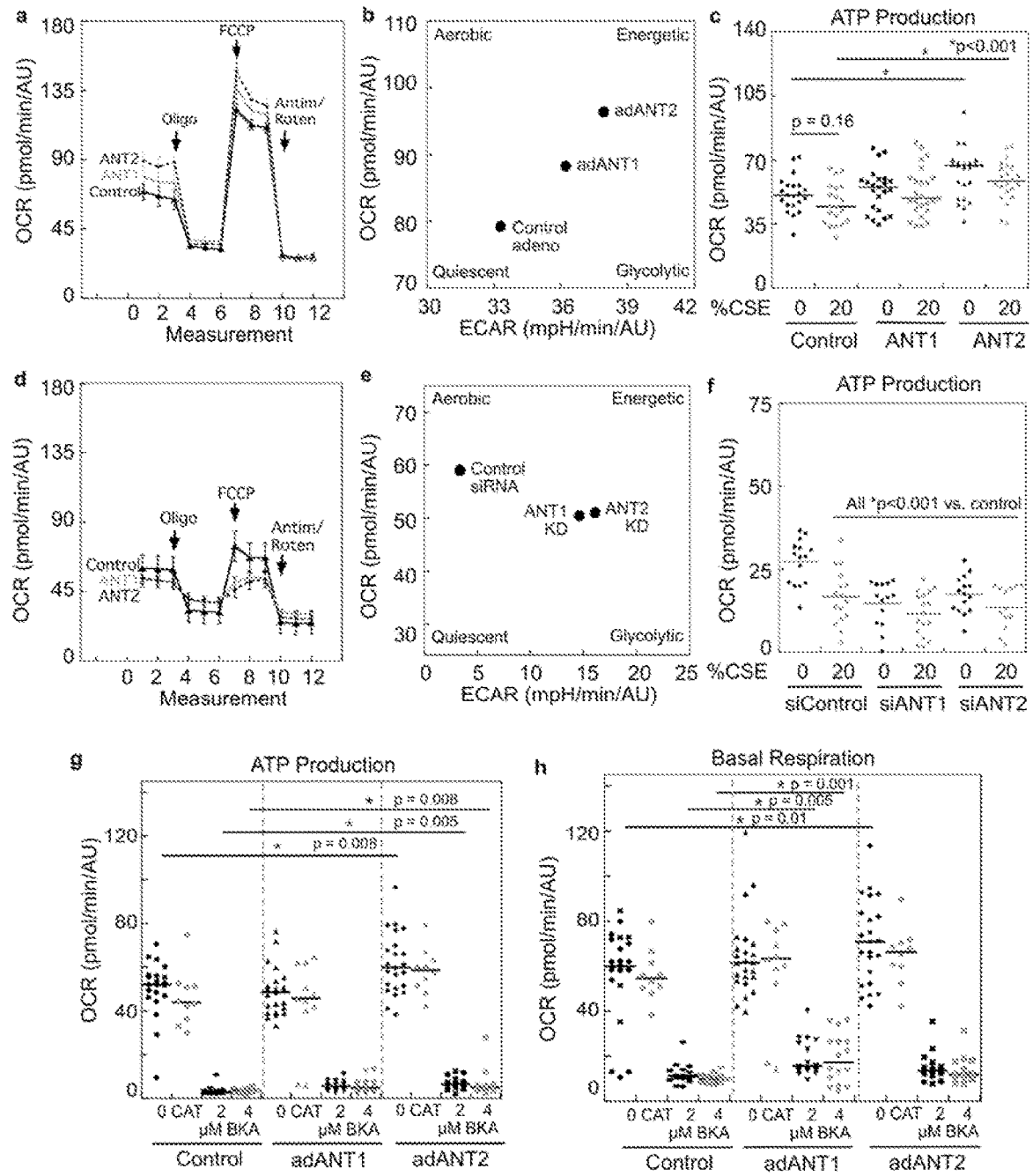
FIG. 2A-2H: ANT regulates respiration and ATP production in human bronchial epithelial cells. HBEKT cellular metabolism measured using Seahorse. Oxygen consumption rate (OCR) time course with a) ANT overexpression or d) siRNA suppression. Data show mean±SEM. OCR versus extracellular acidification rate (ECAR) with b) ANT overexpression or e) siRNA suppression with and without 20% CSE. ATP production with c) ANT overexpression or f) siRNA suppression. Data show median bars (dot plots), n=15-26 wells from 3 experiments g) ATP production and h) basal OCR with ANT overexpression with or without 20 μM CATR or BKA. Statistics by ANOVA, *p<0.05.
Figure 6E:
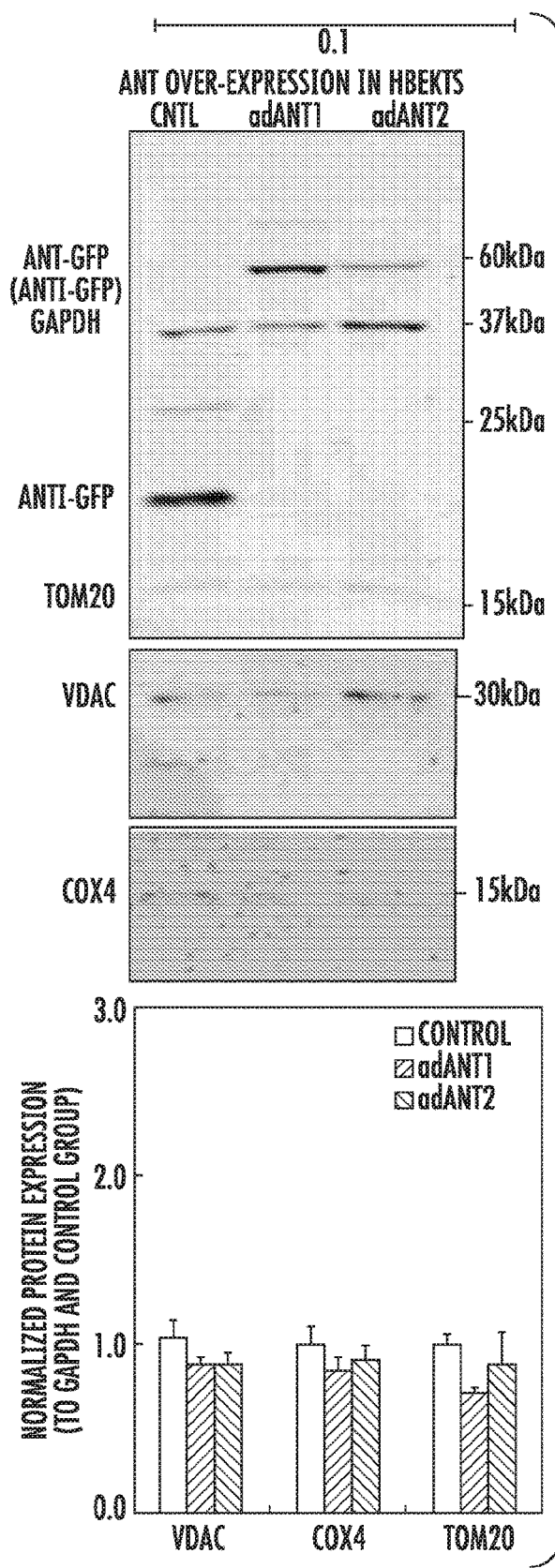
Figure 6F:
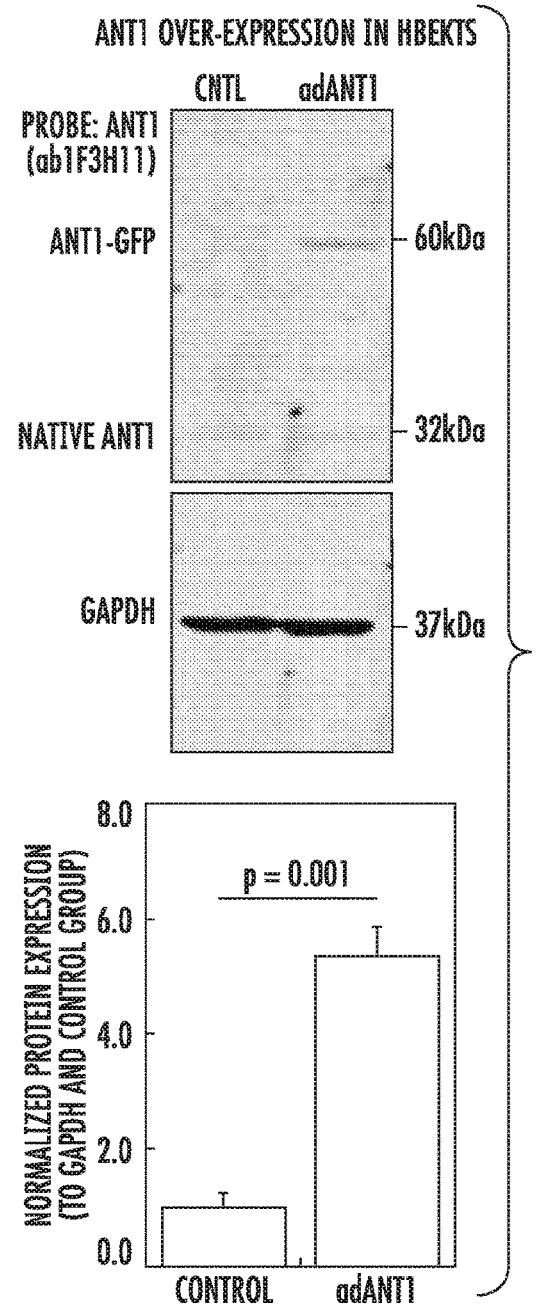
Figure 7B:
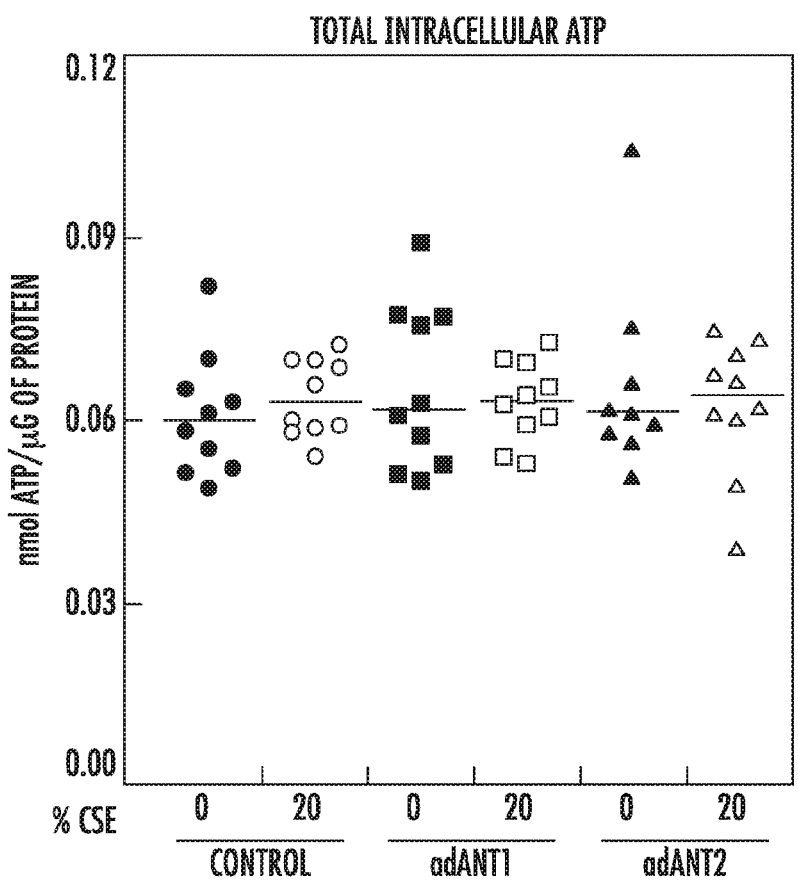
Figure 7C:
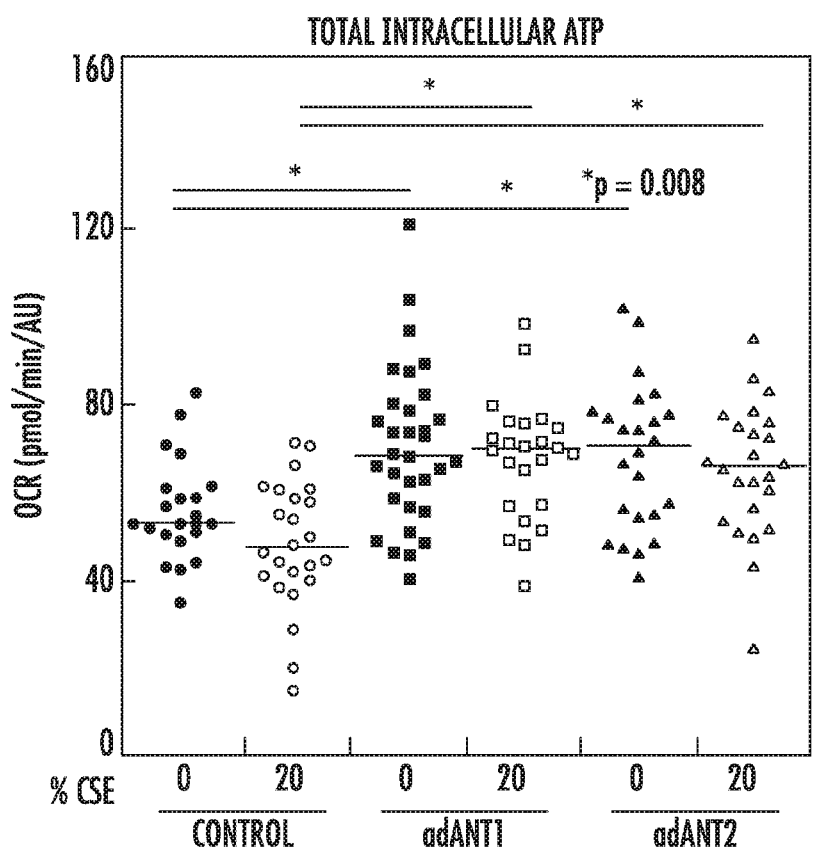
Figure 7D:
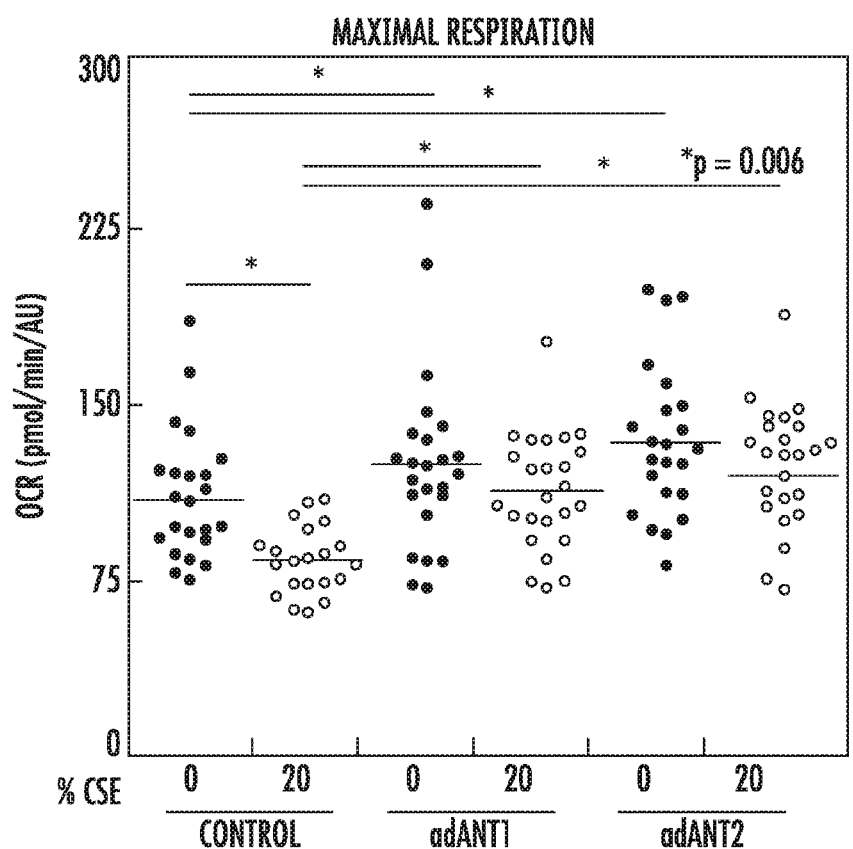
Figure 8A:
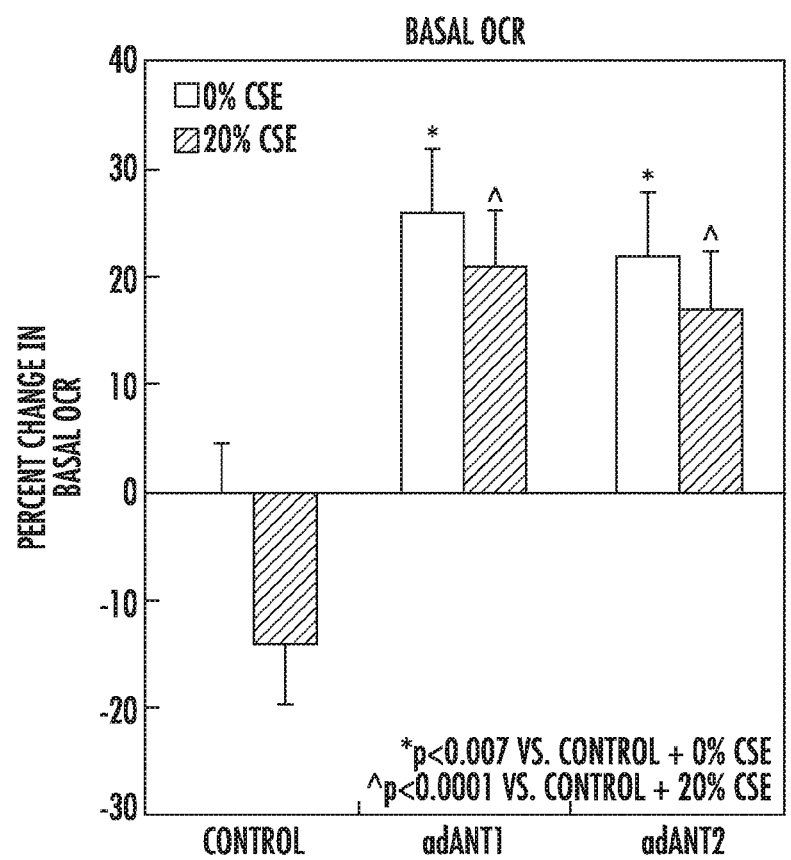
FIG. 8A-8F: Percent change in metabolic parameters in HBEKT cells with ANT1 and ANT2 overexpression with and without 20% CSE for 4 hr prior to assessment or after 30 min of treatment with ANT inhibitors Carboxyatractyloside (CATR, membrane impermeable) or Bongkrekic acid (BKA, membrane permeable). Percent change in: a) Basal OCR, b) Maximal OCR (after FCCP treatment), c) ATP production (basal OCR subtracted by post-oligomycin oxygen consumption), d) proton leak (OCR after oligomycin). OCR was determined after treatment of HBEKT cells with CATR or BKA. e) ATP production and 0 Basal OCR. Statistics completed by ANOVA with P-values representing comparison to control unless noted with an ^, which represents comparison to control+CSE. Data points are shown in main FIG. 2, n=15-26 wells from 3 experiments.
Figure 8B:
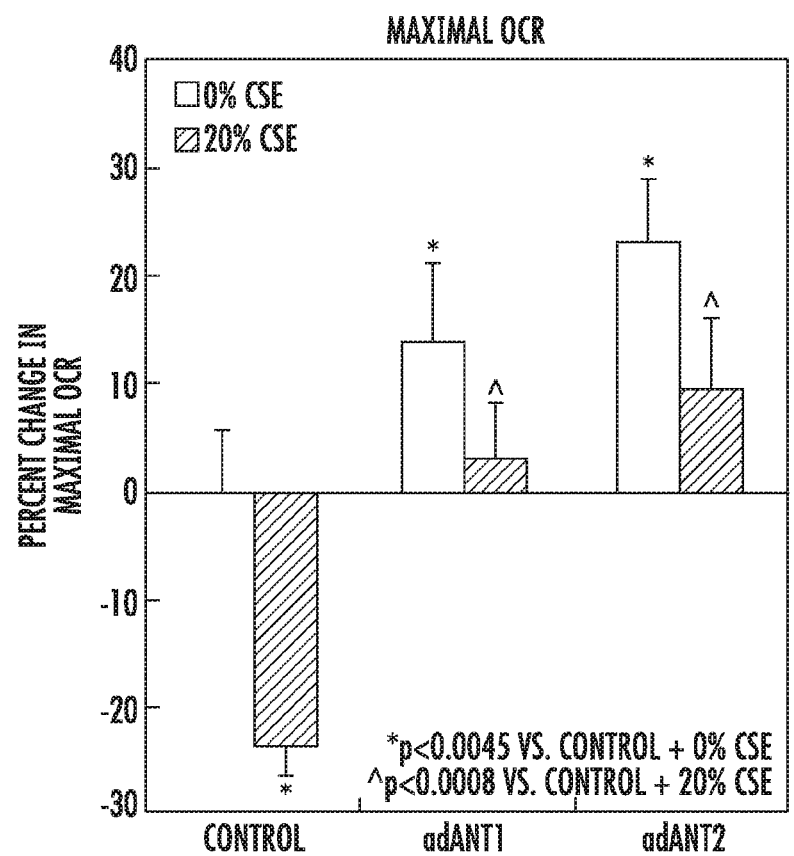
Figure 8C:
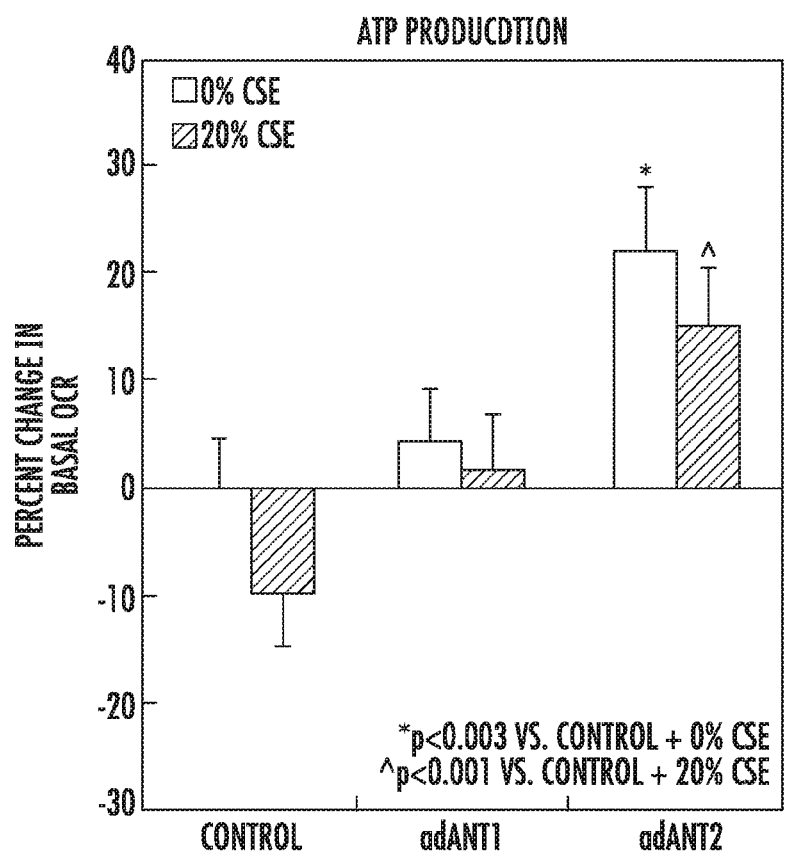

ANTs are ADP/ATP transporters that reside in the inner mitochondrial membrane where they provide the source of ADP substrate for the ATP synthase to generate ATP. The ANTs then return the ATP to the cytoplasm where the ATP is utilized as the energy currency of the cell. ANT2 can also reverse this direction to provide ATP substrates to assist the ATP synthase to restore the proton-gradient across the mitochondrial inner membrane. Therefore, we tested whether ANT modulation impacts the metabolic activity of airway epithelial cells, as well as the impact of CSE on the energy state of the cell. We utilized the Seahorse XF96e FluxAnalyzer to assess real-time oxygen consumption rate (OCR) representing basal and maximal OCR (before and after FCCP treatment, a mitochondrial uncoupler), ATP production (reflected by basal OCR minus OCR after injection of the complex V inhibitor oligomycin), and proton leak. We found that overexpression at the protein level of ANT1 (~4.3-fold) or ANT2 (to similar expression levels as ANT1) (FIG. 6e, f) resulted in increased basal oxygen consumption (26±5.7% and 22±6.1%, respectively) and higher spare respiratory capacity by attaining higher maximal respiration after FCCP treatment (14±7.2% and 23±6.2%, respectively) in HBEKT cells (FIG. 2a; also see FIGS. 7c, d and 8a, b). These increases led to a more energetic cellular phenotype (FIG. 2b). Specifically, CSE had a statistically significant impact on the metabolic state of the cell, decreasing maximal oxygen consumption by 24±2.8% (FIG. 2b; also see FIGS. 7c, d and 8a, b). The enhanced oxygen consumption rate (OCR) due to ANT (baseline and maximal OCR) was maintained after 4 hours of CSE exposure compared to an associated drop in respiration in control cells (FIGS. 7c, d and 8a, b). The increase in aerobic respiration for ANT2 was in turn reflected in an increase in cellular ATP production, 22±5.6% over control (FIG. 2c; also see FIG. 8c). Taken together, overexpression of ANT1 and ANT2 shifts bronchial epithelial cells to a more energetic state (FIG. 2b). However, the steady state intracellular ATP concentrations in HBEKT cells with ANT2 overexpression were unchanged (FIG. 7b). Interestingly, these measurements of intracellular ATP yielded an estimate of the total cellular ATP concentration to be ~8 mM for HBEKTs. This concentration is at the higher end of the range measured for various cell types.

Figure 7E:
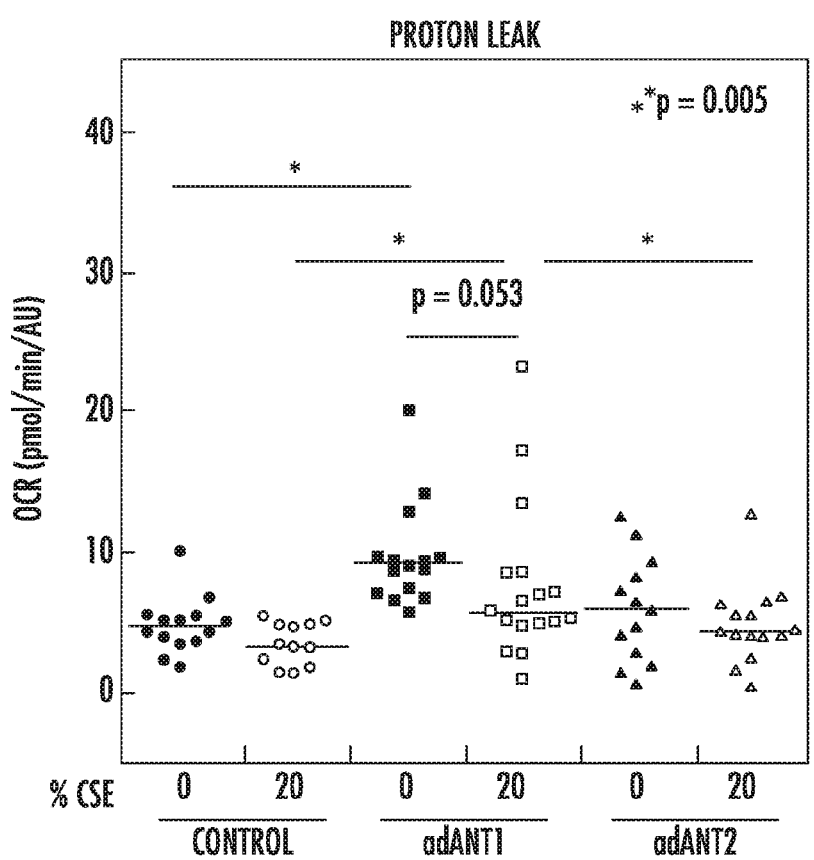
Figure 7F:
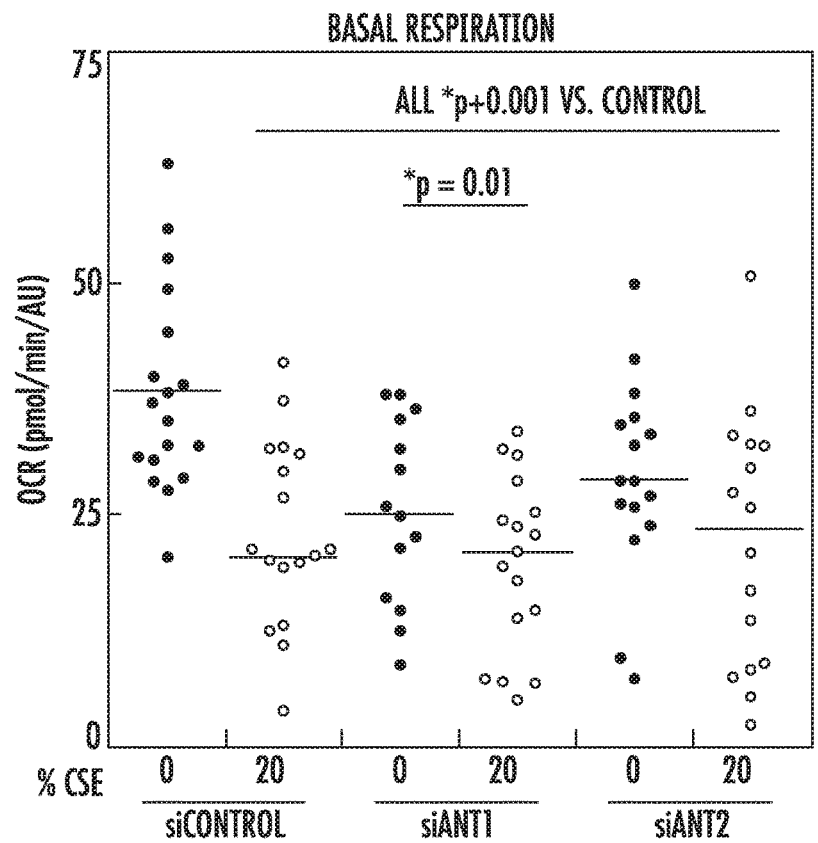
Figure 7G:
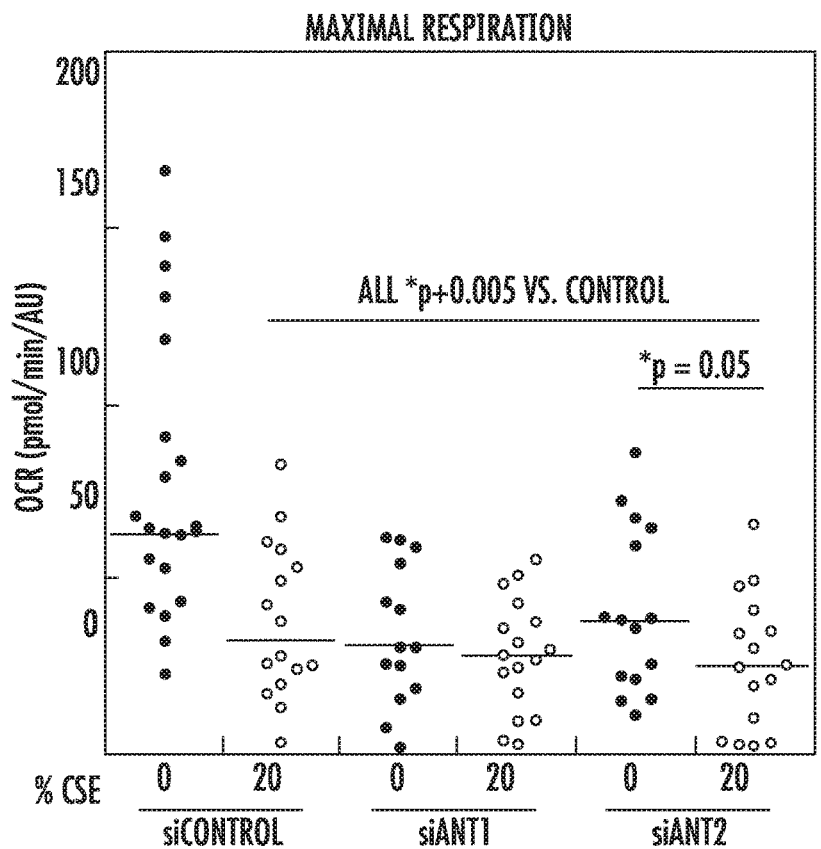
Figure 7H:
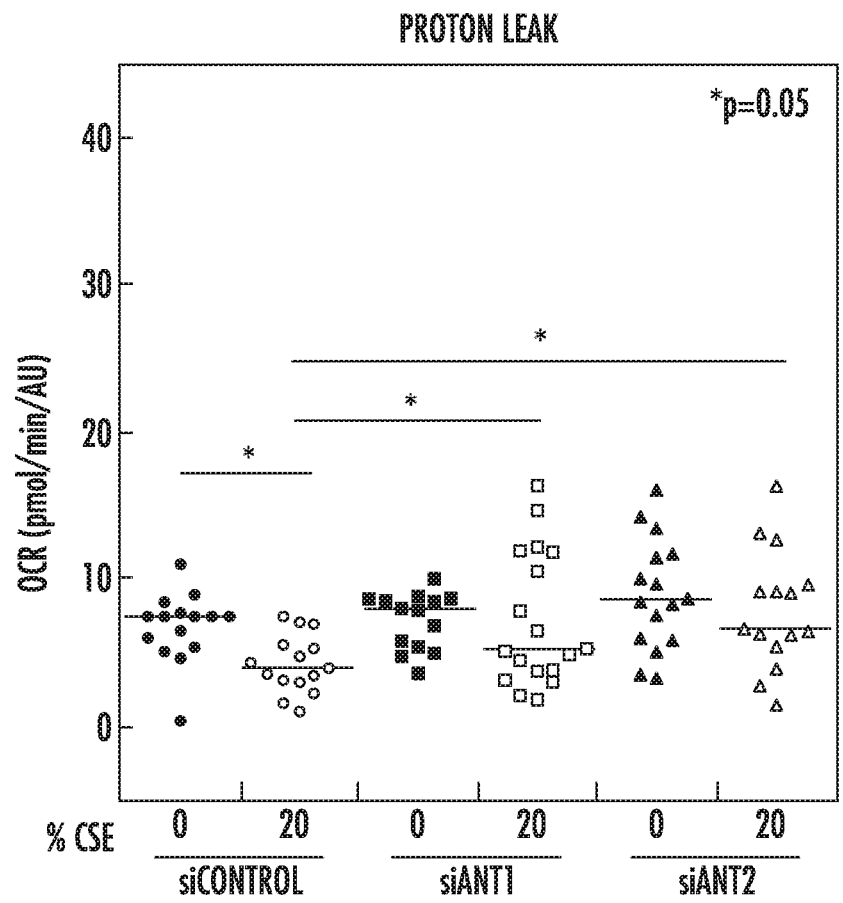
Figure 71:
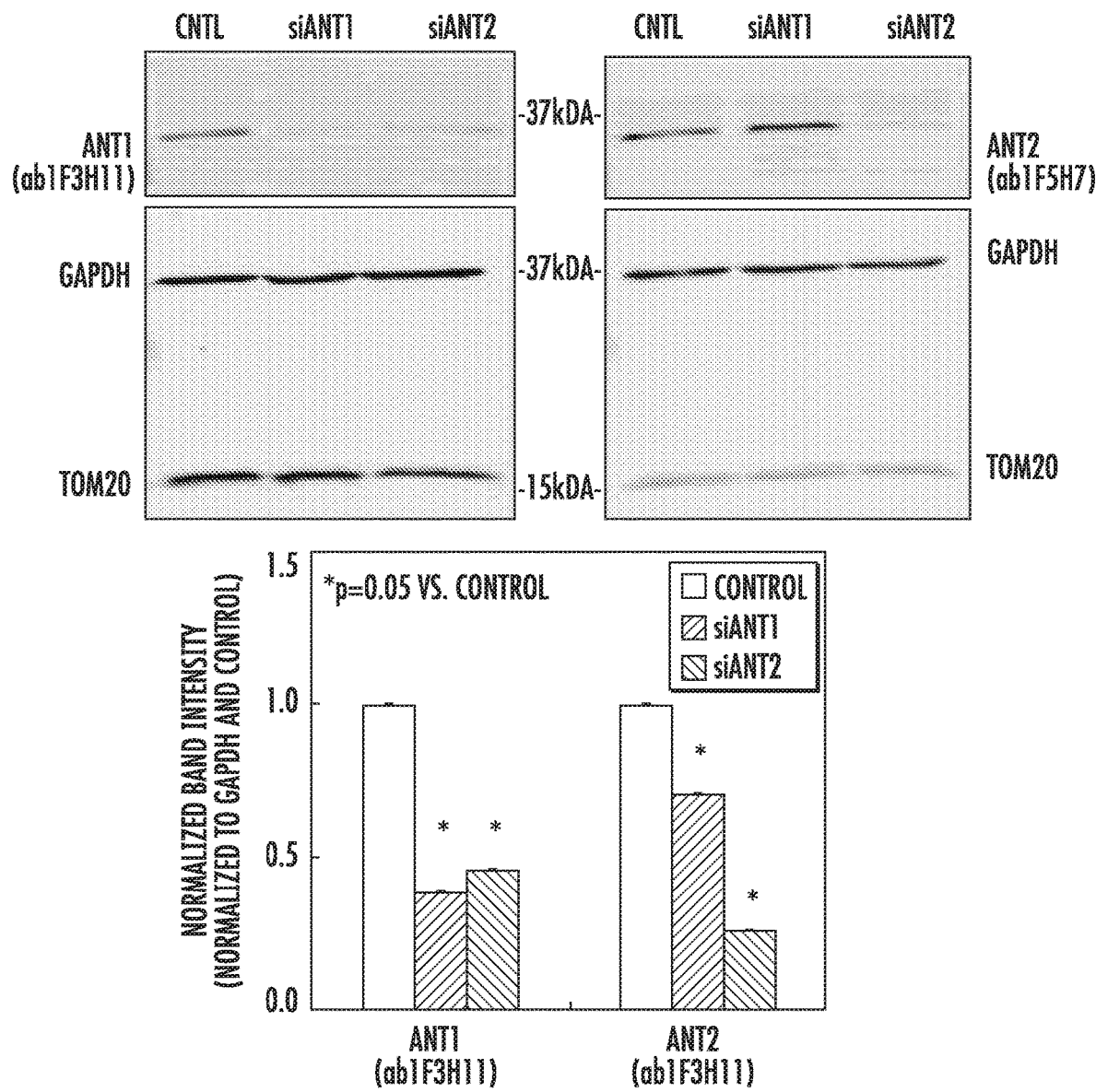
Figure 7J:
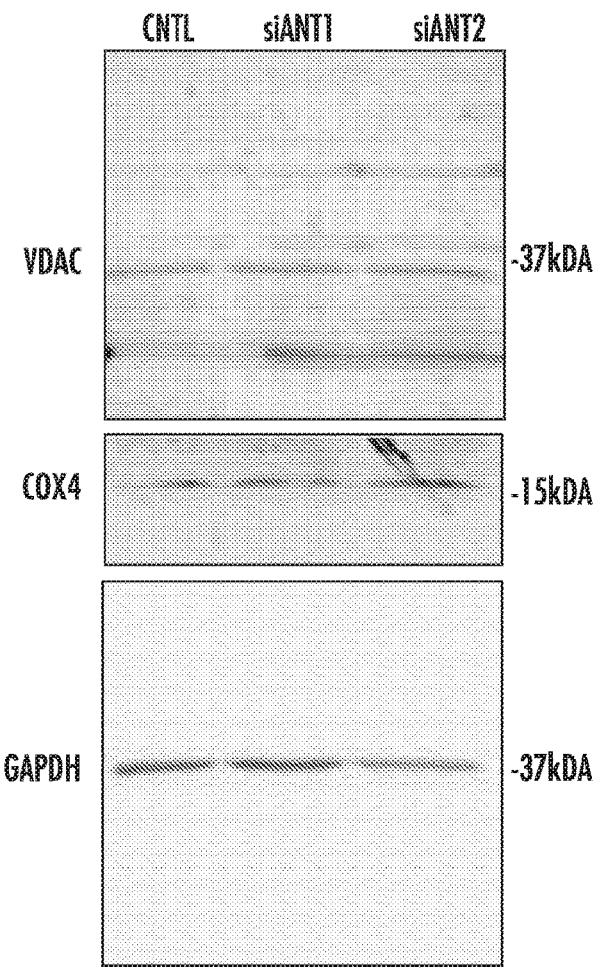
Figure 7K:
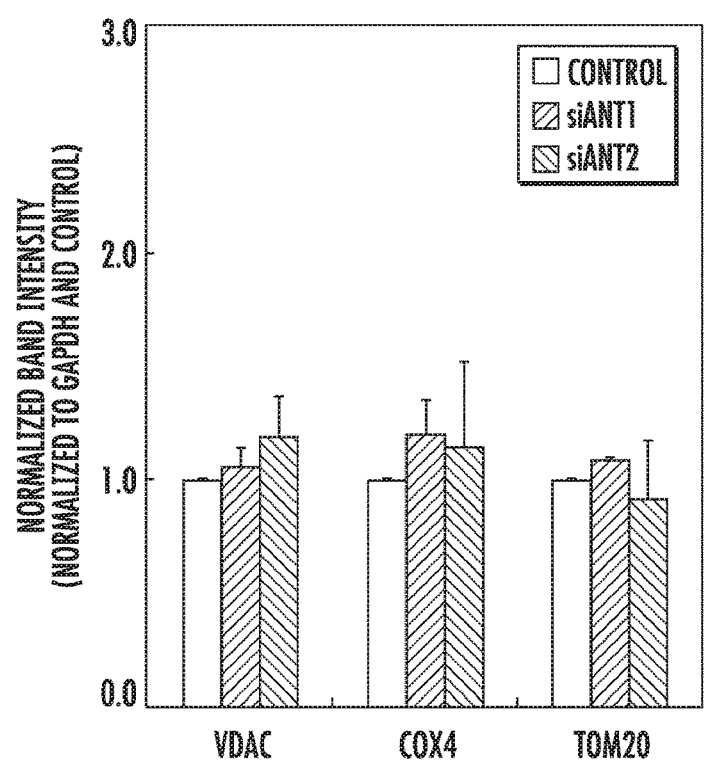
Figure 8D:
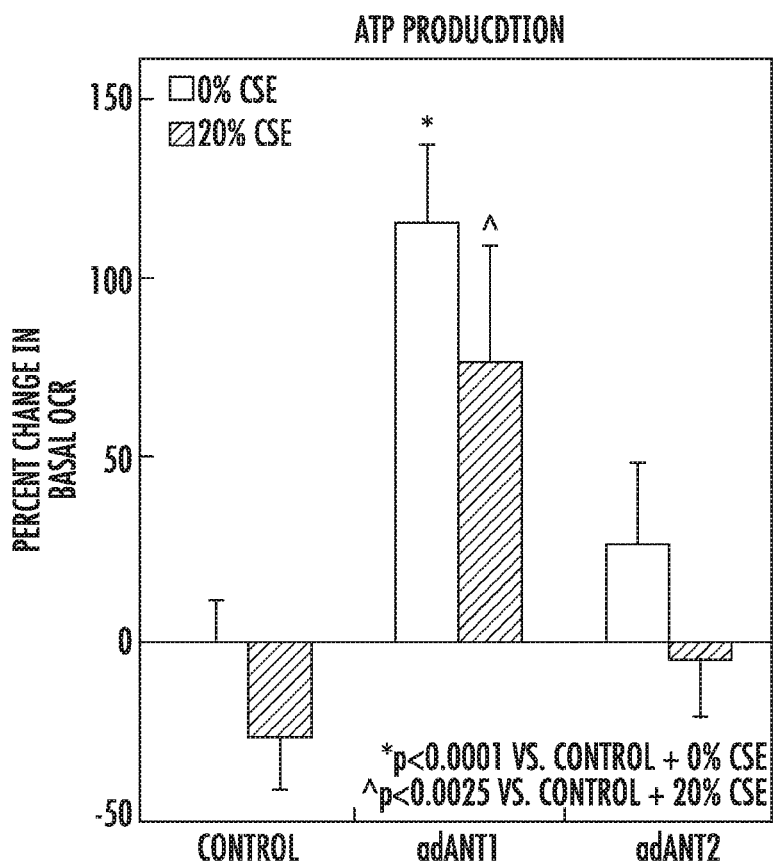
Figure 8E:
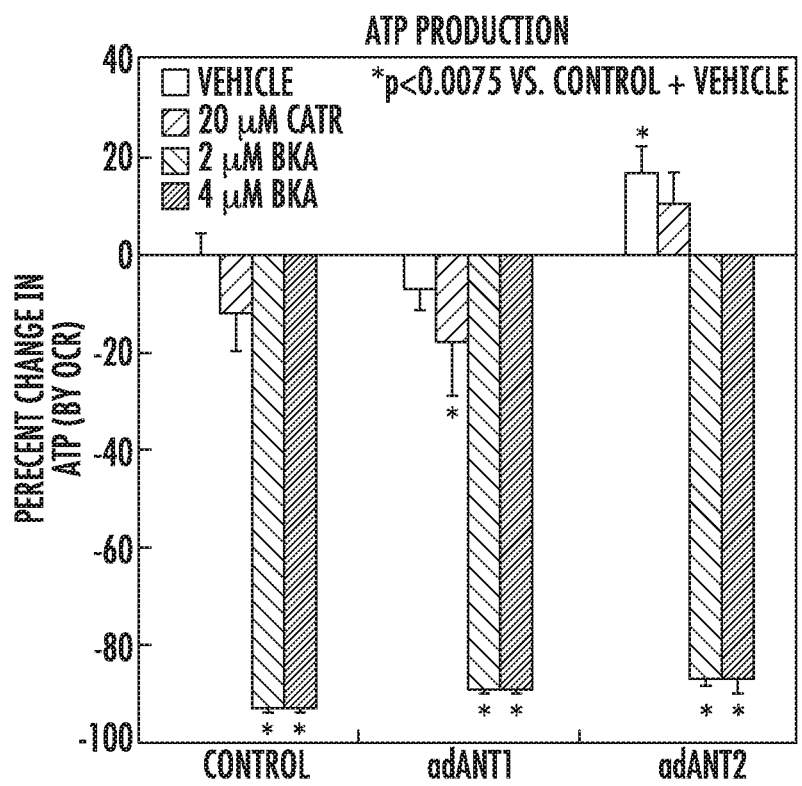
Figure 8F:
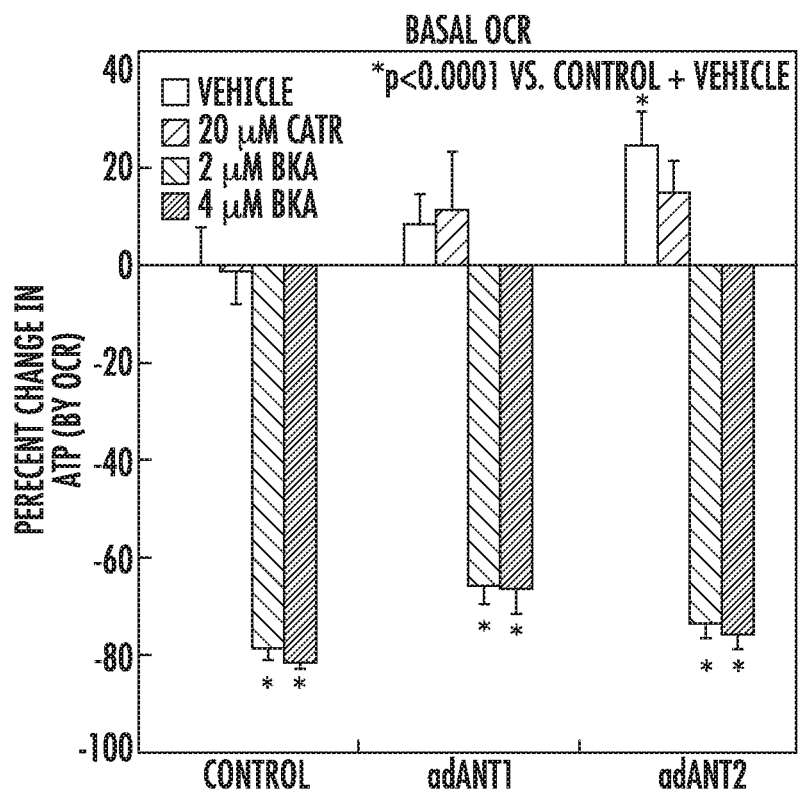

Notably, ANT1 resulted in enhanced proton leak not seen with ANT2 (FIGS. 7e and 8d), which led to enhanced mitochondrial uncoupling and explain the greater decrease in ROS production after CSE exposure with ANT1 overexpression. ANT1 and ANT2 siRNA knockdown resulted in significant reduction in basal oxygen consumption, maximal OCR, and ATP production (FIG. 2d, f; also see FIG. 7f, g), shifting the cells to a less aerobic state (FIG. 2e). We observed no significant change in proton leak with ANT1 or ANT2 siRNA knockdown (FIG. 7h). We did observe some effect of siRNA treatment alone on basal OCR levels in these cells. Suppression of ANTs using siRNA for each isoform results in a 61% reduction in ANT1 protein levels and a 74% reduction in ANT2 protein levels (FIG. 7i). ANT2 siRNA appears to also partially reduce ANT1 levels. Protein expression of mitochondrial proteins, TOM20 (a 20 kDa translo- case of the outer mitochondrial membrane), VDAC (outer mitochondrial membrane) and COX4 (inner mitochondrial membrane) did not change with ANT1 or ANT2 overexpression (FIG. 6e) or suppression (FIG. 7j) suggesting that the metabolic changes seen were not due to changes in these mitochondrial proteins. Other studies have found similar stability with oxidative phosphorylation proteins. ATP production and basal oxidative respiration were halted after treatment with the ANT-specific inhibitor Bongkrekic acid (cell permeable), but not carboxyatractyloside (cell impermeable) (FIG. 2g, h; also see FIG. 8e, f). Thus, ANT, predominantly ANT2, appears to protect cells from CSE in part by enhancing the energetic state of the cells and increasing ATP production. This combination in turn leads to improved cell survival in the context of CSE.

ANT Localizes to Cilia of Motile Ciliated Epithelium

Figure 3:
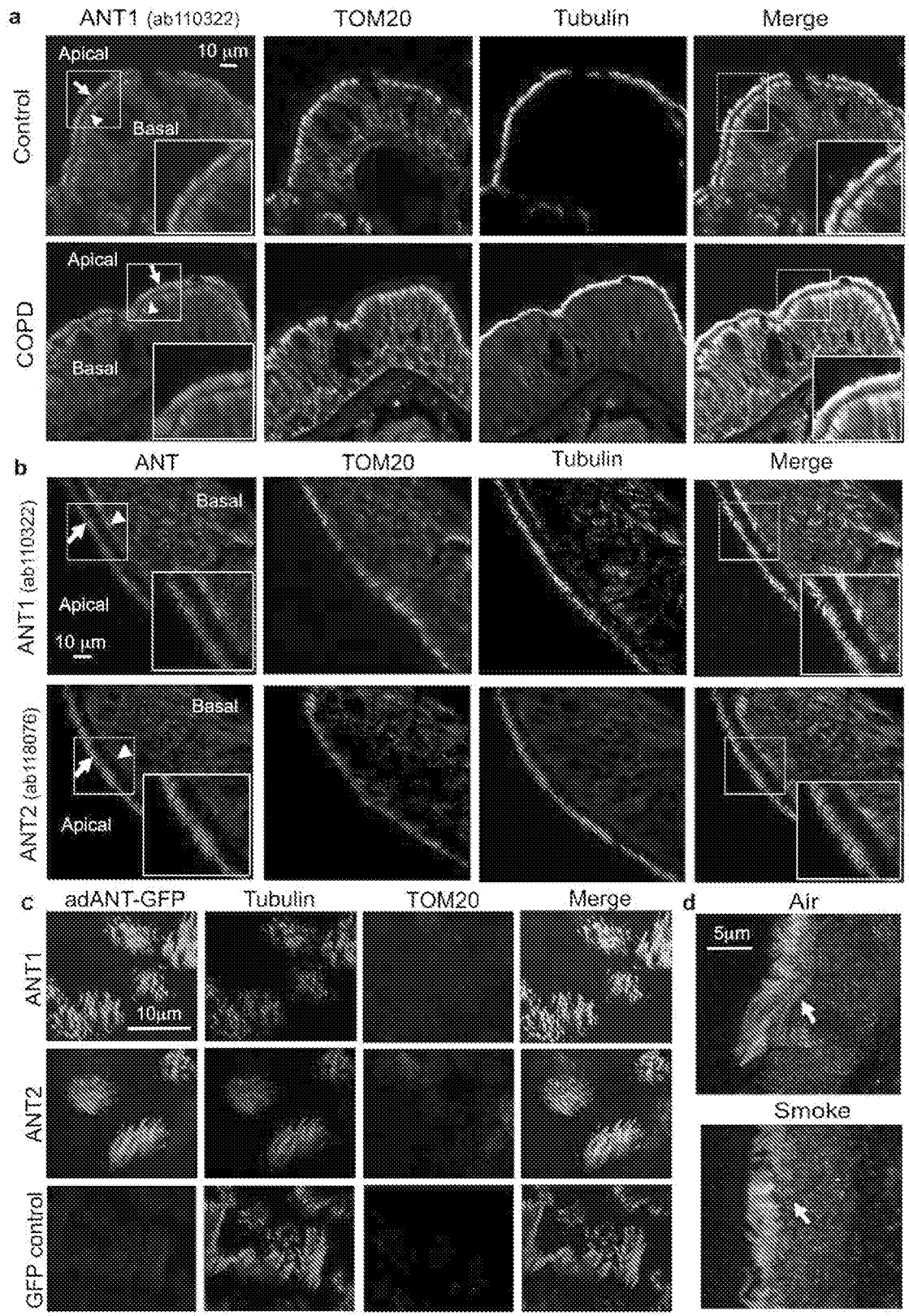
FIG. 3A-3C: ANT localizes to the plasma and ciliary membrane in motile airway epithelium. a) Human lung tissue from control and COPD patients stained for ANT1, TOM20 and tubulin, imaged by confocal microscopy. Representative of n=7-9 subject per group b) NHBEs stained for native ANT, TOM20 and tubulin. For a and b: Arrows—ciliary ANT, arrow heads—mitochondrial ANT; Scale bar, 10 μm. c) NHBEs with adenoviral ANT-GFP, imaged by confocal microscopy. ANTs colocalize with ciliary tubulin. d) Mouse lungs (air versus smoke exposed) stained for ANT1 (red, ab102032) and tubulin (light blue). n=5 mice per group. Images by Nikon SIM.
Figure 9A:
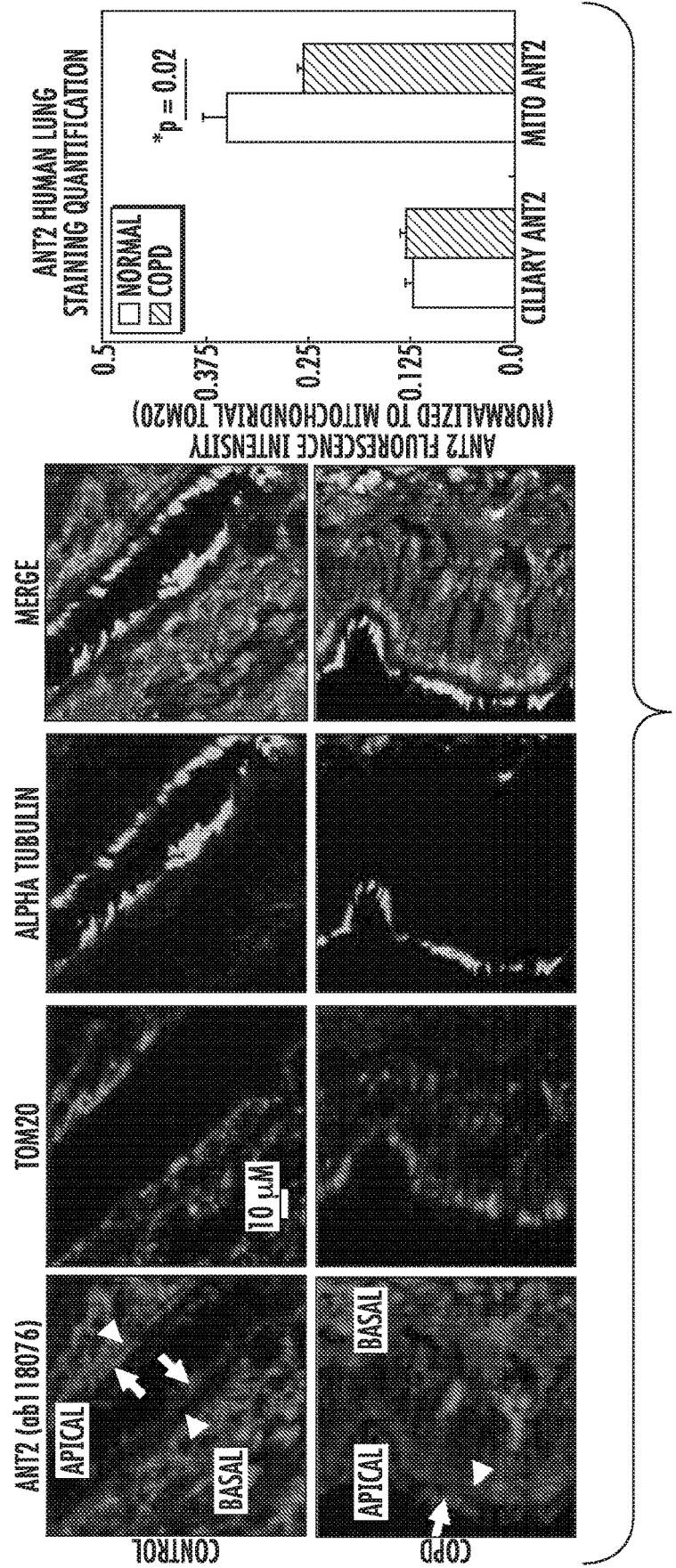
FIG. 9A-9H: a) Human lung stained for ANT2, TOM20 and tubulin. n=2 subjects per group; Scale bar 10 μm. Fluorescence quantification of ciliary versus mitochondrial ANT2, background corrected and normalized to mitochondrial TOM20 intensity. b) Fluorescence quantification of ciliary versus mitochondrial ANT1 (representative images in FIG. 3a), background corrected and normalized to mitochondrial TOM20 intensity. Statistics by Student's t-test, p-values noted. c) Antibody specificity for rabbit and mouse anti-ANT1 for yeast lysates with human ANT paralogs; Hexokinase-2 loading control. d) Western analysis of axonemes (2 normal patients) for ANT1, ANT2, TOM20 and tubulin, 5 μg protein loaded. e) Real-time PCR gene expression for slc25a4 and slc25a5 in human whole lung tissue from normal (n=35-48) versus COPD (n=20-23) subjects; Normalized to β-actin and data shown as fold change in COPD compared to normal. Statistics by Student's t-test; p-values noted. f) Human GWAS gene expression data for slc25a4 and slc25a5 in normal (n=137 subjects) versus COPD (n=219) whole lung tissue, normalized to GPI. Median shown. g) GWAS gene expression data for slc25a4 and slc25a5 in human small airway epithelial cells from non-smokers (n=12 subjects) versus smokers (n=10), normalized to GPI, GEO database GDS2486. Median shown. h) ANT1 and ANT2 gene expression in air versus smoke-treated mouse lungs (6-month exposure), Normalized delta Ct, n=3 per group, normalized to GAPDH. Statistics by Student's t-test; p-values noted.
Figure 9B:
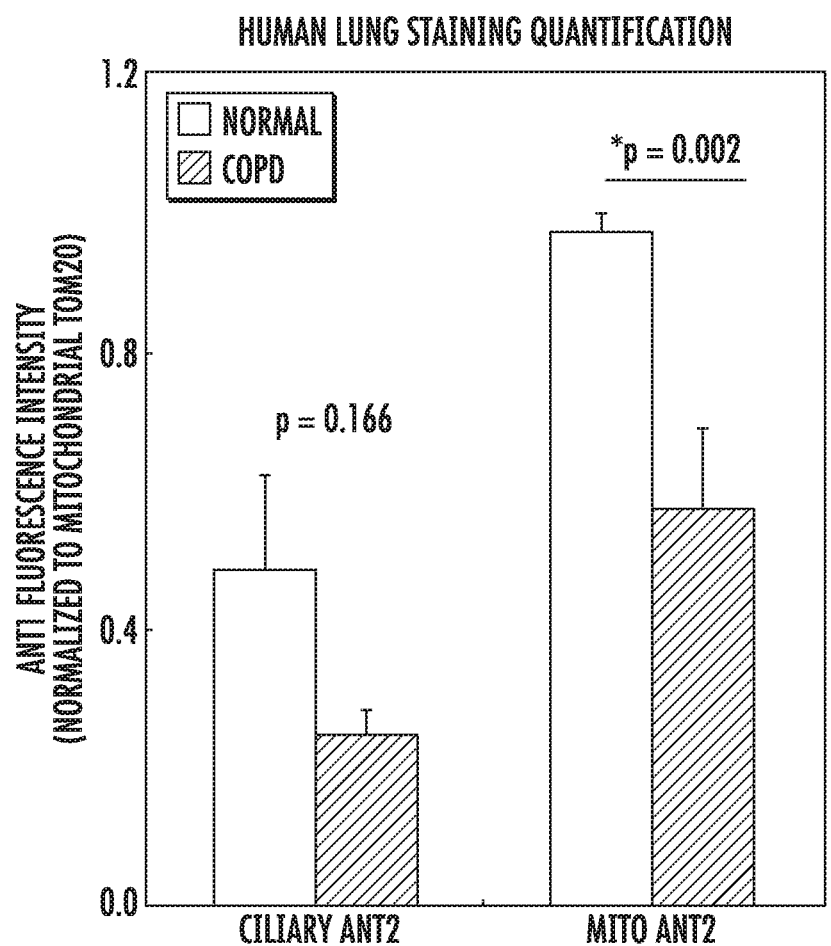
Figure 9C:
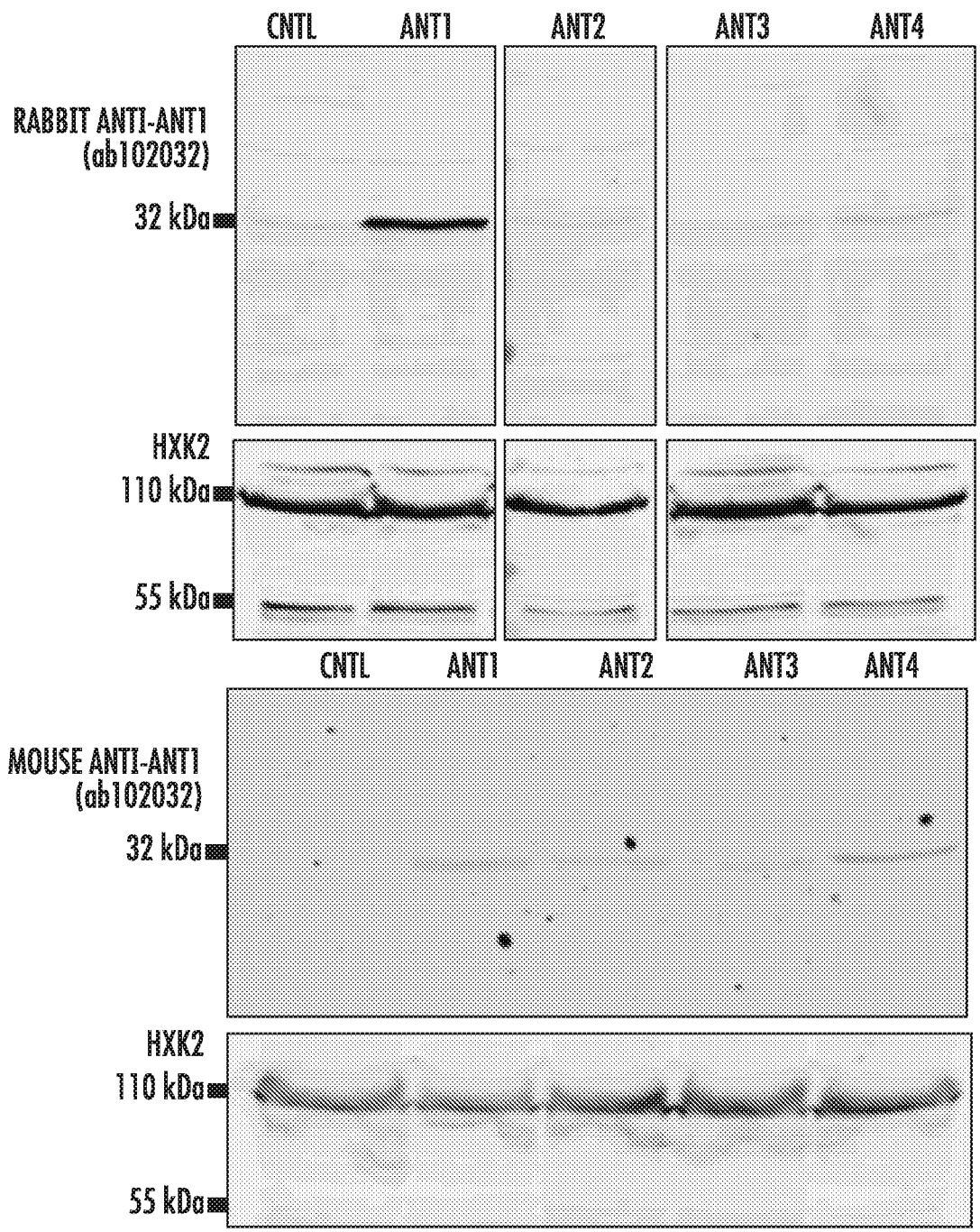
Figure 9D:
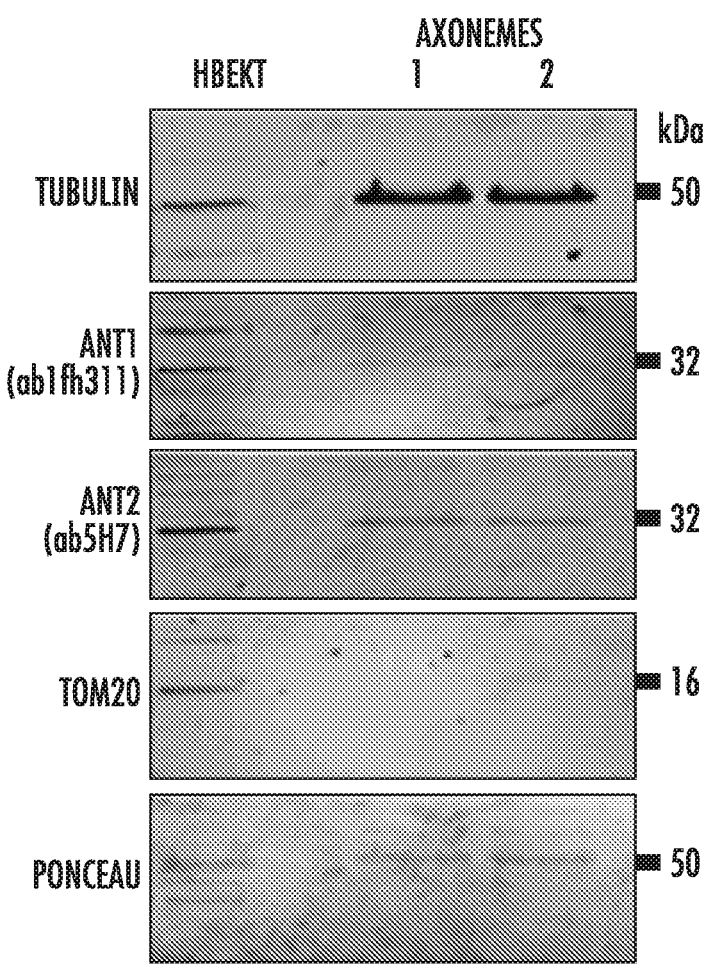

The inventors next determined the cellular distribution of ANTs in the airways of human and mouse lung tissue to determine how ANT expression may vary during the progression of COPD and in response to CSE, respectively. As expected, a population of ANT1 co-localized with TOM20, which is a marker for mitochondria. This colocalization was observed throughout the epithelial cytoplasm with some localization towards the apical surface where mitochondria are known to enrich (FIG. 3a, arrow head). However, we observed an unexpected population of ANT1 that extended past the apically located mitochondria and that was separate from TOM20 (FIG. 3a, arrow). This population co-localized with alpha-tubulin, which is highly enriched at microtubules in the ciliary axonemes. Furthermore, we observed this ciliary distribution with various antibodies (100% of those tested) raised against ANT1 and ANT2 in human airway tissue from normal human and COPD lungs (ANT2 staining in FIG. 9a, antibody specificity in FIG. 9c). In human COPD airway tissue, ANT1 and ANT2 staining is reduced in mitochondria with no significant changes seen at cilia (quantification in FIG. 9a, b). Similarly, we observed ANT1 and ANT2 in cilia of primary ciliated normal human bronchial epithelial cells (NHBEs) grown on air liquid interface (ALI) derived from three separate human subjects (FIG. 3b). To confirm the presence of ANT isoforms in cilia, we isolated axonemes sheared from primary human ciliated airway cells from two patients, where we again detected the presence of ANT1 and ANT2 along with tubulin, but in the absence of mitochondrial TOM20 (FIG. 9d).

Figure 9E:
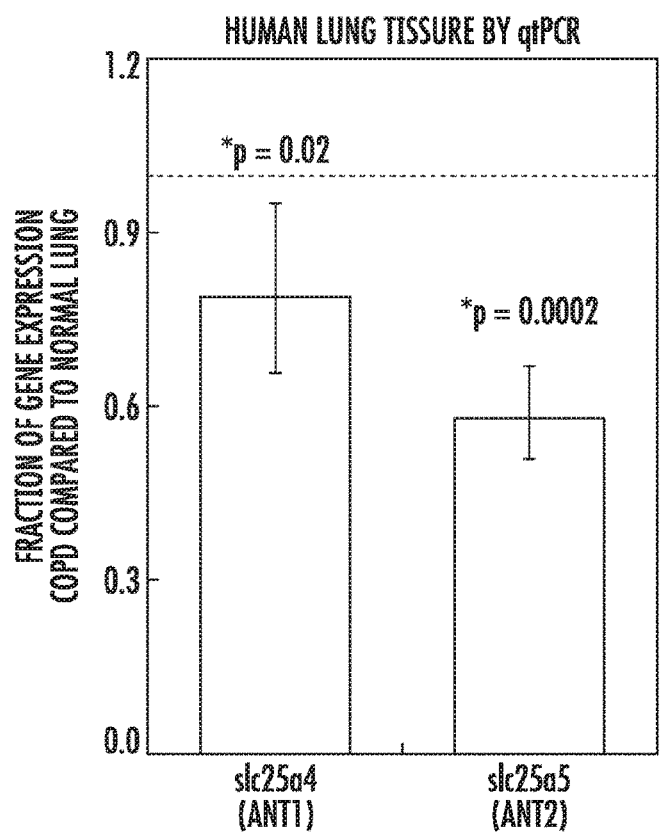
Figure 9F:
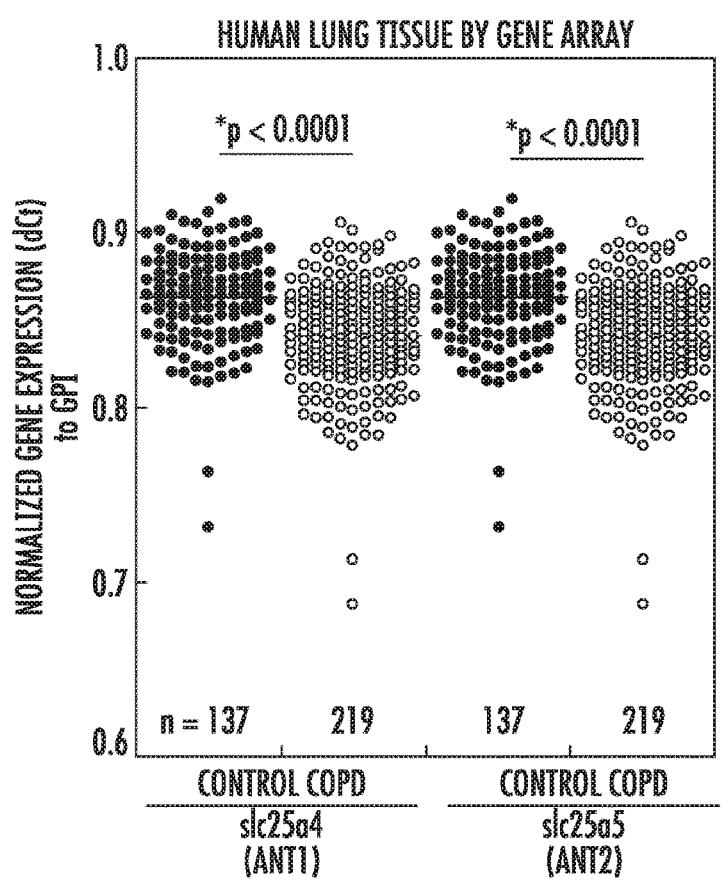
Figure 9G:
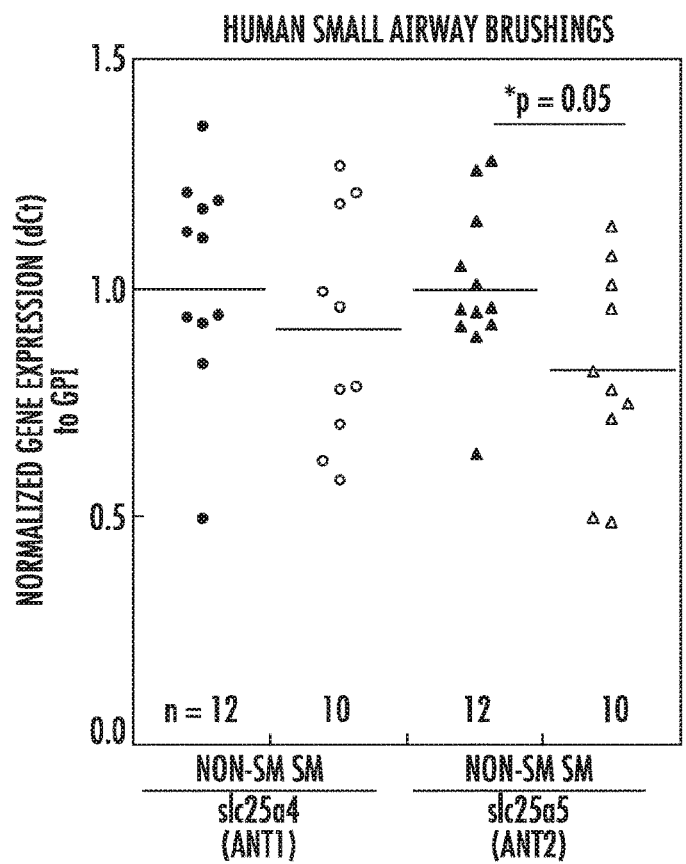
Figure 9H:
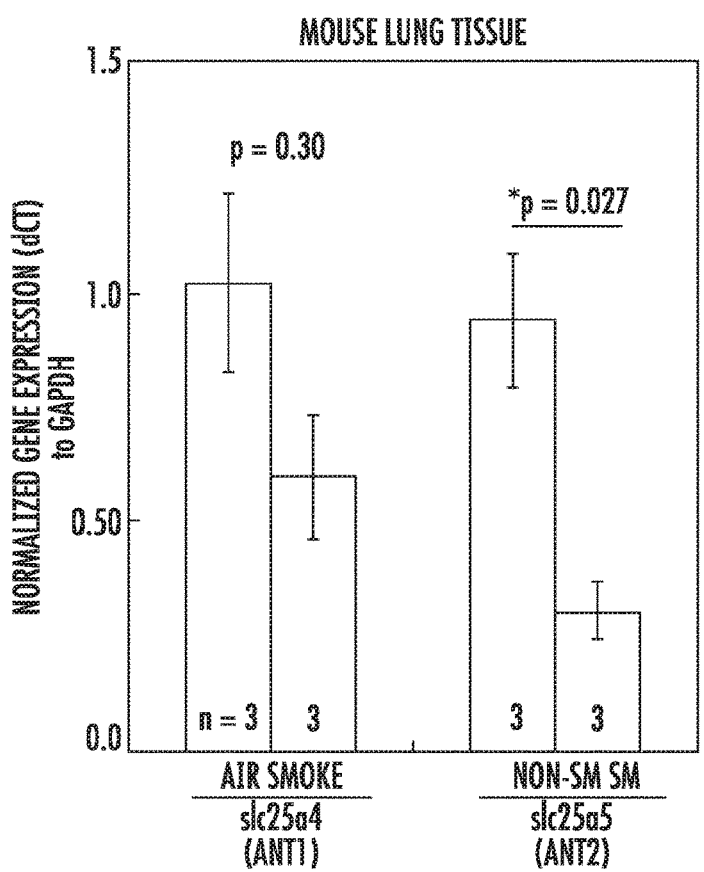

We next determined ANT isoform gene expression in human lung tissue from normal versus COPD subjects utilizing several sample cohorts and data sets. Slc25a4 (ANT1) and slc25a5 (ANT2) gene expression by real time PCR is reduced in whole lung tissue from individuals with COPD as compared to tissue from normal individuals (FIG. 9e). This is further supported by gene expression analysis of GWAS data from whole lung tissue (from the Lung Genome Research Consortium), which again revealed a reduction in slc25a4 (ANT1) and slc25a5 (ANT2) expression in whole lung tissue from COPD patients as compared to normal individuals (FIG. 9f). Slc25a5 (ANT2) gene expression is also reduced in ciliated small airway cells isolated from smokers compared to non-smokers in a publicly available GEO data set (FIG. 9g). Finally, in a mouse model of cigarette smoke exposure for 4 months (when mice develop COPD-like features), slc25a5 (ANT2) gene expression by real time PCR were reduced by ~60% in lungs of C57BL/6 mice compared to air-exposed controls (FIG. 9h). These collective observations support the notion that ANT1, and most notably ANT2, are impacted by cigarette smoke exposure and that the reduction in their expression are likely contributors to COPD pathogenesis.

Figure 10A:
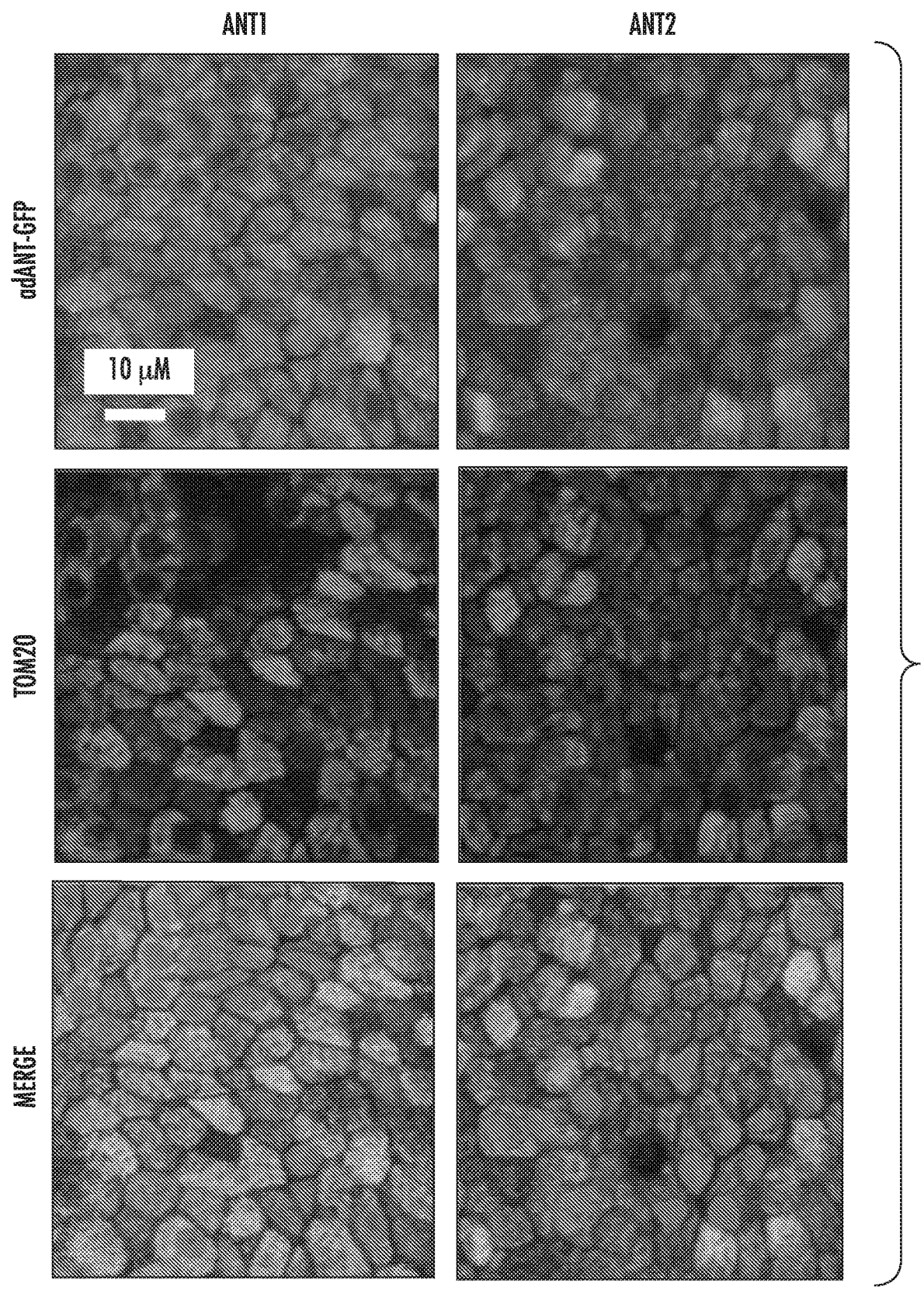
FIG. 10A-10E: a) Colocalization of ANT-GFP with mitochondria in primary NHBEs. b) Colocalization of ANT1 or ANT2 and NPHP4 (ciliary transition zone protein) in cilia of NHBEs. c) ANT1 (red) and tubulin (light blue) in mouse olfactory and nasal epithelium, arrow noting apical ANT present in motile ciliated nasal epithelium compared to non-motile ciliated olfactory epithelium. d) Immuno-gold EM of primary ciliated NHBE cells after adenoviral overexpression of control GFP, adANT1-GFP or adANT2-GFP followed by immune-gold labeling. Gold particles are present at the ciliary plasma membrane for adANT1 and adANT2. e) Quantification of gold particles per cilium for each group, n=200 cilia analyzed per group. Median bars shown in red. Statistical analysis by Student's t-test with $p<0.0001$.
Figure 10B:
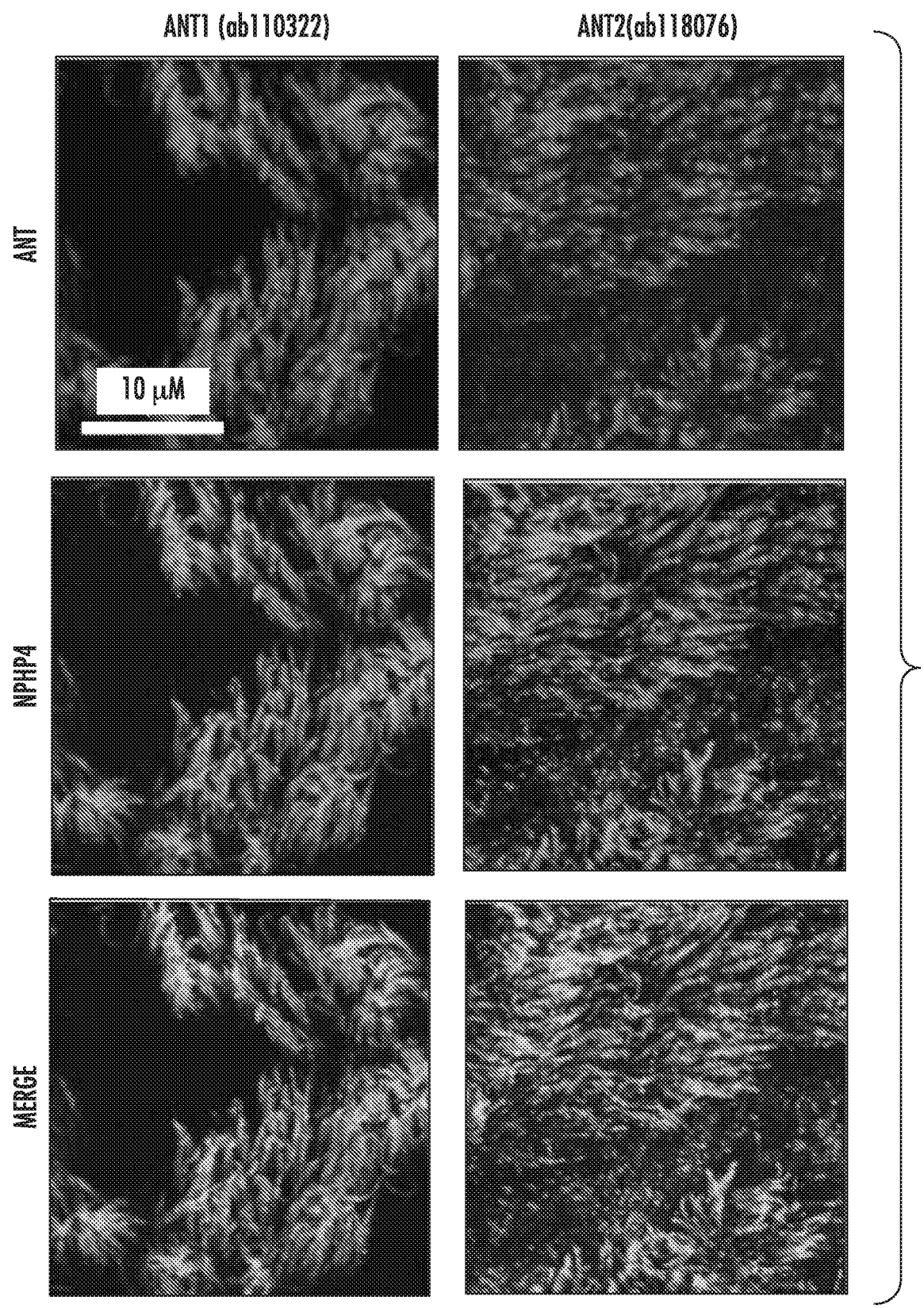
Figure 10C:
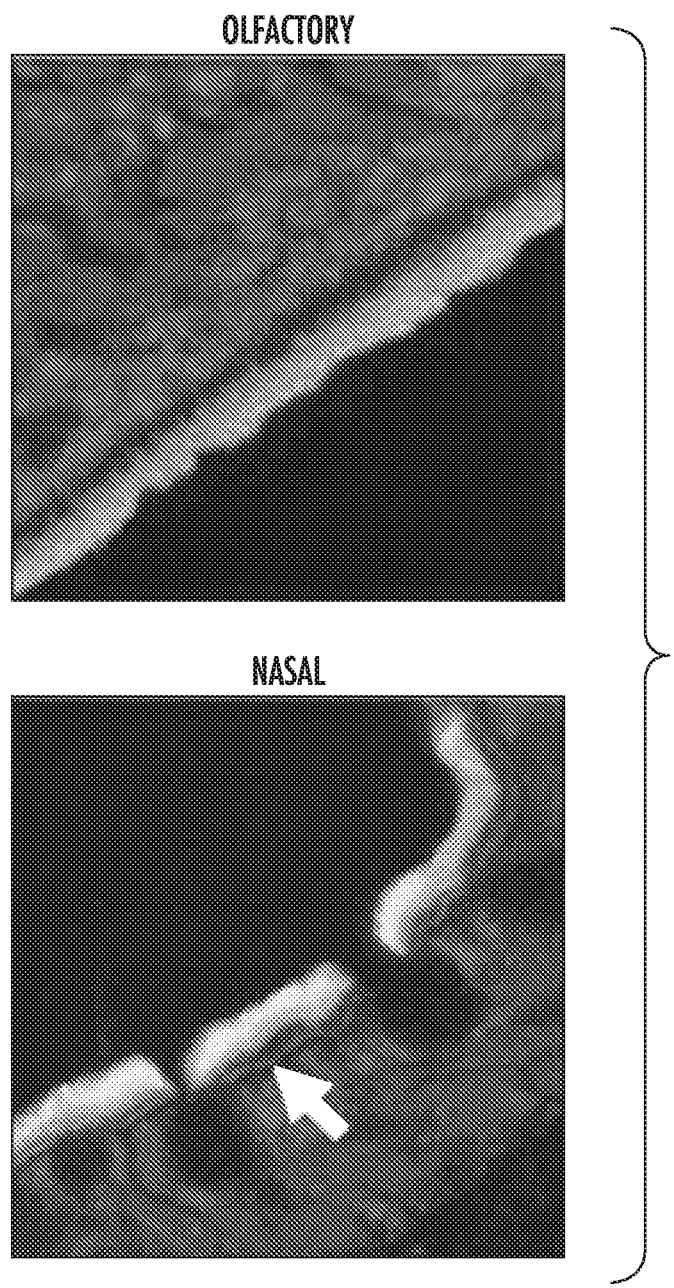
Figure 10D:
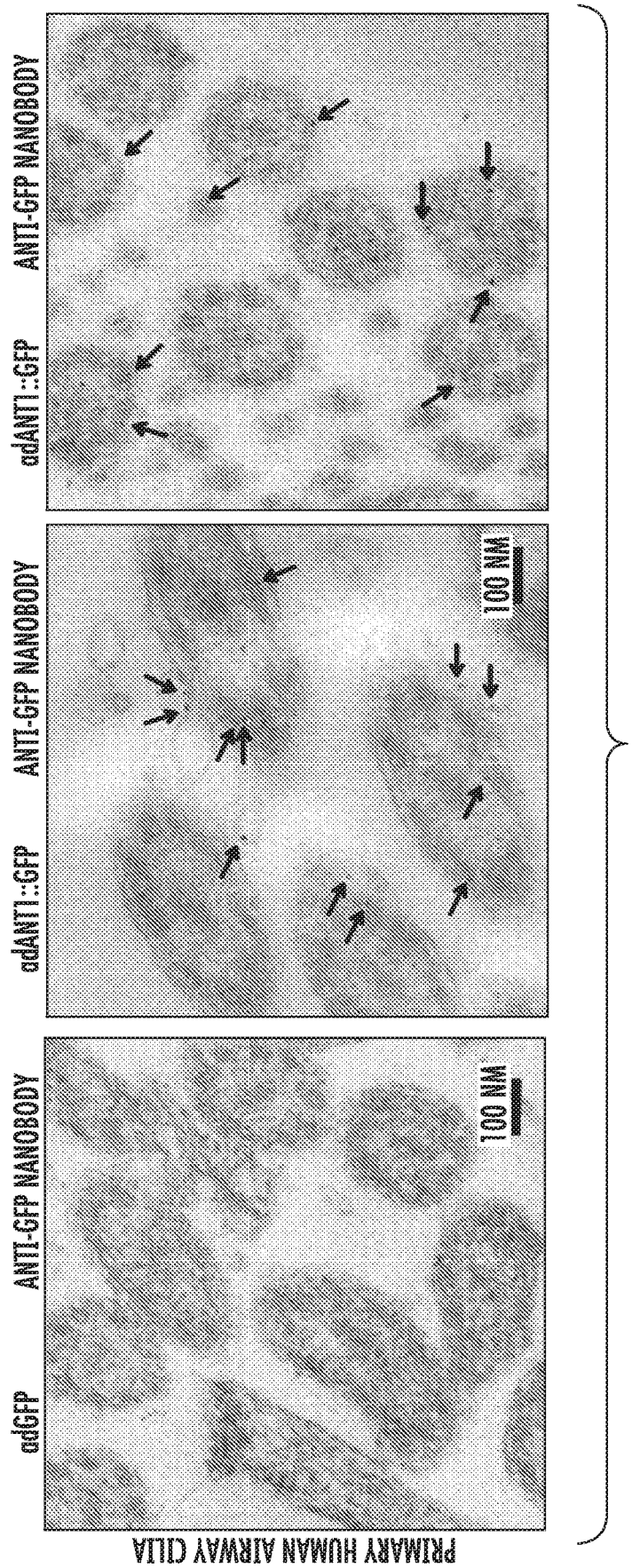
Figure 10E:
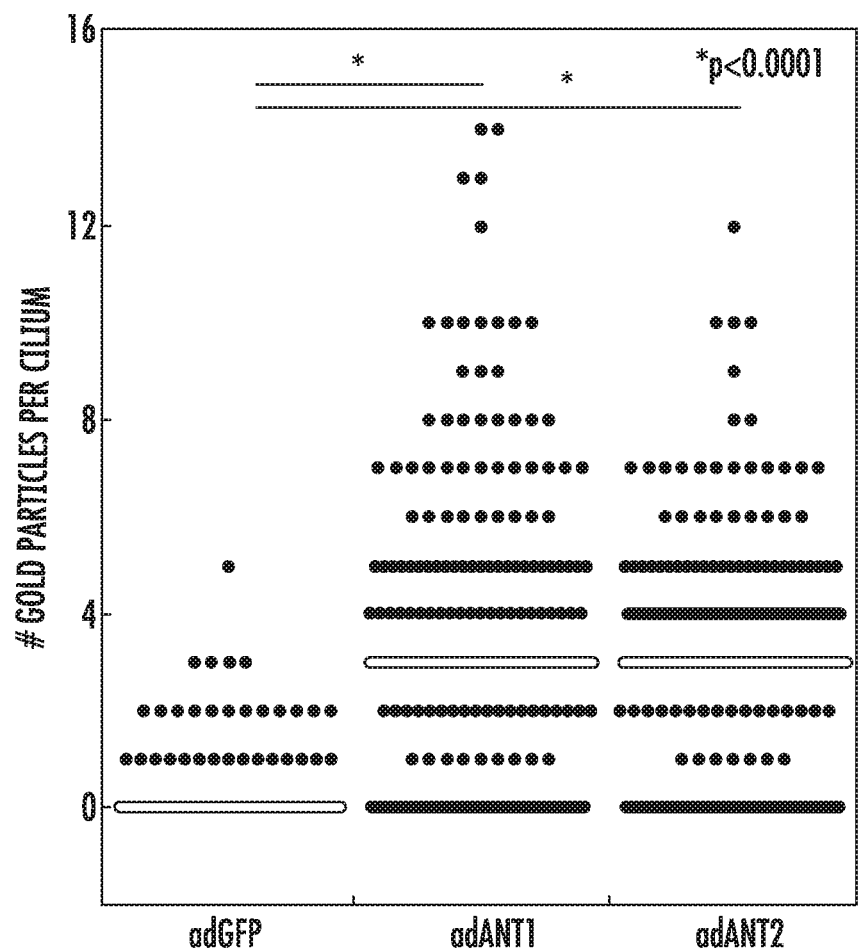

We then drove expression of ANT1-GFP and ANT2-GFP in differentiated primary ciliated airway epithelial cells (NHBE cells) using adenoviral vectors and detected localization of ANT1 and ANT2 to cilia, demonstrating that the ANTs are capable of accumulating in cilia and the plasma membrane in the absence of mitochondria (FIG. 3c). ANT1-GFP and ANT2-GFP were also observed colocalizing with TOM20 in the mitochondria throughout the cell body (FIG. 10a). To further confirm localization of ANT in cilia, we found that native ANT1 and ANT2 colocalized with NPHP4, a protein found at the transition zone within cilia (FIG. 10b). ANT staining extends past NPHP4 to the end of the cilia. Structured illumination microscopy of ANT1 in mouse airway epithelium indicated a highly patterned distribution along apical cell surface, the base of cilia and the periciliary membrane (FIG. 3d). In mice exposed to cigarette smoke for 6 months, this ANT patterning was disrupted with less organized ANT distribution compared to air-treated control mice (FIG. 3d). The ciliary distribution of ANT1 was not a generalized localization pattern as non-motile cilia of the olfactory epithelium in mice did not have ciliary ANT while ANT is present at the apical plasma membrane in the neighboring motile respiratory epithelia in the same mouse tissue sections (FIG. 10c). To further demonstrate the presence of ANT1 and ANT2 at cilia, we utilized immuno-gold electron microscopy (EM) to visualize the sub-cellular localization of ANT1-GFP and ANT2-GFP in primary human ciliated airway epithelium. Both ANT1-GFP and ANT2-GFP localized to the ciliary plasma membrane in normal primary human ciliated epithelial cultures (FIG. 10d, e). Control adenoviral GFP does not localize to cilia (FIG. 10d).

ANT2 Enhances Airway Surface Hydration and Ciliary Beat Frequency

At mitochondria, ANT transports ADP and ATP. The discovery of non-mitochondrial ANT at the cellular membrane suggests that ANT may also regulate ATP at the plasma and ciliary membrane. Cilia depend on ATP, not only for energy, but also as signaling molecules to influence airway surface liquid (ASL) hydration. This ASL hydration is important for reduction of mucus viscoelasticity, mucus clearance, and proper ciliary function, which are impacted by cigarette smoke and dysfunctional in COPD. However, how extracellular ATP arrives on that surface of the cell is largely unknown although a role for ATP transport via membrane bound pannexin has been implicated in normal airways. The presence of ANT at the ciliary membrane provides a possible mechanism for ATP flux at the airway surface thereby affecting ASL.

Figure 4:
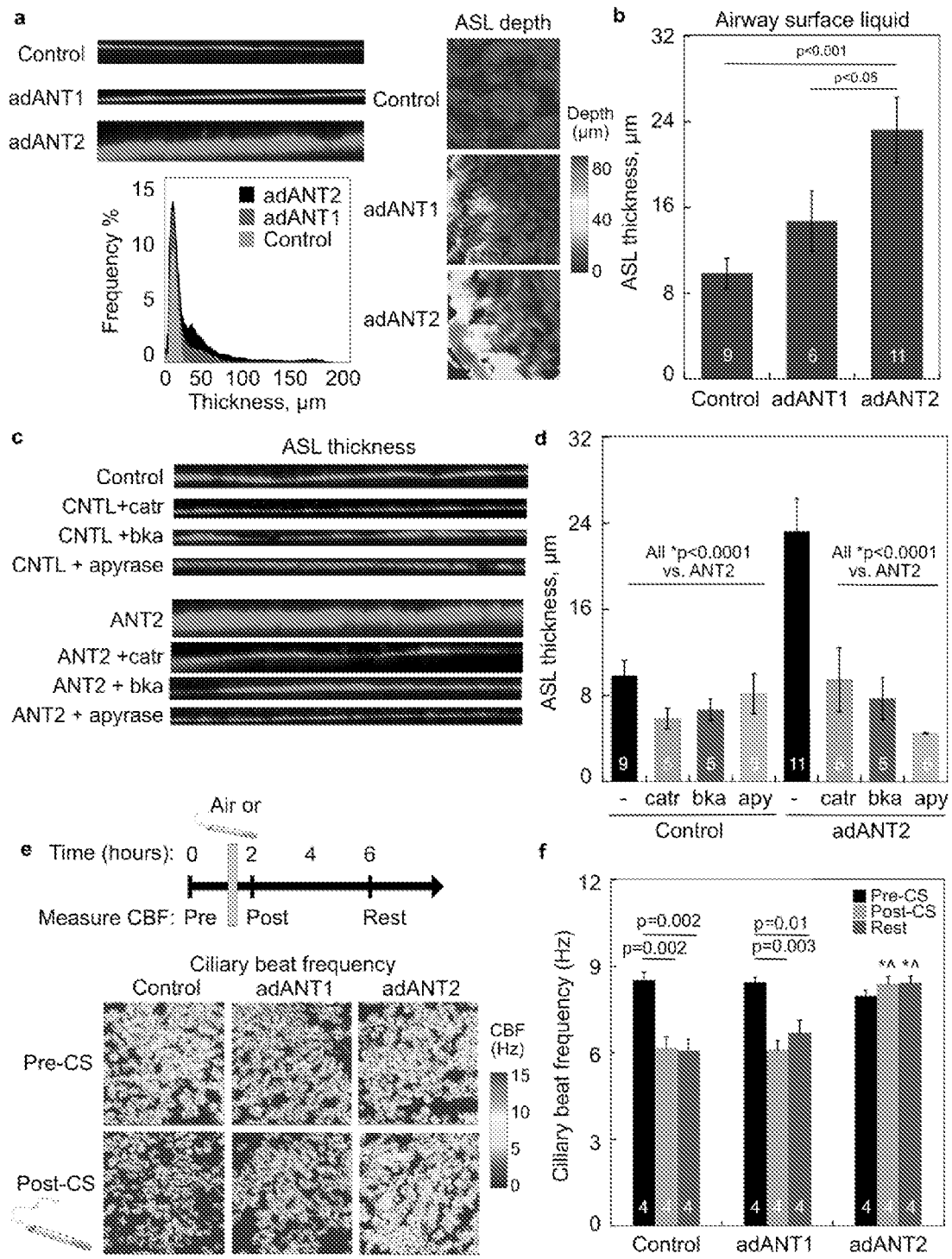
FIG. 4A-4F: ANT2 enhances ASL hydration and preserves ciliary beat frequency after cigarette smoke. a) Representative z-stack orthogonal views of NHBE ASL with heat maps. b) ASL for ANT overexpression. c) Representative ASL orthogonal views and d) ASL for ANT2 overexpression with PBS vehicle, 20 μM CATR, 4 μM BKA or apyrase. CBF measured in NHBEs: pre-treatment (air or CS), 30-minutes post-treatment or 4 hour rest. e) CBF heat maps f) CBF for CS-treated NHBEs. Data show mean±SEM. "n" on bars equals # of ALI inserts over 2-4 days. Statistics by ANOVA, *p<0.05.
Figure 5:
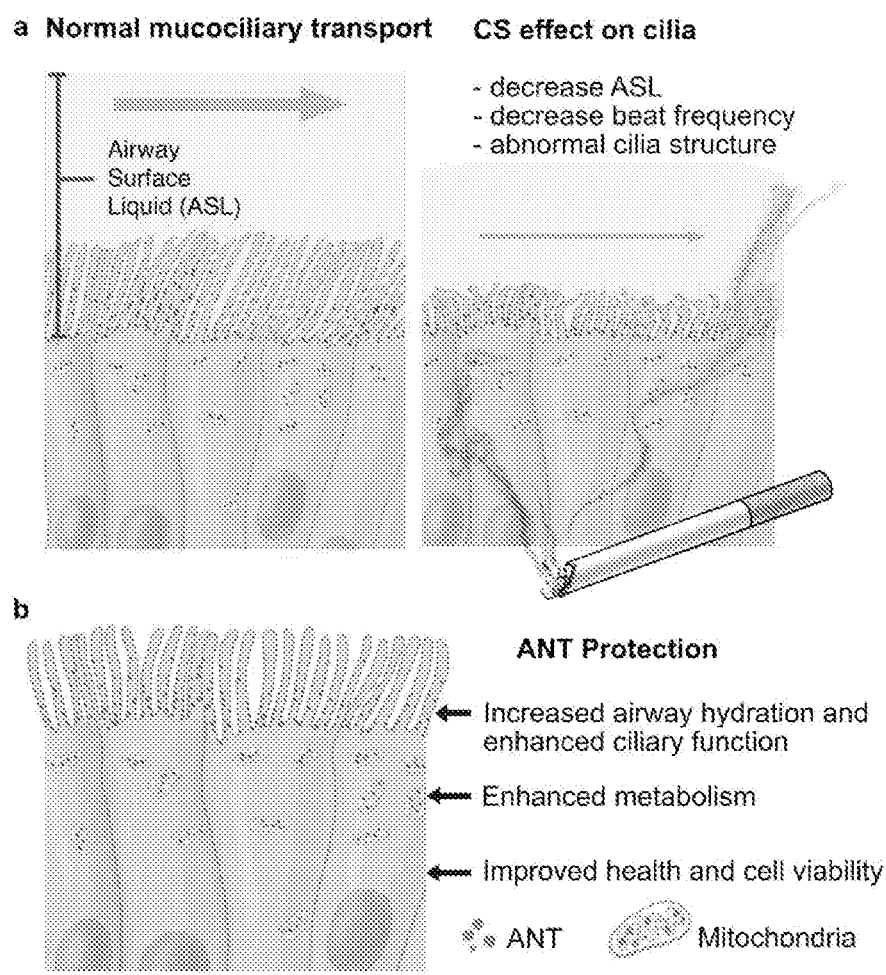
FIG. 5A-5B: ANT localizes to motile cilia where ANT2 is utilized to regulate airway surface hydration and preserve ciliary function. a) Normal mucociliary transport requires a delicate balance of airway surface hydration and ciliary beating to move mucus and particulates out of the lungs. Cigarette smoke leads to decreased ASL15, decreased ciliary beat frequency (current data and 18) and shortened cilia12, 17; which contribute to reduced mucociliary clearance and development of lung disease. b) ANT2 protects human airway epithelium from CS-induced injury by increasing airway surface hydration through ATP regulation, preserving ciliary beat frequency, enhancing metabolism and maintaining cell viability.
Figure 11A:
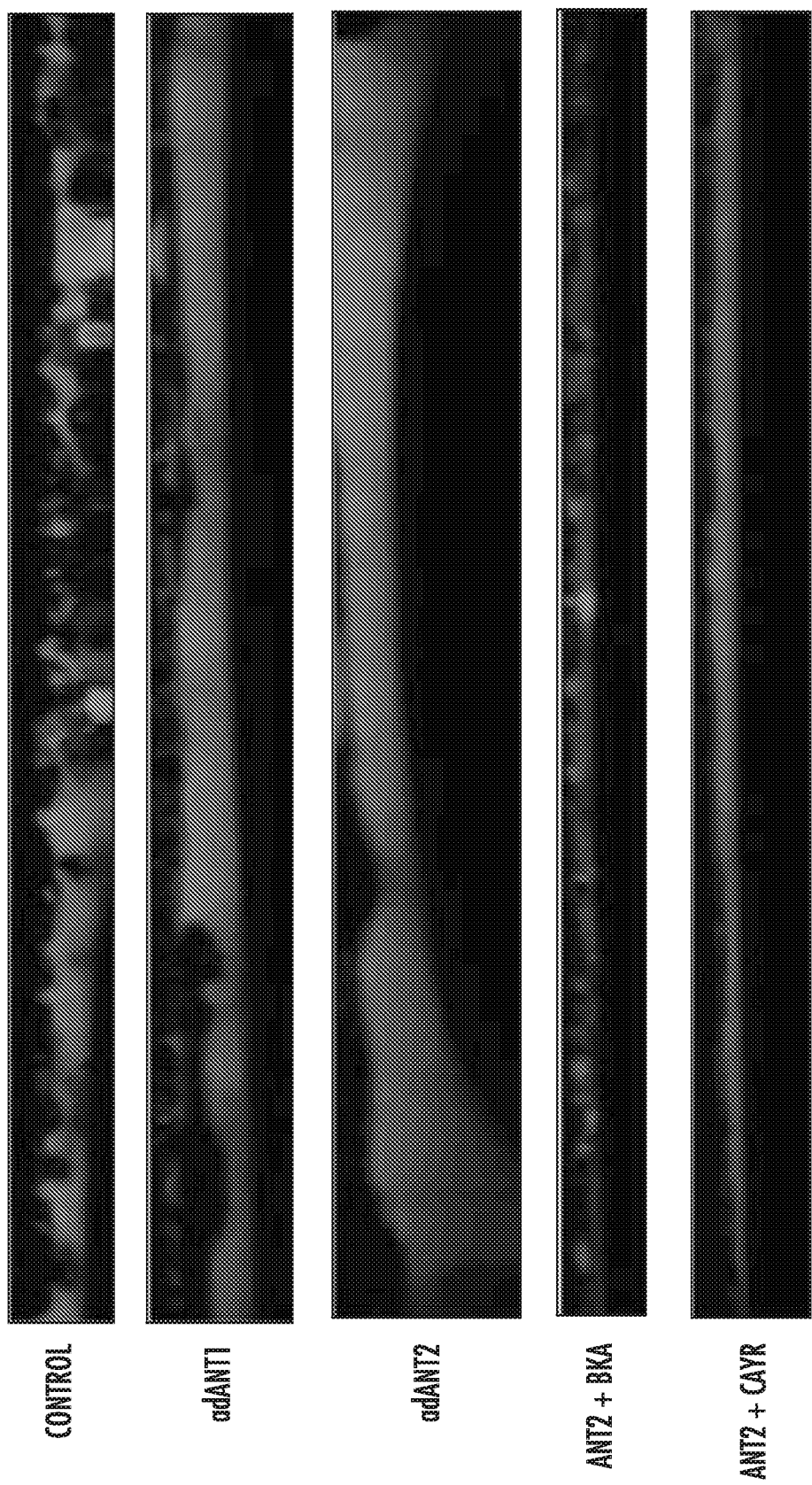
FIG. 11A-11E: ASL and CBF a) ASL was assessed in HBEKTs using a Texas Red dye with representative z-stack orthogonal views shown. b) ASL thickness for control, ANT1, or ANT2 overexpression in HBEKTs with PBS vehicle, 20-04 CATR, or 4-04 BKA treatment. c) CBF histograms from CS treated NHBE cells. d) CBF heat maps and e) CBF data for air-treated NHBE cells. Data show mean±SEM and the "n" depicted on the bars equals the # of individual ALI inserts. Experiments are a compilation of insert data from 2-4 different days. Statistical analysis by ANOVA with $p<0.05$ as significant.
Figure 11B:
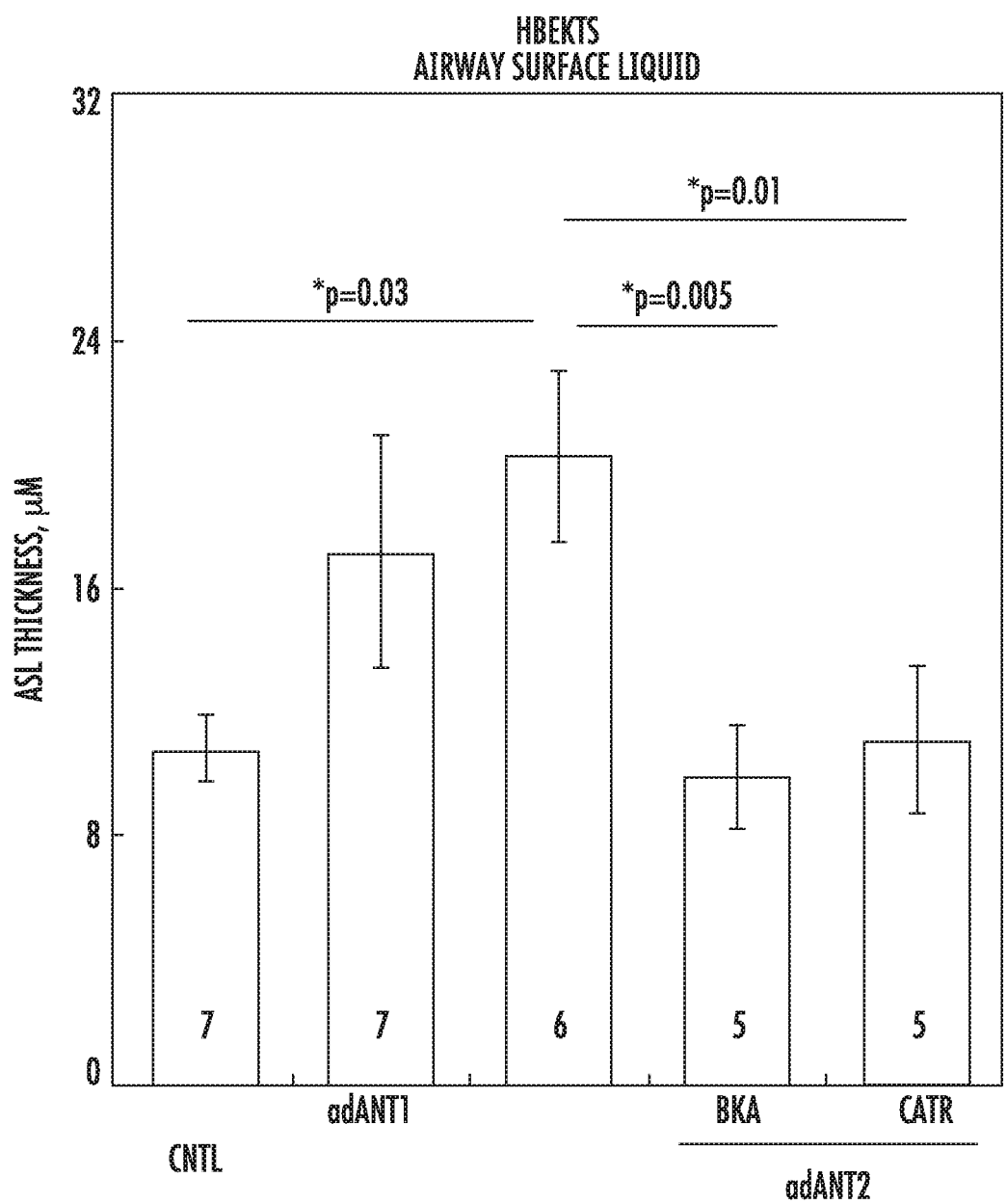
Figure 11C:
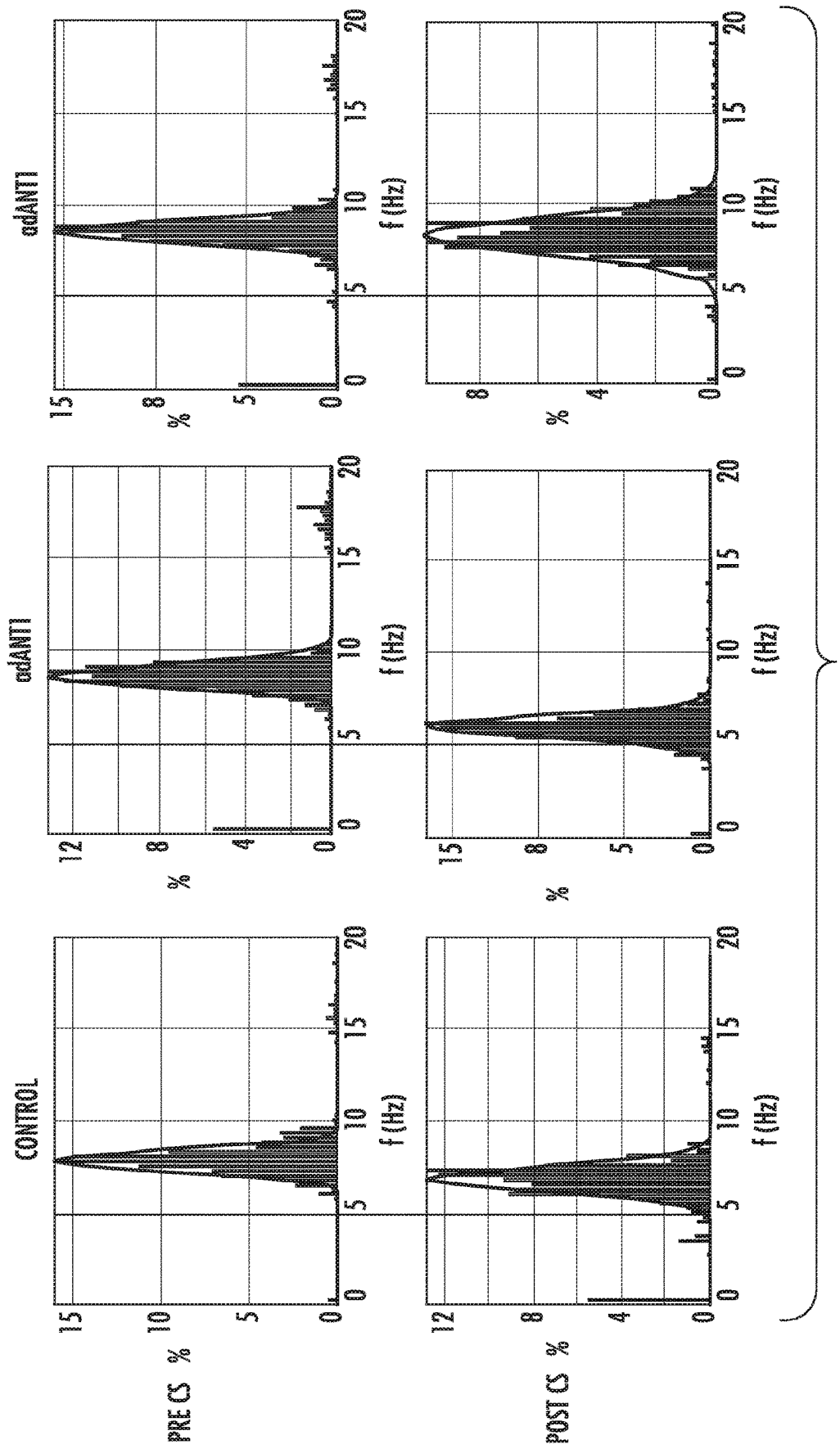
Figure 11D:
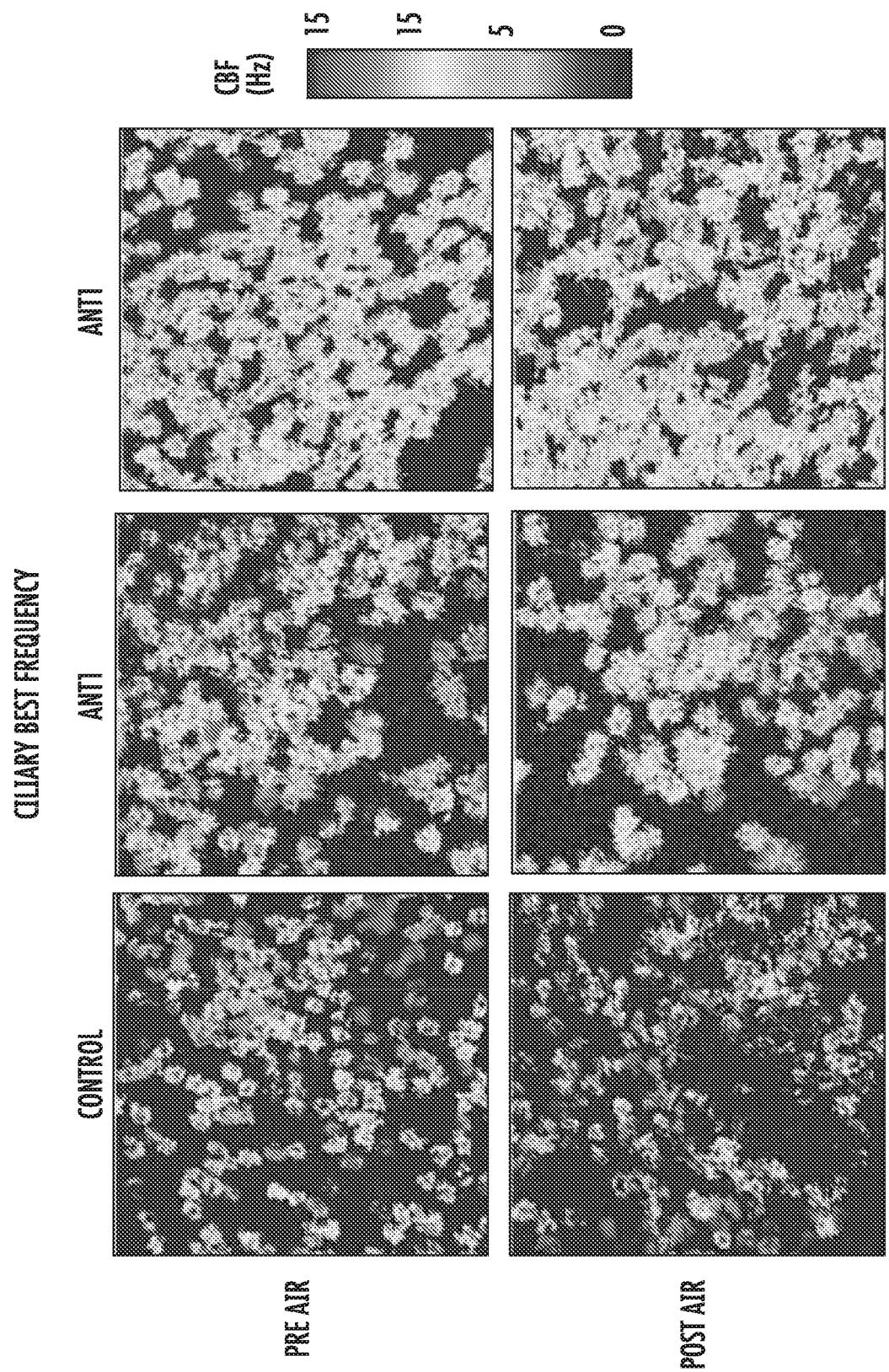
Figure 11E:
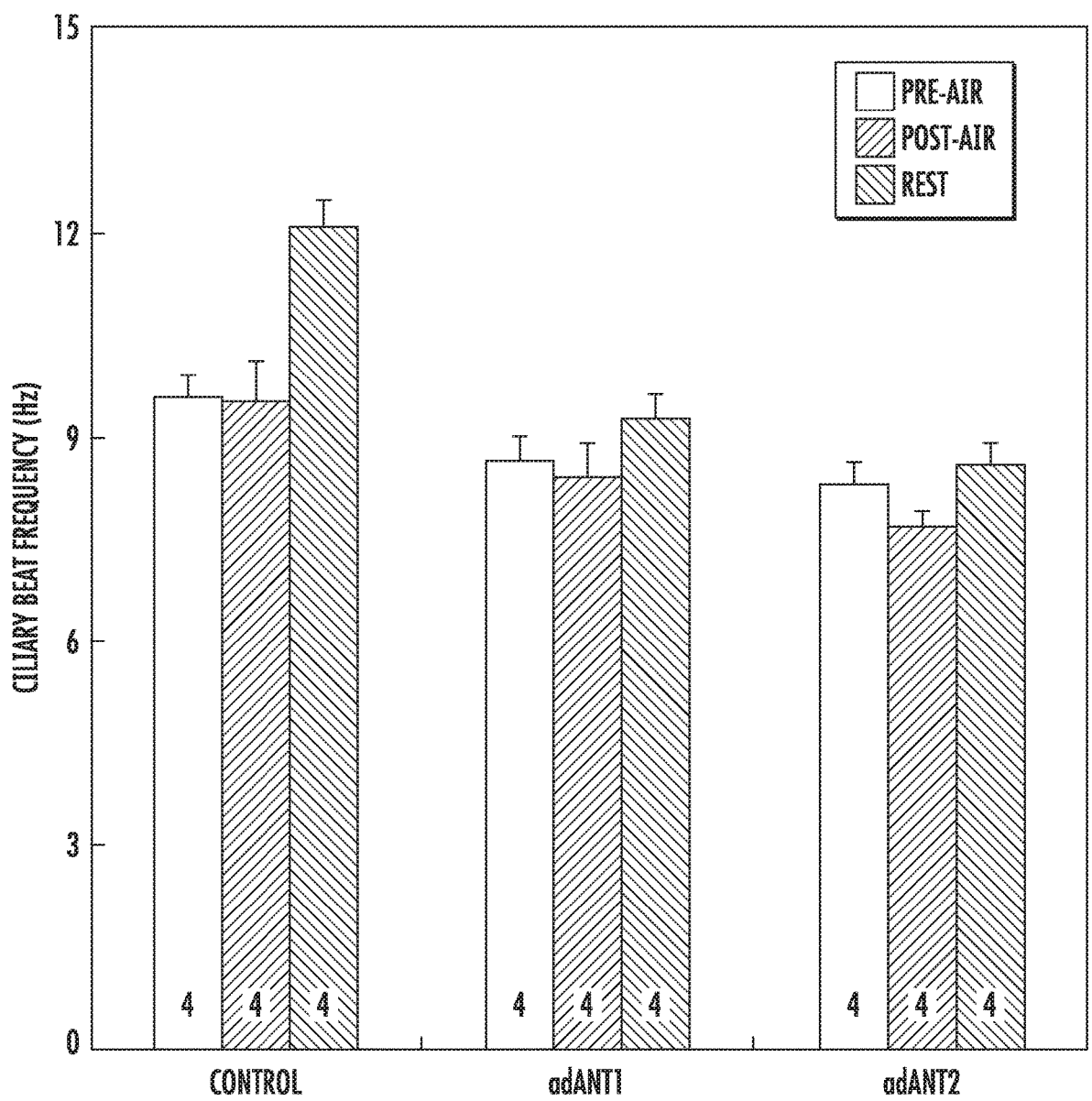
Figure 12:
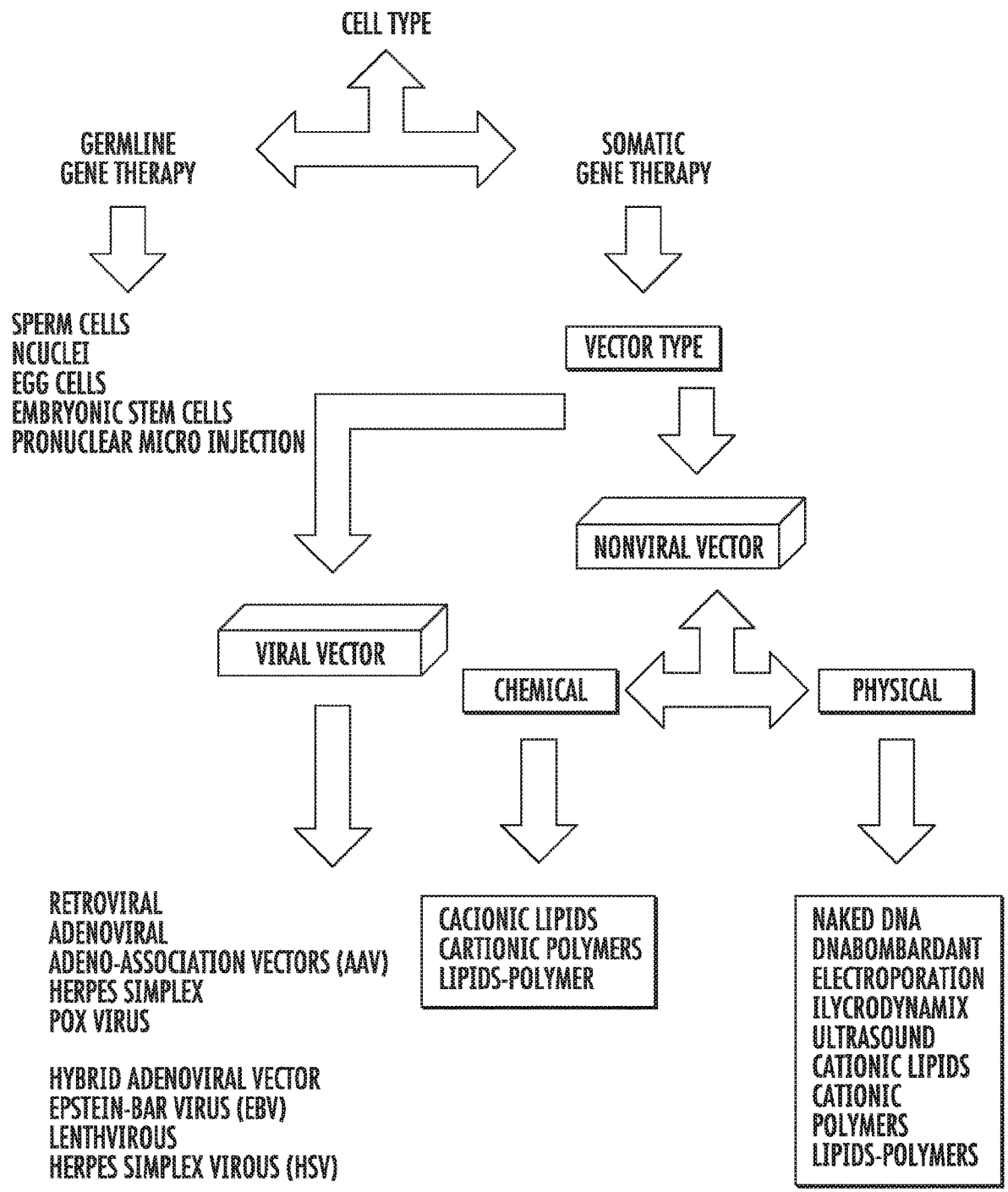
FIG. 12: Different Gene Delivery Systems. Gene delivery may be utilized in the delivery of an ANT gene by one or more viral vectors and nonviral vectors, as examples, to a specific site in the respiratory tract.

Therefore, the inventors utilized primary ciliated normal human bronchial epithelial cells (NHBEs) and HBEKTs grown at air-liquid interface (ALI) to determine the impact of ANT on airway surface liquid (ASL) thickness and ciliary beat frequency in cells over-expressing ANT1 and ANT2. The primary NHBEs differentiate to generate cilia under ALI conditions, recapitulating the human airway. ANT2 overexpression in NHBEs resulted in a 2.3-fold increase in ASL thickness compared to control and ANT1 (FIG. 4a, b). Furthermore, this increase in ASL is abrogated by treatment with BKA (a cell membrane-permeable ANT inhibitor) and CATR (a cell membrane-impermeable ANT inhibitor) (FIG. 4c, d), suggesting that membrane localized ANT2 regulates the enhanced ASL. In addition, treatment with apyrase to remove ATP reversed the change in ASL with ANT2 overexpression. In control virus-treated cells treated with CATR, there is a trend towards decreasing ASL suggesting that endogenous ANT may mediate basal ASL homeostasis in the airway. ANT2 also enhances ASL height in HBEKT cells, a non-ciliated bronchial cell line (FIG. 11a, b), a response which is abolished by treatment with BKA and CATR. This observation emphasizes that ANT2's impact on ASL is not specifically dependent upon its ciliary distribution, just its plasma membrane localization. Literature suggests that ATP levels in the extracellular ASL of airway epithelial cells are ~4-10 nM, which when compared to the ~8 mM total intracellular ATP we measured for HBEKT cells, results in a ~$10^5$-$10^6$-fold concentration gradient across the plasma membrane (FIG. 7b). This is much steeper than the gradients of nearly all other ions involved in the chemiosmotic cycle. With such a steep gradient, different regulatory mechanisms likely modulate ATP movement through transporters such as the ANTs at the plasma membrane versus at the mitochondrial membrane. ANT2 overexpression also protects ciliated airway epithelial cells from a reduction in ciliary beat frequency (CBF) caused by exposure to acute cigarette smoke (FIG. 4e, f; also see FIG. 11c) which persists after a rest period. ANT overexpression does not alter baseline CBF and air exposure alone does not significantly alter CBF in all groups (FIG. 11d, e). Videos are available of ciliary beating pre- and post-CS exposure for control, ANT1 and ANT2 overexpression cells are provided.

By developing a powerful model organism platform extending from *Dictyostelium discoideum* to human lung disease, the inventors have discovered that the canonical inner mitochondrial membrane protein adenine nucleotide translocase (ANT) plays a central function in airway epithelial biology. Namely, ANT provides multiple roles, including protection of cell viability, promotion of airway hydration, and preservation of ciliary function (FIG. 6). Prior studies suggest an important role for mitochondrial dysfunction in lung disease in general. Here, the inventors discovered by manipulating ANT expression, they are able to steer cell metabolism towards a more energetic state, which allows cells to withstand injury and prevent subsequent cell death in the setting of insults such as cigarette smoke. ANT's metabolic role may be primarily responsible for this protection because ANT (AncA) can protect the growth of *Dictyostelium* cells, which do not have cilia and no apparent plasma membrane-based population of ANT.

Classically, ANTs are translated in the cytoplasm and imported to the inner mitochondrial membrane where they transport ADP and ATP, with ANT2 being capable of bidirectional transport. However, the inventors surprisingly discovered that ANT1 and ANT2 are also present in the plasma membrane and motile cilia of the airway epithelium. These observations are based upon five major lines of evidence: 1. Immunocytochemistry and immunohistochemistry with a library of anti-ANT1 and anti-ANT2 antibodies; 2. Expression of ANT-GFP fusion proteins in primary airway epithelial cells; 3. Immuno-gold electron microscopy; 4. Fractionation and western analysis of ciliary axonemes; and 5. Inhibition of airway surface liquid layer thickness modulation with a cell impermeable ANT inhibitor (CATR). All of these conceptually distinct approaches lead to the same conclusion, which is that a population of ANT1 and ANT2 reside at the plasma membrane and motile cilia where they modulate ASL and ciliary function.

For this plasma membrane localization, both ANT1 and ANT2 have predicted secretion signal sequences, which could be the basis for plasma membrane insertion. One prior study using a proteomics approach identified ANT1 as a potential interactor with UBXD8 (FAF2), a ciliary protein [4]. Our discovery of ANT at the plasma membrane shows that ANT has important non-mitochondrial functions in primary airway epithelium. ANT2 in particular has a protective role in airway hydration and ciliary beating, two key components of mucociliary clearance that are abnormal when COPD develops in the lung. In further support of the key role of ANT2 in airway biology and COPD, we find that slc25a5 (ANT2) gene expression is reduced in the lungs of COPD subjects from separate human tissue cohorts, specifically in human ciliated airway epithelial cells from smokers, and a mouse model of smoke exposure.

Mucociliary clearance (MCC) is critical for removal of toxins, inhaled particulates, and bacteria from the airway, and maintenance of mucus homeostasis is the first line of defense in the lower respiratory tract. The efficiency of MCC depends on the hydration status of the airway surface liquid, the ciliary beat frequency, and having appropriate mucus production. Insults such as chronic cigarette smoke exposure lead to decreased ASL levels, reduced ciliary beat frequency, and abnormal cilia (FIG. 6a). These functions are disrupted in airway diseases from COPD to cystic fibrosis. The inventors propose that ANT2 resides at cilia to regulate airway hydration by transporting ATP to the extracellular surface, where it can then stimulate P2Y receptors and downstream signaling for ion channel regulation.

Figure 6B:
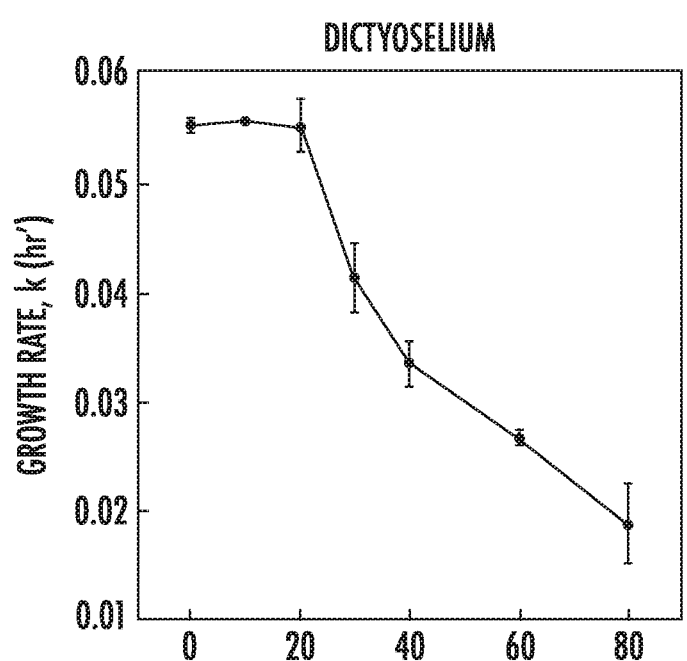
Figure 6D:
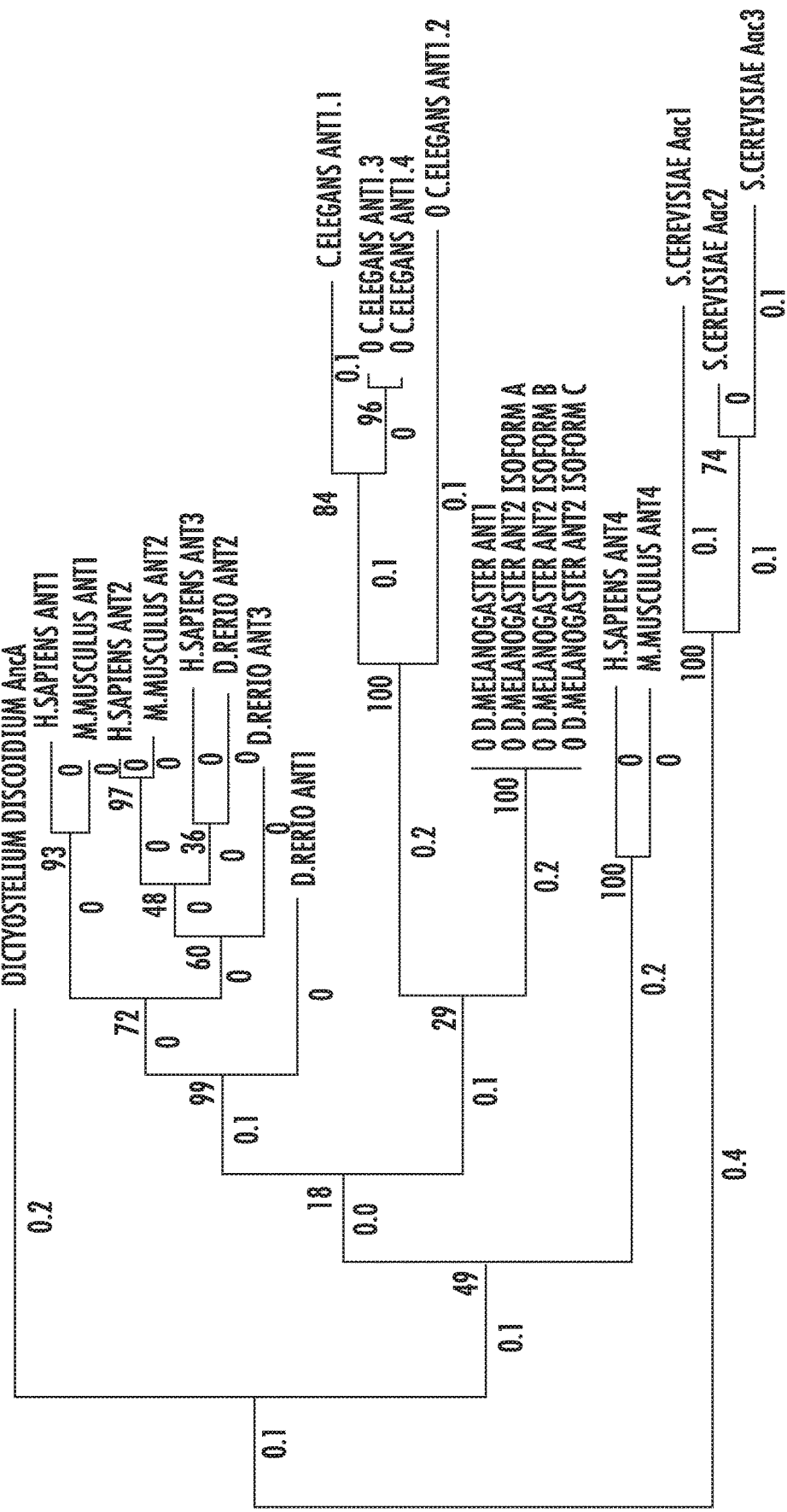
Figure 6G:
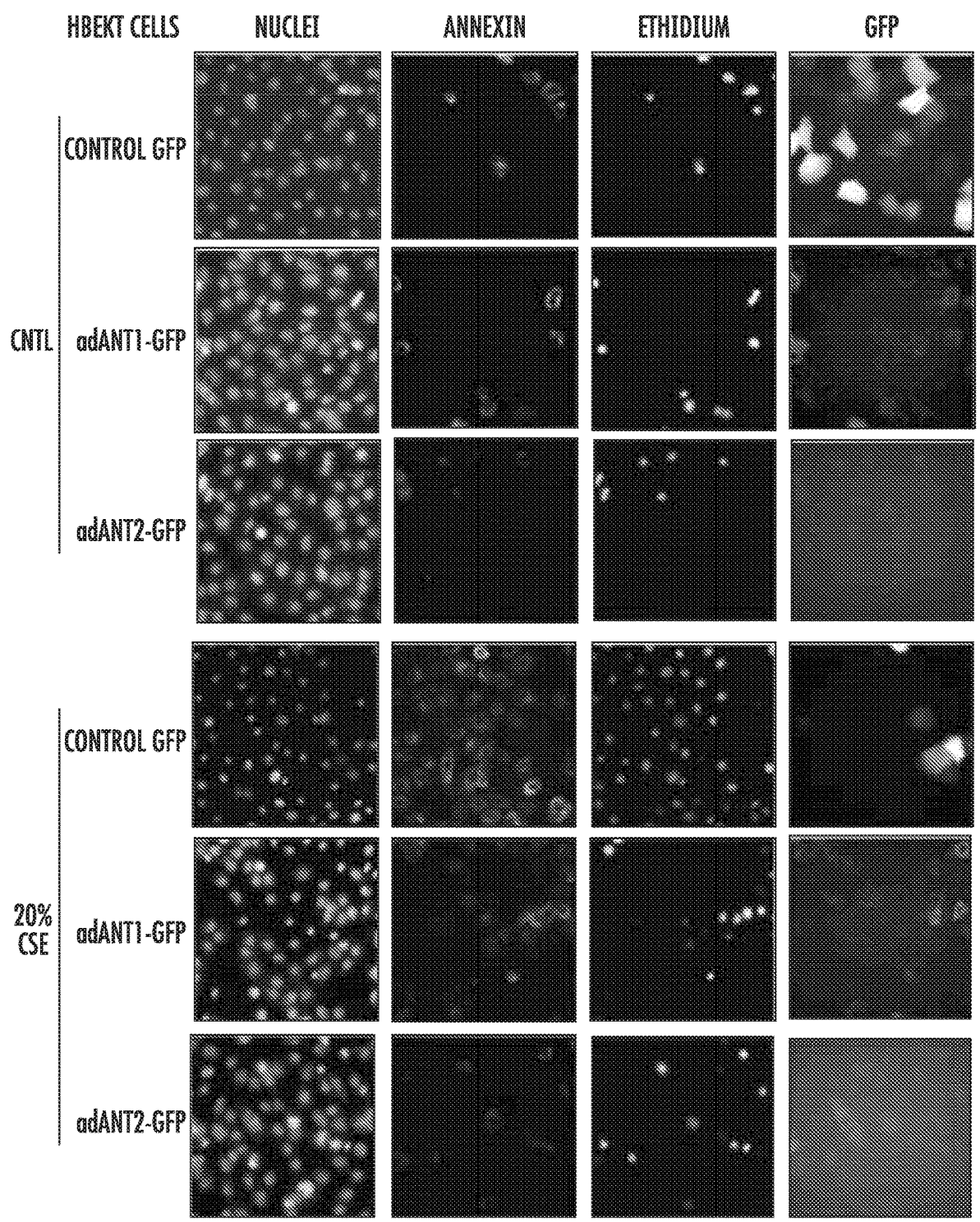

In summary, ANT2 provides a powerful strategy for manipulating ciliary function through both airway surface hydration and preservation of ciliary beating (FIG. 6b). This dynamic interplay between hydration of ciliated epithelial surfaces and coordinated ciliary beating is important for efficient clearance of mucus and particulates out of the lungs. The roles of ANT, most prominently ANT2, in cellular metabolism, epithelial surface hydration and ciliary function will likely have broad applicability and impact in a variety of other lung diseases (such as cystic fibrosis).

Embodiments of the disclosure concern methods and/or compositions for treating and/or preventing a lung disease in which modulation ANT is directly or indirectly related. In certain embodiments, individuals with a lung disease such as cystic fibrosis or COPD are treated with a modulator of the ANT, and in specific embodiments an individual with COPD is provided a modulator of expression of ANT 1, ANT 2, or combination thereof, thereby enhancing the expression of ANT compared to a reference subject not administered the modulator of ANT.

In certain embodiments, the level to which an inducer of ANT increases ANT expression may be any level so long as it provides amelioration of at least one symptom of a lung disorder, including cystic fibrosis or COPD. The level of expression may increase by at least 2, 3, 4, 5, 10, 25, 50, 100, 1000, or more fold expression compared to the level of expression in a standard, in at least some cases. An individual may monitor expression levels of ANT expression using standard methods in the art, such as northern assays or quantitative PCR, for example.

An individual known to have a lung disorder, suspected of having a lung disorder, or at risk for having a lung disorder may be provided an effective amount of an agent such as an inducer of ANT expression, an agent that enhances the amount of ANT protein in the lung (such as ANT or a functional part thereof), or an agent that enhances the enzymatic activity of ANT. Those at risk for a lung disorder may be those individuals having one or more genetic factors, may be of advancing age, and/or may have a family history, for example.

In particular embodiments of the disclosure, an individual is given an agent for a lung disorder in addition to the one or more agents of the present invention that induce ANT expression, enhances the amount of ANT protein in the lung (such as ANT or a functional part thereof), or enhances the enzymatic activity of ANT when compared to a reference subject not receiving the agent. When combination therapy is employed with one or more agents of the present invention, the additional therapy may be given prior to, at the same time as, and/or subsequent to the one or more agents of the present invention.

Pharmaceutical Preparations

Pharmaceutical compositions of the present invention comprise an effective amount an agent such as an inducer of ANT expression, an agent that enhances the amount of ANT protein in the lung (such as ANT or a functional part thereof), or an agent that enhances the enzymatic activity of ANT, dissolved or dispersed in a pharmaceutically acceptable carrier. The phrases "pharmaceutical or pharmacologically acceptable" refers to molecular entities and compositions that do not produce an adverse, allergic or other untoward reaction when administered to an animal, such as, for example, a human, as appropriate. The preparation of a pharmaceutical composition that comprises at least one an agent such as an inducer of ANT expression, an agent that enhances the amount of ANT protein in the lung (such as ANT or a functional part thereof), or an agent that enhances the enzymatic activity of ANT, or additional active ingredient will be known to those of skill in the art in light of the present disclosure, as exemplified by Remington: The Science and Practice of Pharmacy, $21^{st}$ Ed. Lippincott Williams and Wilkins, 2005, incorporated herein by reference. Moreover, for animal (e.g., human) administration, it will be understood that preparations should meet sterility, pyrogenicity, general safety and purity standards as required by FDA Office of Biological Standards.

As used herein, "pharmaceutically acceptable carrier" includes any and all solvents, dispersion media, coatings, surfactants, antioxidants, preservatives (e.g., antibacterial agents, antifungal agents), isotonic agents, absorption delaying agents, salts, preservatives, drugs, drug stabilizers, gels, binders, excipients, disintegration agents, lubricants, sweetening agents, flavoring agents, dyes, such like materials and combinations thereof, as would be known to one of ordinary skill in the art (see, for example, Remington's Pharmaceutical Sciences, 18th Ed. Mack Printing Company, 1990, pp. 1289-1329, incorporated herein by reference). Except insofar as any conventional carrier is incompatible with the active ingredient, its use in the pharmaceutical compositions is contemplated.

An agent of the present invention may comprise different types of carriers depending on whether it is to be administered in solid, liquid or aerosol form, and whether it need to be sterile for such routes of administration as injection. The present compositions can be administered intravenously, intradermally, transdermally, intrathecally, intraarterially, intraperitoneally, intranasally, intravaginally, intrarectally, topically, intramuscularly, subcutaneously, mucosally, orally, topically, locally, inhalation (e.g., aerosol inhalation), injection, infusion, continuous infusion, localized perfusion bathing target cells directly, via a catheter, via a lavage, in cremes, in lipid compositions (e.g., liposomes), or by other method or any combination of the forgoing as would be known to one of ordinary skill in the art (see, for example, Remington's Pharmaceutical Sciences, 18th Ed. Mack Printing Company, 1990, incorporated herein by reference).

An agent of the present invention may be formulated into a composition in a free base, neutral or salt form. Pharmaceutically acceptable salts, include the acid addition salts, e.g., those formed with the free amino groups of a proteinaceous composition, or which are formed with inorganic acids such as for example, hydrochloric or phosphoric acids, or such organic acids as acetic, oxalic, tartaric or mandelic acid. Salts formed with the free carboxyl groups can also be derived from inorganic bases such as for example, sodium, potassium, ammonium, calcium or ferric hydroxides; or such organic bases as isopropylamine, trimethylamine, histidine or procaine. Upon formulation, solutions will be administered in a manner compatible with the dosage formulation and in such amount as is therapeutically effective. The formulations are easily administered in a variety of dosage forms such as formulated for parenteral administrations such as injectable solutions, or aerosols for delivery to the lungs, or formulated for alimentary administrations such as drug release capsules and the like.

Further in accordance with the present disclosure, the composition of the present invention suitable for administration is provided in a pharmaceutically acceptable carrier with or without an inert diluent. The carrier should be assimilable and includes liquid, semi-solid, i.e., pastes, or solid carriers. Except insofar as any conventional media, agent, diluent or carrier is detrimental to the recipient or to the therapeutic effectiveness of a composition contained therein, its use in administrable composition for use in practicing the methods of the present invention is appropriate. Examples of carriers or diluents include fats, oils, water, saline solutions, lipids, liposomes, resins, binders, fillers and the like, or combinations thereof. The composition may also comprise various antioxidants to retard oxidation of one or more component. Additionally, the prevention of the action of microorganisms can be brought about by preservatives such as various antibacterial and antifungal agents, including but not limited to parabens (e.g., methylparabens, propylparabens), chlorobutanol, phenol, sorbic acid, thimerosal or combinations thereof.

In accordance with the present invention, the composition is combined with the carrier in any convenient and practical manner, i.e., by solution, suspension, emulsification, admixture, encapsulation, absorption and the like. Such procedures are routine for those skilled in the art.

In a specific embodiment of the present invention, the composition is combined or mixed thoroughly with a semi-solid or solid carrier. The mixing can be carried out in any convenient manner such as grinding. Stabilizing agents can be also added in the mixing process in order to protect the composition from loss of therapeutic activity, i.e., denaturation in the stomach. Examples of stabilizers for use in an the composition include buffers, amino acids such as glycine and lysine, carbohydrates such as dextrose, mannose, galactose, fructose, lactose, sucrose, maltose, sorbitol, mannitol, etc.

In further embodiments, the present invention may concern the use of a pharmaceutical lipid vehicle compositions that include one or more agents of the present invention, one or more lipids, and an aqueous solvent. As used herein, the term "lipid" will be defined to include any of a broad range of substances that is characteristically insoluble in water and extractable with an organic solvent. This broad class of compounds are well known to those of skill in the art, and as the term "lipid" is used herein, it is not limited to any particular structure. Examples include compounds which contain long-chain aliphatic hydrocarbons and their derivatives. A lipid may be naturally occurring or synthetic (i.e., designed or produced by man). However, a lipid is usually a biological substance. Biological lipids are well known in the art, and include for example, neutral fats, phospholipids, phosphoglycerides, steroids, terpenes, lysolipids, glycosphingolipids, glycolipids, sulphatides, lipids with ether and ester-linked fatty acids and polymerizable lipids, and combinations thereof. Of course, compounds other than those specifically described herein that are understood by one of skill in the art as lipids are also encompassed by the compositions and methods of the present invention.

One of ordinary skill in the art would be familiar with the range of techniques that can be employed for dispersing a composition in a lipid vehicle. For example, an agent of the present invention may be dispersed in a solution containing a lipid, dissolved with a lipid, emulsified with a lipid, mixed with a lipid, combined with a lipid, covalently bonded to a lipid, contained as a suspension in a lipid, contained or complexed with a micelle or liposome, or otherwise associated with a lipid or lipid structure by any means known to those of ordinary skill in the art. The dispersion may or may not result in the formation of liposomes.

The actual dosage amount of a composition of the present invention administered to an animal patient can be determined by physical and physiological factors such as body weight, severity of condition, the type of disease being treated, previous or concurrent therapeutic interventions, idiopathy of the patient and on the route of administration. Depending upon the dosage and the route of administration, the number of administrations of a preferred dosage and/or an effective amount may vary according to the response of the subject. The practitioner responsible for administration will, in any event, determine the concentration of active ingredient(s) in a composition and appropriate dose(s) for the individual subject.

In certain embodiments, pharmaceutical compositions may comprise, for example, at least about 0.1% of an active compound, or agent. In other embodiments, the active compound may comprise between about 2% to about 75% of the weight of the unit, or between about 25% to about 60%, for example, and any range derivable therein. Naturally, the amount of active compound(s), or agents of the present invention, in each therapeutically useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In other non-limiting examples, a dose may also comprise from about 1 microgram/kg/body weight, about 5 microgram/kg/body weight, about 10 microgram/kg/body weight, about 50 microgram/kg/body weight, about 100 microgram/kg/body weight, about 200 microgram/kg/body weight, about 350 microgram/kg/body weight, about 500 microgram/kg/body weight, about 1 milligram/kg/body weight, about 5 milligram/kg/body weight, about 10 milligram/kg/body weight, about 50 milligram/kg/body weight, about 100 milligram/kg/body weight, about 200 milligram/kg/body weight, about 350 milligram/kg/body weight, about 500 milligram/kg/body weight, to about 1000 mg/kg/body weight or more per administration, and any range derivable therein. In non-limiting examples of a derivable range from the numbers listed herein, a range of about 5 mg/kg/body weight to about 100 mg/kg/body weight, about 5 microgram/kg/body weight to about 500 milligram/kg/body weight, etc., can be administered, based on the numbers described above.

Alimentary Compositions and Formulations

In one embodiment of the present disclosure, one or more agents of the present invention are formulated to be administered via an alimentary route. Alimentary routes include all possible routes of administration in which the composition is in direct contact with the alimentary tract. Specifically, the pharmaceutical compositions disclosed herein may be administered orally, buccally, rectally, or sublingually. As such, these compositions may be formulated with an inert diluent or with an assimilable edible carrier, or they may be enclosed in hard- or soft-shell gelatin capsule, or they may be compressed into tablets, or they may be incorporated directly with the food of the diet.

In certain embodiments, the active compounds may be incorporated with excipients and used in the form of ingestible tablets, buccal tables, troches, capsules, elixirs, suspensions, syrups, wafers, and the like (Mathiowitz et al., 1997; Hwang et al., 1998; U.S. Pat. Nos. 5,641,515; 5,580,579 and 5,792,451, each specifically incorporated herein by reference in its entirety). The tablets, troches, pills, capsules and the like may also contain the following: a binder, such as, for example, gum tragacanth, acacia, cornstarch, gelatin or combinations thereof; an excipient, such as, for example, dicalcium phosphate, mannitol, lactose, starch, magnesium stearate, sodium saccharine, cellulose, magnesium carbonate or combinations thereof; a disintegrating agent, such as, for example, corn starch, potato starch, alginic acid or combinations thereof; a lubricant, such as, for example, magnesium stearate; a sweetening agent, such as, for example, sucrose, lactose, saccharin or combinations thereof; a flavoring agent, such as, for example peppermint, oil of wintergreen, cherry flavoring, orange flavoring, etc. When the dosage unit form is a capsule, it may contain, in addition to materials of the above type, a liquid carrier. Various other materials may be present as coatings or to otherwise modify the physical form of the dosage unit. For instance, tablets, pills, or capsules may be coated with shellac, sugar, or both. When the dosage form is a capsule, it may contain, in addition to materials of the above type, carriers such as a liquid carrier. Gelatin capsules, tablets, or pills may be enterically coated. Enteric coatings prevent denaturation of the composition in the stomach or upper bowel where the pH is acidic. See, e.g., U.S. Pat. No. 5,629,001. Upon reaching the small intestines, the basic pH therein dissolves the coating and permits the composition to be released and absorbed by specialized cells, e.g., epithelial enterocytes and Peyer's patch M cells. A syrup of elixir may contain the active compound sucrose as a sweetening agent methyl and propylparabens as preservatives, a dye and flavoring, such as cherry or orange flavor. Of course, any material used in preparing any dosage unit form should be pharmaceutically pure and substantially non-toxic in the amounts employed. In addition, the active compounds may be incorporated into sustained-release preparation and formulations.

For oral administration the compositions of the present disclosure may alternatively be incorporated with one or more excipients in the form of a mouthwash, dentifrice, buccal tablet, oral spray, or sublingual orally-administered formulation. For example, a mouthwash may be prepared incorporating the active ingredient in the required amount in an appropriate solvent, such as a sodium borate solution (Dobell's Solution). Alternatively, the active ingredient may be incorporated into an oral solution such as one containing sodium borate, glycerin and potassium bicarbonate, or dispersed in a dentifrice, or added in a therapeutically-effective amount to a composition that may include water, binders, abrasives, flavoring agents, foaming agents, and humectants. Alternatively the compositions may be fashioned into a tablet or solution form that may be placed under the tongue or otherwise dissolved in the mouth.

Additional formulations which are suitable for other modes of alimentary administration include suppositories. Suppositories are solid dosage forms of various weights and shapes, usually medicated, for insertion into the rectum. After insertion, suppositories soften, melt or dissolve in the cavity fluids. In general, for suppositories, traditional carriers may include, for example, polyalkylene glycols, triglycerides or combinations thereof. In certain embodiments, suppositories may be formed from mixtures containing, for example, the active ingredient in the range of about 0.5% to about 10%, and preferably about 1% to about 2%.

Parenteral Compositions and Formulations

In further embodiments, one or more agents of the present invention may be administered via a parenteral route. As used herein, the term "parenteral" includes routes that bypass the alimentary tract. Specifically, the pharmaceutical compositions disclosed herein may be administered for example, but not limited to intravenously, intradermally, intramuscularly, intraarterially, intrathecally, subcutaneous, or intraperitoneally U.S. Pat. Nos. 6,753,514, 6,613,308, 5,466,468, 5,543,158; 5,641,515; and 5,399,363 (each specifically incorporated herein by reference in its entirety). Solutions of the active compounds as free base or pharmacologically acceptable salts may be prepared in water suitably mixed with a surfactant, such as hydroxypropylcellulose. Dispersions may also be prepared in glycerol, liquid polyethylene glycols, and mixtures thereof and in oils. Under ordinary conditions of storage and use, these preparations contain a preservative to prevent the growth of microorganisms. The pharmaceutical forms suitable for injectable use include sterile aqueous solutions or dispersions and sterile powders for the extemporaneous preparation of sterile injectable solutions or dispersions (U.S. Pat. No. 5,466,468, specifically incorporated herein by reference in its entirety). In all cases the form must be sterile and must be fluid to the extent that easy injectability exists. It must be stable under the conditions of manufacture and storage and must be preserved against the contaminating action of microorganisms, such as bacteria and fungi. The carrier can be a solvent or dispersion medium containing, for example, water, ethanol, polyol (i.e., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous, and intraperitoneal administration. In this connection, sterile aqueous media that can be employed will be known to those of skill in the art in light of the present disclosure. For example, one dosage may be dissolved in isotonic NaCl solution and either added hypodermoclysis fluid or injected at the proposed site of infusion, (see for example, "Remington's Pharmaceutical Sciences" 15th Edition, pages 1035-1038 and 1570-1580). Some variation in dosage will necessarily occur depending on the condition of the subject being treated. The person responsible for administration will, in any event, determine the appropriate dose for the individual subject. Moreover, for human administration, preparations should meet sterility, pyrogenicity, general safety and purity standards as required by FDA Office of Biologics standards.

Sterile injectable solutions are prepared by incorporating the active compounds in the required amount in the appropriate solvent with several of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof. A powdered composition is combined with a liquid carrier such as, e.g., water or a saline solution, with or without a stabilizing agent.

Miscellaneous Pharmaceutical Compositions and Formulations

In other preferred embodiments of the invention, one or more agents of the present invention may be formulated for administration via various miscellaneous routes, for example, topical (i.e., transdermal) administration, mucosal administration (intranasal, vaginal, etc.) and/or inhalation. Pharmaceutical compositions for topical administration may include the active compound formulated for a medicated application such as an ointment, paste, cream or powder. Ointments include all oleaginous, adsorption, emulsion and water-soluble based compositions for topical application, while creams and lotions are those compositions that include an emulsion base only. Topically administered medications may contain a penetration enhancer to facilitate adsorption of the active ingredients through the skin. Suitable penetration enhancers include glycerin, alcohols, alkyl methyl sulfoxides, pyrrolidones and luarocapram. Possible bases for compositions for topical application include polyethylene glycol, lanolin, cold cream and petrolatum as well as any other suitable absorption, emulsion or water-soluble ointment base. Topical preparations may also include emulsifiers, gelling agents, and antimicrobial preservatives as necessary to preserve the active ingredient and provide for a homogenous mixture. Transdermal administration of the present invention may also comprise the use of a "patch". For example, the patch may supply one or more active substances at a predetermined rate and in a continuous manner over a fixed period of time.

In certain embodiments, the pharmaceutical compositions may be delivered by eye drops, intranasal sprays, inhalation, and/or other aerosol delivery vehicles. Methods for delivering compositions directly to the lungs via nasal aerosol sprays has been described e.g., in U.S. Pat. Nos. 5,756,353 and 5,804,212 (each specifically incorporated herein by reference in its entirety). Likewise, the delivery of drugs using intranasal microparticle resins (Takenaga et al., 1998) and lysophosphatidyl-glycerol compounds (U.S. Pat. No. 5,725,871, specifically incorporated herein by reference in its entirety) are also well-known in the pharmaceutical arts. Likewise, transmucosal drug delivery in the form of a polytetrafluoroetheylene support matrix is described in U.S. Pat. No. 5,780,045 (specifically incorporated herein by reference in its entirety). The term aerosol refers to a colloidal system of finely divided solid of liquid particles dispersed in a liquefied or pressurized gas propellant. The typical aerosol of the present invention for inhalation will consist of a suspension of active ingredients in liquid propellant or a mixture of liquid propellant and a suitable solvent. Suitable propellants include hydrocarbons and hydrocarbon ethers. Suitable containers will vary according to the pressure requirements of the propellant. Administration of the aerosol will vary according to subject's age, weight and the severity and response of the symptoms.

Kits of the Disclosure

Any of the compositions described herein may be comprised in a kit. In a non-limiting example, one or more agents of the present inventions (for example, ANT1 and/or ANT 1 proteins, as examples) may be comprised in a kit.

The kits may comprise a suitably aliquoted agent of the present invention and, in some cases, one or more additional agents. The component(s) of the kits may be packaged either in aqueous media or in lyophilized form. The container means of the kits will generally include at least one vial, test tube, flask, bottle, syringe or other container means, into which a component may be placed, and preferably, suitably aliquoted. Where there are more than one component in the kit, the kit also will generally contain a second, third or other additional container into which the additional components may be separately placed. However, various combinations of components may be comprised in a vial. The kits of the present invention also will typically include a means for containing one or more agent of the present invention and any other reagent containers in close confinement for commercial sale. Such containers may include injection or blow-molded plastic containers into which the desired vials are retained.

When the components of the kit are provided in one and/or more liquid solutions, the liquid solution is an aqueous solution, with a sterile aqueous solution being particularly preferred. The one or more agents of the present invention may be formulated into a syringeable composition. In which case, the container means may itself be a syringe, pipette, and/or other such like apparatus, from which the formulation may be applied to an infected area of the body, injected into an animal, and/or even applied to and/or mixed with the other components of the kit. However, the components of the kit may be provided as dried powder (s). When reagents and/or components are provided as a dry powder, the powder can be reconstituted by the addition of a suitable solvent. It is envisioned that the solvent may also be provided in another container means.

EXAMPLES/METHODS

The following Examples/Methods have been included to provide guidance to one of ordinary skill in the art for practicing representative embodiments of the presently disclosed subject matter. In light of the present disclosure and the general level of skill in the art, those of skill can appreciate that the following Examples/Methods are intended to be exemplary only and that numerous changes, modifications, and alterations can be employed without departing from the scope of the presently disclosed subject matter. The following Examples/Methods are offered by way of illustration and not by way of limitation.

Genetic Selection Studies

The *Dictyostelium discoideum* strain used was wild-type cells (Ax3(Rep ORF+7-3)) grown in Hans' enriched HL-5 media (1.4× HL-5, containing 8% FM (ForMedium, Norfolk, UK) plus 60 U/ml penicillin, 60 µg/ml streptomycin sulfate) and selected for plasmid transformations with 15 µg/ml G418. Cells were propagated at 22° C. on 10-cm Petri dish plates. For suspension growth, cells were cultured in 10-ml culture volumes in 125-ml Erlenmeyer flasks at 180 rpm, 22° C. Cell densities were determined by counting cells on a hemocytometer. The expression vector used for the cDNA library was pLD1A15SN with a GFP-pLD1 control vector with a G418 resistance cassette. Transformation of wild-type cells was performed using electroporation using a Gene Pulser (BioRad). Cells were pulsed one time in a 0.4-cm cuvette at 3 pf. After electroporation, the cells were placed in cold Han's enriched HL-5 to allow recovery and grown for 24 hours at 22° C. followed by replacement of media with Han's enriched HL-5 with G418. Media was changed every 2-3 days until clones were harvested. Clones were harvested and subjected to growth selection (a total of 35,000 clones in 35 pools of 1000 independent clones each). Cells were initially cultured at $1\times10^5$ cells per mL in HL-5 supplemented media with G418 alone or with 40% cigarette smoke extract over 3-4 growth cycles. Relative growth rates were determined by counting cells using a hemocytometer. Cell densities were plotted versus time to generate a log phase curve that was exponentially fit using KaleidaGraph (Synergy Software). DNA was isolated from cultures demonstrating a growth advantage in the context of cigarette smoke, using a glass milk protocol. DNA was transformed into STBL2 cells and individual clones were selected for DNA clean-up and restriction endonuclease digestion. Recovered DNA was sequenced using standard procedures. cDNA from recovered clones were transformed into the parent wild-type cells to confirm that the DNA construct could recapitulate the suppression phenotype. Molecular cloning was completed to yield a full length AncA plasmid to confirm that suppression of the growth phenotype in the context of 40% CSE in suspension cultures. Primers for full length AncA used included at 1 µM:

```
forward
                                          (SEQ ID NO: 1)
AAAAAAGTCGACATGTCTAACCAAAAGAAAAACGACGTATCTTCATTTG;

reverse
                                          (SEQ ID NO: 2)
AAAAAAGCGGCCGCTTATTCAGAACCAACACCACC.
```

Human Cell Culture

The human bronchial epithelial cell line (HBEKT, immortalized by Cdk4 and hTERT[3], gift from John Minna) was used for cell viability, metabolic analysis, and airway surface liquid studies. HBEKT cells were maintained in keratinocyte serum free media with supplementation according to Lonza protocol. Cells were split when 80-90% confluent after trypsinization with 0.05% trypsin and neutralization with trypsin neutralizing solution. Cells were verified to be *mycoplasma*-negative and have been authenticated using STR profiling. Primary normal human bronchial epithelial cells (NHBEs from Lonza and MatTek) were cultured on transparent 0.4-µm pore PET transwell inserts (Falcon) that are coated with Type I collagen (50 µg/mL in 0.02N acetic acid). Once a confluent monolayer is formed on the inserts, the apical media is removed and cells are grown at air liquid interface over six to eight weeks for differentiation into ciliated airway epithelium. NHBEs were also attained pre-plated on inserts from Epithelix.

NHBE cells were initially grown in growth media including BEGM media (Lonza) with recommended supplements (bovine pituitary extract, insulin, hydrocortisone, epinephrine, transferrin, recombinant human epidermal growth factor, retinoic acid, triiodothyronine (T3), and gentamicin sulfate amphotericin-B) with additional bovine pituitary extract (12.6 µg/mL, AthenaES), bovine serum albumin (final concentration of 1.5 µg/mL, Sigma-Aldrich), retinoic acid (final concentration of 0.1 µM) and epidermal growth factor (final concentration of 25 ng/mL). When NHBE cells were grown at air liquid interface, basal air liquid interface media was used including BEGM media (Lonza) and DMEM with recommended Lonza supplements (1 supplement pack per 500 mL of media) with additional bovine pituitary extract (12.6 µg/mL, Lonza and AthenaES), bovine serum albumin (final concentration of 1.5 µg/mL, Sigma-Aldrich), and retinoic acid (final concentration of 0.1 µM).

Cigarette Smoke Exposure

Methods used for cigarette smoke exposure include prepared cigarette smoke extract (CSE) or gaseous smoke using a Vitrocell exposure chamber. CSE was made using a peristaltic pump that smoked one research grade cigarette (Tobacco Health Research Institute, University of Kentucky, Lexington, KY) over 6 minutes and bubbled into 25 mL of cell specific media. This is considered 100% CSE and is filtered with a 0.22-µm filter. Doses of CSE from 10-80% were made and used within 6 hours. The Vitrocell smoke exposure chamber was used to exposure NHBE cells at ALI to humidified air or cigarette smoke. A single exposure is considered air for 16 minutes or two cigarettes over sixteen minutes using an ISO standard protocol.

Human Ciliary Axoneme Preparation

Axonemes were isolated from primary human bronchial epithelial cells from two patients without lung disease according to approved IRB protocols at the University of Nebraska Medical Center. Axonemes were collected according to a previously published protocol. An extraction buffer containing 20 mM Tris HCl, 50 mM NaCl, 10 mM calcium chloride, 1 mM EDTA, 7 mM 2-mercaptoethanol, 100 mM Triton X-100, and 1 mM dithiothreitol was utilized to extract the axonemes from ciliated cells grown at air liquid interface. Buffer containing axonemes was filtered through a 100-mm mesh and centrifuged at 17,250×g for 7 min, and the supernatant was removed. The pelleted axonemes were resuspended to a concentration of 1 mg/ml in resuspension buffer consisting of 20 mM Tris HCl, 50 mM KCl, 4 mM MgCl2, 0.5 mM EDTA, 1 mM dithiothreitol, 10 mM soybean trypsin inhibitor, and 25% sucrose by volume.

Targeted Gene Delivery or Suppression

Adenovirus constructs were developed for gene delivery of control eGFP, ANT1-GFP, and ANT2-GFP (Vector Biolabs, Malvern, PA: eGFP ADV-1060; ANT1-GFP ADV-223278; ANT2-GFP ADV-215545). For each cell type, a multiplicity of infection (MOI) titration was completed and protein expression and localization were confirmed. An MOT of 70 was used for HBEKT cells (24-hour virus exposure) and MOT of 40 for NHBE cells at air liquid interface (apical exposure time of 1 hour and basal surface of 24 hours). Cells were used for experiments at 48 hours after initial virus exposure. siRNA ON-TARGETplus smart pools were used for genetic suppression in HBEKT cells (Dharmacon: ANT1 (SLC25A4, #L-007485-00-0005), ANT2 (SLC25A5, #L-007486-02-0005), non-targeting control pool #D-001810-10-05). Lipofectamine 2000 (Invitrogen) was mixed with 100 nM siRNA per manufacturer's instructions. Cells were treated for 24 hours and then media was replaced with fresh KSF media. Target knockdown was confirmed with western analysis for each protein at 24, 48 and 72 hours.

Cellular Viability, Metabolism, and Intracellular ATP

For viability analysis, HBEKT cells were cultured in 384-well plates, and infected with adenovirus constructs for ANT1-GFP, ANT2-GFP and control GFP vector. At 48 hours post-infection, cells were treated with KSFM media alone or with 10-80% CSE. Cells are then washed twice with annexin binding buffer and stained for 30 minutes with Alexa 405-Annexin V, ethidium homodimer (necrotic cells) (Biotium, Inc) and Draq5 (nuclei). Cells were washed once with binding buffer and imaged in L-15 Leibovitz media on a Molecular Devices High Content imager using 20× and 60× objectives capturing 4 frames per well. Mitochondrial reactive oxygen species production was assessed using MitoSOX Red staining in cells treated with adenovirus and CSE as above. Cells were washed once with PBS and incubated with MitoSOX for 10 minutes at 37° C., 5% $CO_2$. Nuclei were labeled with Draq5 (#4084, Cell Signaling). Cells were washed three times with PBS and placed in L15 media for imaging using the High Content Imager. For cell analysis, fluorescence intensity of mitochondria was assessed with exclusion of the nucleus. Five hundred to seventeen hundred cells were analyzed per well, 8 wells per experiment on 2-3 different days. For cell analysis, MetaXpress software (Molecular Devices) was used to separate cells infected with adenovirus constructs from uninfected cells. The average fluorescence intensities of MitoSOX staining in mitochondria were determined with exclusion of the nucleus. About 300-400 cells were analyzed per well for a total of 700-1500 cells per group. Across all replicates, 2800-4500 cells per group were evaluated.

For metabolic analysis, HBEKT cells were cultured in 96-well Seahorse assay plates (Agilent) and infected with adenovirus constructs for ANT1, ANT2 and control for target overexpression at 48 hours (MOI 40, Vector BioLabs) or siRNA target suppression using siRNA and Lipofectamine as described above for ANT1, ANT2 or non-targeting control siRNA at 72 hours. After viral infection or siRNA transfection, cells were treated for 4 hours with KSFM media alone or 20% CSE. Cells were washed once in KSFM, followed by washes in buffered Seahorse Assay medium (pH 7.4) and subsequent metabolic testing according to the manufacturer's protocol (Agilent Seahorse XF96). Oligomycin (2 µM, ATPase inhibitor), FCCP (0.25 µM mitochondrial uncoupler) and a cocktail of rotenone (0.5 µM, ETC complex I inhibitor) and antimycin A (0.5 µM, ETC complex III inhibitor) were sequentially injected after three basal rates were measured. Sample measurements were normalized to total cellular mass determined by CyQuant Assay according to the manufacturer protocol (Molecular Probes, ThermoFisher). For experiments including ANT specific inhibitors, carboxyatractyloside (CATR, 20-µM, Sigma), Bongkrekic acid (BKA, 4-µM, Sigma) or vehicle control were injected into wells after basal OCR measurements were taken followed by repeat OCR measurements 30 minutes after compound injection. Cells were then assayed according to the Seahorse protocol as described above.

Steady state intracellular ATP concentrations were measured in HBEKT cells after cell were seeded onto 6-well plates and infected with adenoviral ANT1-GFP, ANT2-GFP, and GFP control for 48 hr. The cells were then treated with KSFM media alone or 20% CSE for 4 hr. Cell lysates were collected with a ATP lysis buffer with 300-04 of ecto-ATPase inhibitor ARL 67156 (Sigma), immediately flash-frozen in liquid nitrogen, thawed on ice, and boiled for 5 min. The concentration of each sample was assessed via a luciferin-luciferase bioluminescence ATP Determination Kit (ThermoFisher). Luminescence was detected in a microplate reader (FLUOstar Omega, BMG Labtech) and integrated over 10 s. Concentrations were determined using a standard curve with a linear range between 0.5 and 1000 nM ATP. The ATP concentration in mM/HBEKT cell was calculated by considering the cellular volume of a single HBEKT cell and the amount of ATP in a single as shown in the following equation:

Amount of ATP per cell=(Concentration of ATP per cell)(Volume of cell)

Spherical cell volume was determined after measuring the diameter of trypsinized HBEKT cells on an epifluorescence microscope (Olympus). The amount of ATP for one cell was derived from the amount of protein in one cell found via Bradford assay (BioRad).

Airway Surface Liquid (ASL) Height

The apical surface of cells was washed once with PBS 18 hours prior to the addition of Texas Red. ASL was visualized by adding 10-kD Texas Red-dextran (17.5 µl per 12-well insert, ThermoFisher) to the apical surface of NHBE or HBEKT cultures at air liquid interface, as previously described [3,6,7]. ASL was imaged 4 hours later by acquiring 4×4 tiled z-stacks by live-cell confocal microscopy with a heat and $CO_2$ controlled stage (Zeiss 780 with a 40× water objective). Fluorinert (1000 was added to the top of the insert cultures immediately prior to imaging to prevent evaporation. Z-stacks were analyzed by segmentation and pixel thickness analysis. For experiments with ANT inhibitors, CATR (20 µM, Sigma) and BKA (4 µM, Sigma) in 20 µl PBS (or control PBS alone) were added to the apical surface of ALI cultures (NHBEs or HBEKTs) 18 hours prior to ASL assessment. Texas Red was added 4 hours prior to ASL testing. For apyrase treatment, 10 units of apyrase (Sigma) was added with Texas Red-dextran as described above 4 hours prior to ASL assessment.

Measuring Airway Surface Liquid Thickness

Figure 13A:
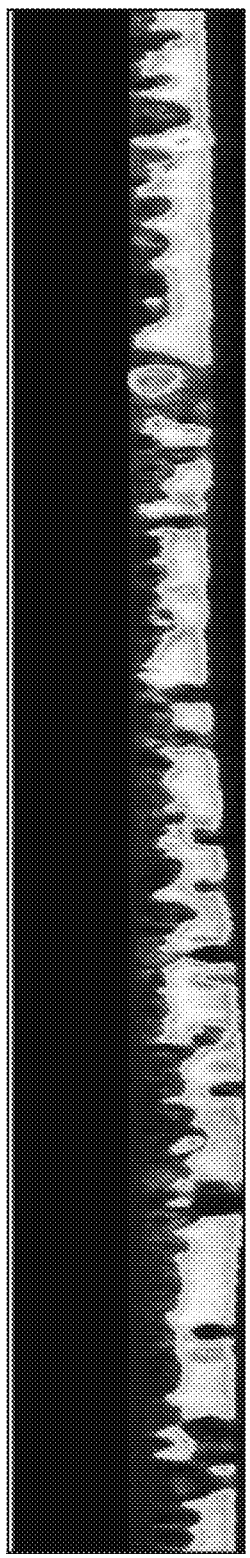
FIG. 13: Method for airway surface liquid (ASL) thickness. a) Sample of an (x, z) cross-section showing the original image and the segmented regions. b) Heat map showing thickness across the sample. c) Histogram showing the pixel thicknesses across the region in panel b.
Figure 13B:
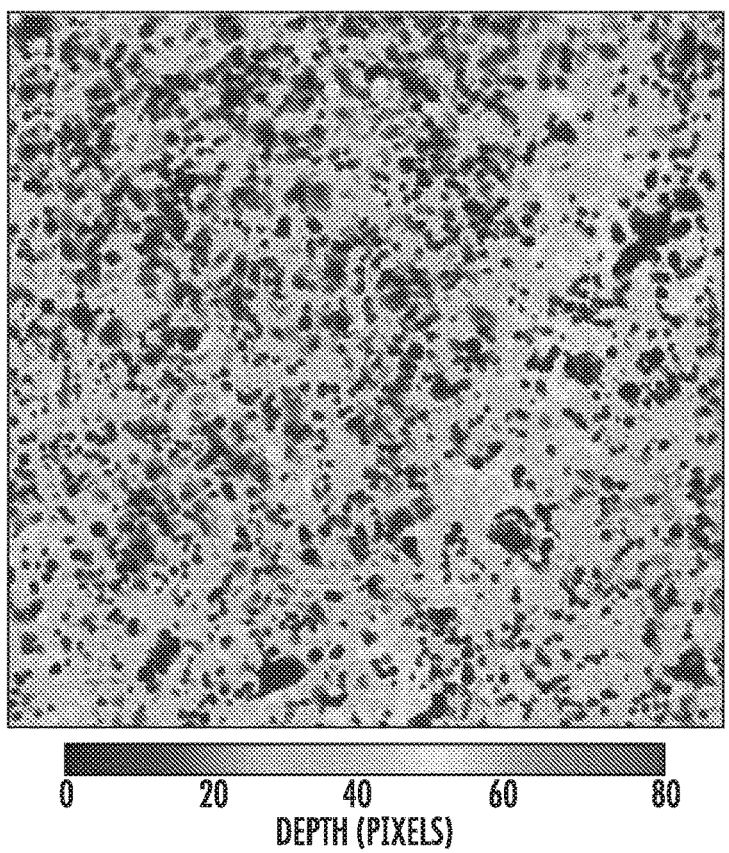
Figure 13C:
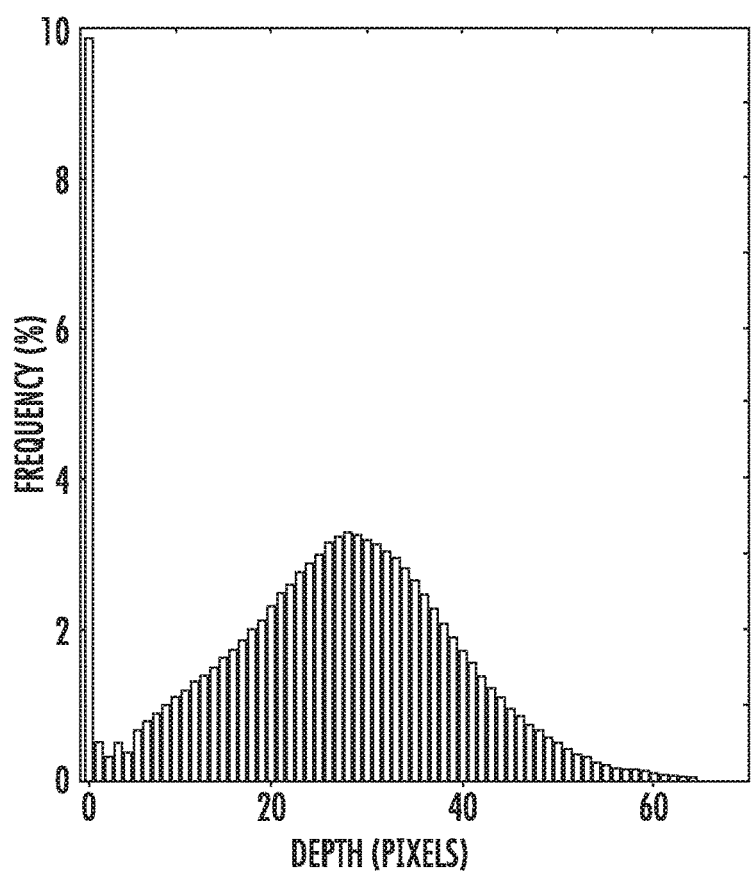

Thickness across the sample was computed using a custom script, written in Matlab (Mathworks, Natick, MA). Briefly, for each value x in the three-dimensional images, Im(x,y, z), the resultant (y, z) slice was segmented using adaptive thresholding (Matlab command: imbinarize), followed by operations to fill holes (imfill), morphological opening (imopen) and filtering of small regions (bwareaopen) (FIG. 13a). The threshold level was adjusted after preprocessing the complete image and the process repeated. For each y in this binary image, the number of segmented pixels was counted, giving a measure of the thickness in the (x, y) location; see FIG. 13. This gave a histogram of depths over the image (FIG. 13c). An average depth was computed for all pixels in which a non-zero depth was detected (to avoid edge effects). The process was repeated by fixing y and working with the (x, z) slice. The differences between the averages were typically less than 1-2%. Thickness in pixels was converted to µm using a slice thickness of 0.46 µm, the step size used to collect the z-stack.

Ciliary Beat Frequency

Ciliary beat frequency (CBF) was assessed at 48 hours post-adenoviral infection. Inserts were imaged in a 12-well Falcon plate with Leibovitz L-15 buffered media (Gibco) and imaged within 2 minutes of placement. Bright field images of beating cilia were captured at 160 frames per second over 4 seconds (3-5 videos per insert, Leica Spinning disc confocal with 40× water objective). For air or cigarette smoke experiments, "pre-treatment" images (n=3 per insert) were captured at random insert locations followed by exposure to air or cigarette smoke by the Vitrocell system (2 cigarettes over 16 minutes). "Post-treatment" images were collected at similar locations on each insert 30 minutes after the treatment. Cells were kept in ALI growth media at 37° C. and 5% $CO_2$ when not being imaged. Cells were "rested" for 4 hours and imaged again (n=3 videos per insert). Beat frequency analysis was completed using a MatLab script assessing pixel intensity fluctuations as described below. CBF data was compared with SAVA analysis [5] with good agreement.

Determining Ciliary Beating Frequency

A custom script, written in Matlab, was used to estimate the beating frequency of cilia. Individual images from a video consisting of N frames were used to create a three-dimensional matrix Imk(x, y), where (x, y) denotes location in the image of each pixel, and k∈1, . . . , n is the frame number. For each (x, y), the corresponding sequence of intensities was first normalized:

$$p_{i,j}(k) = \frac{Im_k(x, y) - \min_k Im_k(x, y)}{\max_k Im_k(x, y) - \min_k Im_k(x, y)}$$

so that 0≤(k)≤1 and filtered by removing the mean value:

$$\tilde{p}_{i,j}(k) = p_{i,j}(k) - \frac{1}{N}\sum_{k=1}^{N} p_{i,j}(k).$$

The Fast-Fourier transform (FFT) of $\tilde{p}_{i,j}(k)$ was obtained using the MATLAB command fft:

$$q_{i,j}(n) = \sum_{k=1}^{n} p_{i,j}(k)e^{-2\pi i n k/N}, n = 0, \ldots, N-1.$$

and the corresponding single-sided power spectrum was computed (where N is even):

$$\tilde{q}_{i,j}(n) = \begin{cases} |q_{i,j}(0)|, & n = 0 \\ 2|q_{i,j}(n)|, & n = 1, \ldots \frac{N}{2}, \end{cases}$$

Figure 14A:
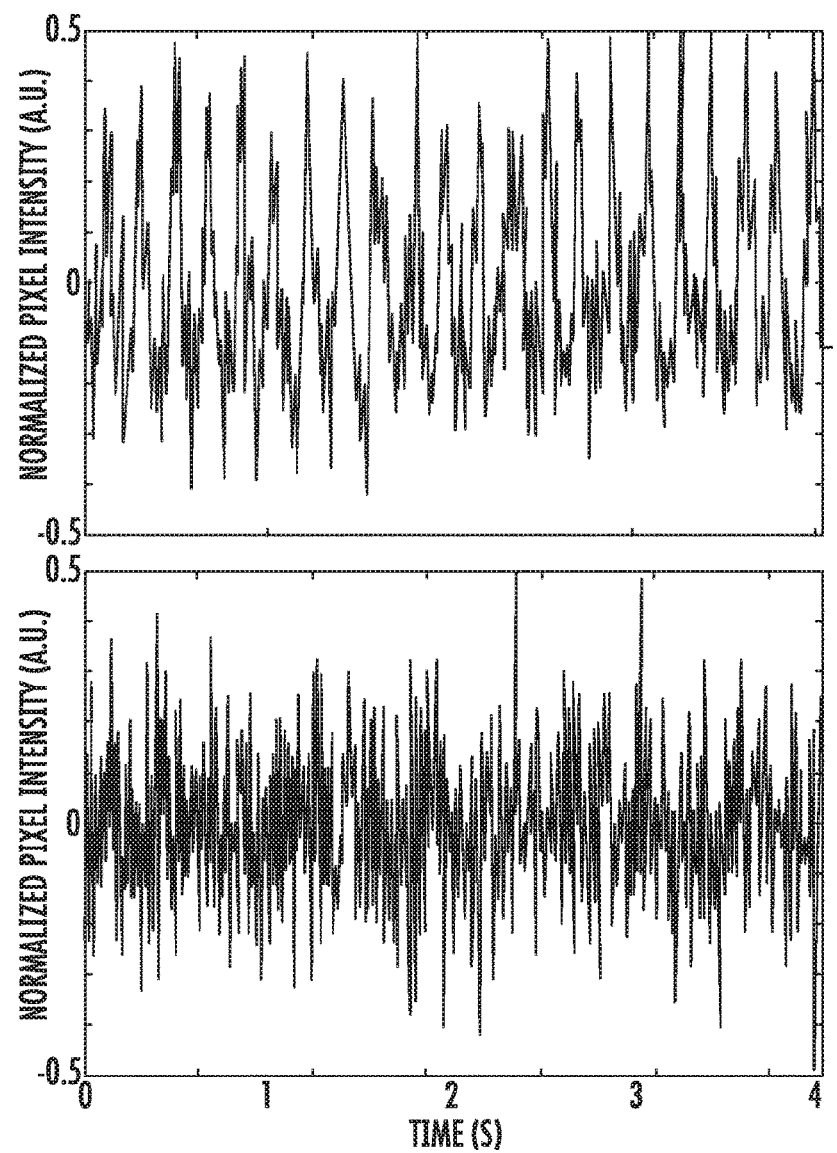
FIG. 14A-14D: Method for computing ciliary beating frequency.
Figure 14C:
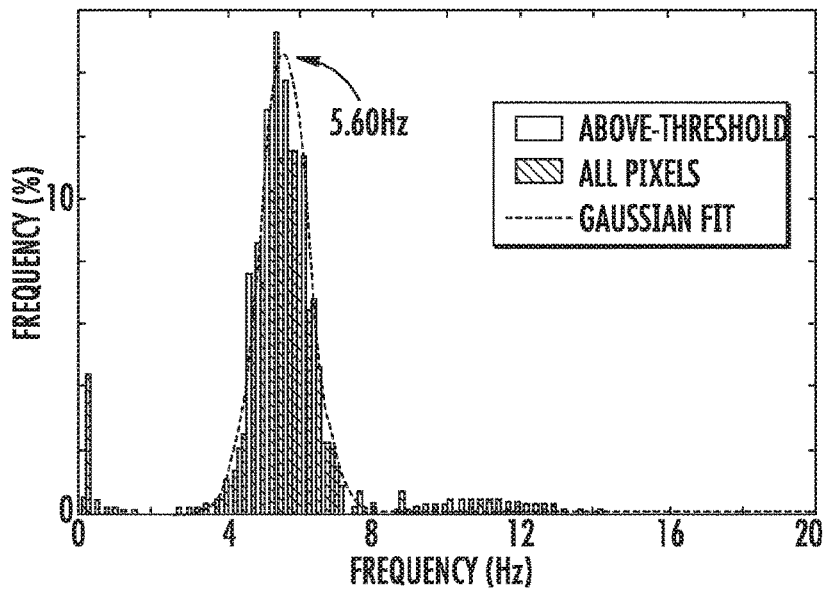
Figure 14B:
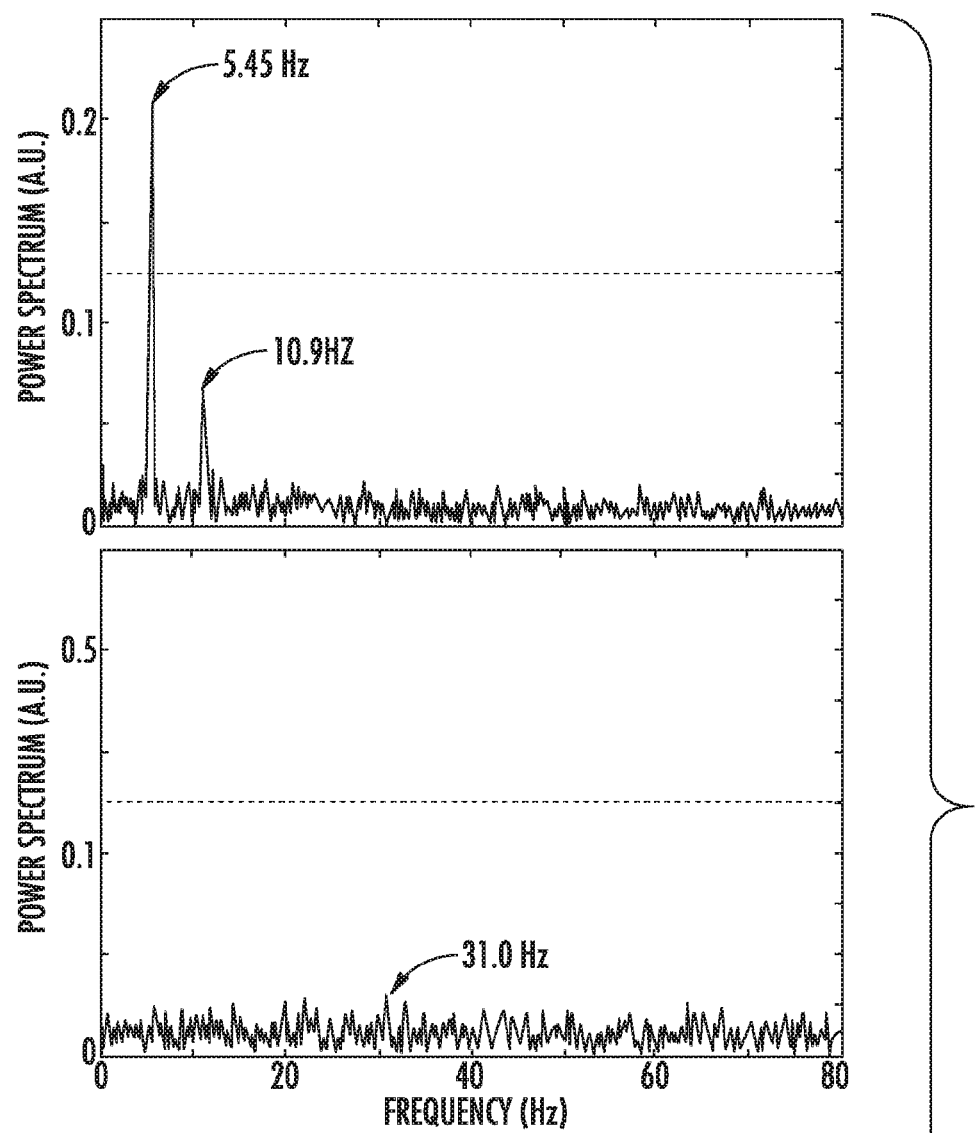

This gives a power spectrum for each pixel (see FIG. 14b, c).

To determine the frequency of beating, we carried out two approaches. In the first, we found the frequency with highest power density for each of the pixels. We then used a threshold (set at 0.125 A.U.) to determine whether there was any detectable power in that pixel or not. The frequency with highest power was determined, and this data aggregated over all pixels meeting this threshold (FIG. 14c). The data between 2 and 20 Hz of the corresponding histogram was then normalized and fit by a single Gaussian, $\alpha \exp^{-((f-\mu)/\sigma)^2}$, where f is the frequency, using the command fit. The value of μ was used as a measure of beating frequency.

Figure 14D:
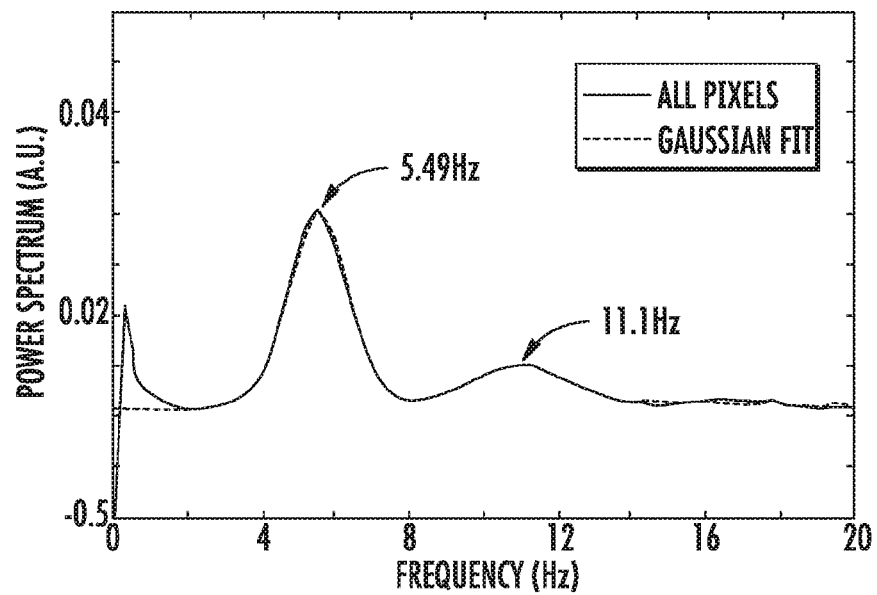

In the second method, we aggregated the power spectra from all pixels (with no thresholding):

$$\bar{q}(n) = \sum_{i,j} \tilde{q}_{i,j}(n)$$

and fit the data between 2 and 20 Hz to a Gaussian mixture model using three modes (FIG. 14d). This resultant μ value with the greatest contribution to the mixture model was used. Both methods provided similar estimates, so the data reported used Method 1 frequencies.

Mouse Smoke Exposure Model and Tissue Processing

All animal experiments were performed in accordance with the Institutional Animal Care and Use Committee (IACUC) of the University of Pittsburgh. C57Bl/6J mice (female mice at 10 weeks of age, n=5 per group) were subjected to the smoke of 4 unfiltered cigarettes per day (lot #1R5F; University of Kentucky, Lexington, KY), 5 days a week for a duration of 6 months, using a smoking apparatus that delivers targeted cigarette smoke to single mice isolated in individual chambers. The controls in each group were exposed to room-air alone. These mice were caged separately and housed in the same facility as their smoke-exposed counterparts. At the completion of each experiment, mice were killed by $CO_2$ inhalation, the chest was opened, and the trachea was cannulated. Lungs were inflated with 10% buffered formalin at a constant pressure of 25 cm $H_2O$ for 15 minutes. The lungs were then ligated, excised, and fixed in formalin for 24 hours before embedding in paraffin. Serial midsagittal sections were obtained for histological analysis. in a subset of animals, lungs did not undergo fixation and instead were excised and placed directly in liquid nitrogen for RNA isolation. Whole lung RNA was isolated using Trizol per the manufacturer's protocol.

Human Lung Tissue mRNA Expression

Human lung tissues were obtained from explanted lungs after lung transplantation or donor lungs not suitable for organ transplantation (The Airway Cell and Tissue Core, supported by P30 DK072506, NIDDK and the CFF RDP to the University of Pittsburgh). The donor lungs were obtained from the Center for Organ Recovery and Education (CORE) at the University of Pittsburgh. All COPD tissues were obtained from explanted lungs of subjects with advanced COPD and undergone lung transplantation under a protocol approved by the University of Pittsburgh Institutional Review Board. Lung tissues were stored at −80° C. until future usage. Lung tissue was homogenized in Trizol and total RNA was isolated according to the manufacturer's instructions (Thermo Fisher, Grand Island, NY). RNA was quantified and transcribed with reverse transcriptase (Applied Biosystems, Grand Island, NY). Real time PCR was performed using total cDNA and primer pairs flanking introns specifically targeted the genes of interest (slc25a4, forward 5'-TGG ATG ATT GCC CAG AGT GT (SEQ ID NO: 3) and reverse 5'-GGC TCC TTC GTC TTT TGC AA-3' (SEQ ID NO: 4); slc25a5, forward 5'-GGC TTT AAC GTG TCT GTG CA-3' (SEQ ID NO: 5) and reverse 5'-ATA GGA AGT CAA CCC GGC AA-3' (SEQ ID NO: 6); ACTB (forward 5'-ATC CGC CCG TCC-3' (SEQ ID NO: 7) and reverse 5'-CGA TGG AGG GGA AGA CGG-3' (SEQ ID NO: 8)) and Sybr green master mix for real time PCR (Applied Biosystems, Grand Island, NY). Each sample was measured in quadruplicate. A single technical outlier was removed from samples with technical SD greater than 1, individual samples were excluded if removal of an outlier failed to reduce technical SD to less than 1 in either the gene of interest or the housekeeping gene. Relative fold change was calculated by normalizing to Beta-actin and comparing between lung tissue from individuals with a history of COPD and those without a history of COPD using the ΔΔCT method. Error is calculated as positive or negative error=2^(Fold change+/−sqrt (SEM of ACTB^2+SEM of gene^2)).

Mouse Gene Expression and Human Protein Expression

Total RNA was extracted from mouse lung tissue using Trizol with analysis of 25 ng of RNA reverse transcribed and complementary DNA was amplified by real time-PCR using a One-step VERSO SYBR green PCR kit (Thermo Fisher Scientific) on a BioRad CFX96 Real Time PCR machine. The PCR protocol included cDNA synthesis 50° C. for 15 minutes followed by repeat cycles of inactivation at 95° C. for 15 minutes, denaturing of DNA at 95° C. for 15 seconds, annealing at 60° C. for 30 seconds, extension at 72° C. for 30 seconds (repeat for a total of 40 cycles). PCR primer efficiency was determined, amplicon melting curves (60 to 95° C. and single product of correct size by gel analysis were determined to verify production of single amplicons. No template and no enzyme controls were compared. Target primers were used at 200 nM and include: Sigma KiQ primer sets for mouse slc25a4/ANT1 (#M_Slc25a4_1) and mouse slc25a5/ANT2 (#M_Slc25a5_1); Other primers include mouse GAPDH, human slc25a4/ANT1 (forward TGGATGATTGCCCAGAGTGT (SEQ ID NO: 3); reverse GGCTCCTTCGTCTTTTGCAA (SEQ ID NO: 4)). The real time PCR data were analyzed by the ΔΔCT method with normalization to GAPDH and comparing smoke exposed mouse lung tissue to air-exposed controls.

Immunoblot analysis was completed on cell culture protein lysates, yeast *S. cerevisiae* protein lysates, or mouse lung tissue homogenates. Mammalian cell culture lysates were attained using RIPA buffer with protease inhibitor cocktails I, II and III (Sigma), RNase and aprotinin 150 nM. Yeast protein lysates were obtained from yeast expressing human ANT1-4 (Δaac [EV], Δaac [ANT1], Δaac [ANT2], Δaac [ANT2], Δaac [ANT4], $OD_{600}$=3 per group) via alkaline lysis with NaOH/β-mercaptoethanol and trichloroacetic acid. Protein concentration was determined by Bradford Assay (Pierce). Proteins were resolved by 10-15% SDS-polyacrylamide gel electrophoresis and transferred to a nitrocellulose membrane. Proteins of interest were immunoblotted for with primary antibodies (incubated overnight at 4° C.) followed by detection with Li-Cor secondary fluorophore conjugated antibodies using a Li-Cor Odyssey CLx. GAPDH and Ponceau S membrane staining were used as protein loading controls. Antibodies to the following proteins were used (dilutions in parentheses): human ANT1 [11] (1:500, ab1F3H11, mouse), ANT2 [12] (1:500, ab5H7, mouse), alpha tubulin (1:1000, Abcam #6161, rat monoclonal), TOM20 (1:1000, Abcam #ab186734, rabbit monoclonal), GAPDH (1:1000, Life Technologies, A6455, rabbit). Antibodies 1F3H11 for ANT1 (paralog specific) and 5H7 for ANT2 (reacts with ANT2 and ANT3) only work for western analysis.

Human Microarray Data

Microarray data was analyzed from the Lung Genome Research Consortium (LGRC, University of Pittsburgh) and using the publicly available Geo Omnibus Data set, GDS2486 previously published. The LGRC data set is a genome-wide association study of human whole lung tissue mRNA from control individuals (n=137) and those with COPD (n=219). Data were analyzed a priori for gene expression of slc25a4/ANT1 and slc25a5/ANT2 with normalization to GPI (glucose-6-phosphate isomerase). Data do not represent multivariate comparisons and statistical analysis was completed using a Student's t-test with p<0.05 considered to be statistically significant. The Geo Omnibus Data set GDS2486, previously published and publicly available, includes Affimetrix analysis (Affimetrix Human Genome U133 Plus 2.0 Array) of human small airway epithelial cell brushings from non-smokers (n=12) versus smokers (n=10). Data were analyzed a priori for gene expression of slc25a4/ANT1 and slc25a5/ANT2 with normalization to GPI (glucose-6-phosphate isomerase). Data do not represent multivariate comparisons and statistical analysis was completed using a Student's t-test with p<0.05 considered to be statistically significant.

Immunocytochemistry and Immunohistochemistry

Mouse lungs were inflation fixed with 10% buffered formalin for 24 hours and embedded in paraffin for sectioning. Fresh frozen and formal fixed and embedded human lungs were also stained from case controls and COPD patients. Sections were cut at 5-7 µm and were adhered to slides for 60 minutes at 60° C. followed by deparaffinizing with xylene and rehydration in an ethanol series (for paraffin tissues). The sections were treated with sodium citrate buffer at 95° C. for antigen retrieval. Human and mouse lung sections were stained for colocalization with primary and secondary antibodies: ANT1 (Abcam #ab102032 rabbit polyclonal), ANT1 (Abcam, #ab110322, mouse monoclonal), ANT2 (Abcam, #ab118076, mouse monoclonal), alpha tubulin (Abcam #6161, rat monoclonal), TOM20 (Abcam #ab186734, rabbit monoclonal), NPHP4 (Atlas Antibodies, HPA065526), goat anti-mouse or rabbit Alexa 488, 555 and 647 (Molecular Probes). Antibody ab102032 (rabbit anti-human ANT1) is paralog specific, while ab110322 (mouse anti-human ANT1) was less specific (FIG. 9c). Antibodies used for each experiment are designated in the figures. Images were captured on a Zeiss 780 confocal microscopy with an iPlan apochromat 63×/1.4 NA oil objective or on a Nikon SIM microscope using a 100× objective with SIM reconstruction after image capture. Control sections were stained with non-immune mouse IgG1.

For immunocytochemistry on cells in culture on glass or on inserts at air liquid interface, cells were fixed in fresh 4% paraformaldehyde for 10 minutes at 4° C. Cells were washed three times in PBS, permeabilized with ice cold 0.3% Triton X-100 with 1% BSA in PBS for 10 minutes followed by three washes in PBS. To prevent non-specific staining, cells were blocked with 2% BSA in PBS for 45 minutes at room temperature. Cells were washed five times with 0.5% BSA in PBS. Cells were incubated with primary antibody overnight at 4° C. followed by five washes with 0.5% BSA in PBS. Cells were incubated with secondary antibody dilutions (made in 0.5% BSA in PBS) for 60 minutes at room temperature in the dark. Cells are washed 5 times with 0.5% BSA in PBS followed by five PBS washes. Nuclei were stained with Hoechst at 10 µg/mL for 10 minutes followed by PBS washes. For insert staining, insert membranes are cut out and placed apical surface upright onto glass slides. Sections were mounted in Prolong Diamond Antifade Mounting Agent (Molecular Probes, ThermoFisher), cured for at least 24 hours at room temperature and sealed with clear nail polish. Samples are stored at 4° C. protected from light for long-term storage.

Molecular Phylogenetic Tree Analysis

The evolutionary history was inferred by using the Maximum Likelihood method based on the JTT matrix-based model. The bootstrap consensus tree inferred from 500 replicates is taken to represent the evolutionary history of the taxa analyzed. Branches corresponding to partitions reproduced in less than 50% bootstrap replicates are collapsed. The percentage of replicate trees in which the associated taxa clustered together in the bootstrap test (500 replicates) are shown in red next to the branches. Initial tree(s) for the heuristic search were obtained automatically by applying Neighbor-Join and BioNJ algorithms to a matrix of pairwise distances estimated using a JTT model, and then selecting the topology with superior log likelihood value. The tree is drawn to scale, with branch lengths measured in the number of substitutions per site. The analysis involved 22 amino acid sequences. All positions containing gaps and missing data were eliminated. There were a total of 289 positions in the final dataset. Evolutionary analyses were conducted in MEGA7.

Immuno-Gold Electron Microscopy
Purification of GFP-Nanobody:

The plasmid expressing hexa-his (SEQ ID NO: 9) tagged GFP nanobody was developed by Brett Collins lab and obtained from Addgene (plasmid #49172) (See below for reference). *E. coli* BL-21 DE3 cells were transformed with the plasmid. The *E. coli* cells were grown in LB-media and the protein expression was induced with 0.4 uM IPTG for 4 h at 37° C. The bacterial pellet was collected by centrifugation at 7000 rpm and the pellet was resuspended in lysis buffer (50 mM NaH2PO4, pH 8.0, 300 mM NaCl, 10 mM imidazole and protease inhibitor cocktail). Cell lysis was performed by sonication on ice (15 s pulse followed by 30 s rest, total 30 pulses). The cellular debris was removed by centrifugation at 12000 rpm for 30 min at 4° C. 2 ml Ni-NTA slurry (QIAGEN) was first briefly centrifuged and 4 ml of lysis buffer was added and mixed gently. The mixture was centrifuged again and the process was repeated for two times to equilibrate the resin. The clear lysate was added to the Ni-NTA resin and allowed to bind for 1 hr at 4° C. The lysate-Ni-NTA mixture was loaded into a column and washed with 10 bed volume of wash buffer (50 mM NaH2PO4, pH 8.0, 300 mM NaCl, 20 mM imidazole and protease inhibitor cocktail). The bound protein was eluted with elution buffer (50 mM NaH2PO4, pH 8.0, 300 mM NaCl, 150 mM imidazole and protease inhibitor cocktail). The quality of the purified protein was checked by SDS-PAGE. The protein was dialyzed to 0.02 M sodium phosphate buffer containing 150 mM NaCl and concentrated with Amicon Ultra centrifugal filter (3K cut-off).

Preparation of Nanogold crosslinked GFP-Nanobody: 30 nmol Mono-Sulfo-NHS-Nanogold 1.4 nm (Nanoprobes, cat #2025) was mixed with 14 nmol of pure GFP-Nanobody in total 2 ml of solution and allowed to react by mixing in an end-to-end rotator for 1 hr at room temperature. The reaction was continued overnight in cold room. The reaction mixture was concentrated 10-fold using a Amicon Ultra centrifugal filter (10K cut-off).

Labeling cells with GFP-nanobody and chemical fixation: The formaldehyde fixed primary ciliated human NBHE cells were permeabilized with 0.02% Triton-X-100 for 20 min at RT and washed with PBS for 3 times, 5 min each. Nanogold crosslinked GFP-Nanobody was diluted in PBS (1:500), added to the cells and incubated for 1 hr at RT. The cells were then washed 3 times with PBS. The cells were fixed with 2% para-formaldehyde and 1% glutaraldehyde for 1 hr at RT, followed by three washes with PBS. The cells were then incubated in 1% osmium tetroxide in PBS for 1 hr at RT followed by three washes with PBS. The cells were then dehydrated in ethanol in following steps, 30%, 50%, 70%, 90% ethanol in PBS, each step lasting at least 10 min. The final dehydration was done in 100% ethanol for 30 minutes.

Infiltration, embedding and sectioning: The cells were infiltrated and embedded in epoxy resin or epon. The resin composition is as follows, Eponate 12 (Glycerol polyglycidyl ether): 45.3%, DDSA (dodecenyl succinic anhydride): 24.1%, NMA (Methyl-5-Norbornene-2, 3-Dicarboxylic Anhydride): 29.1% and DMP 30 ([2, 4, 6-Tri (dimethylaminomethyl) phenol]:1.5%, all w/w. (All the reagents were from Ted Pella Inc). The 100% resin was diluted to 30%, 70% and 90% in ethanol. The cells were infiltrated with 30% and 70% for 2 h and with 90% overnight. Cells were incubated with 100% resin with two changes with fresh 100% resin, each with a duration of 1 hr followed by polymerization at 50° C. for 36 hr. Epon embedded samples were sectioned at 40 nm using Ultramicrotome (Leica Microsystem). The sections were collected on Pioloform-coated single slot copper grid and stained with 2.5% uranyl acetate followed by methanol wash. The electron microscopic images were obtained using Phillips/FEI BioTwin CM120 transmission electron microscope with 63,000× magnification. Approximately 200 individual cilium images were collected per sample and number of gold particle per cilium was counted. The data was analyzed using Image J.

REFERENCES

1. Robinson, D. N., and Spudich, J. A. (2000). Dynacortin, a genetic link between equatorial contractility and global shape control discovered by library complementation of a *Dictyostelium discoideum* cytokinesis mutant. J Cell Biol 150, 823-838.
2. Zhou, Q., Kee, Y. S., Poirier, C. C., Jelinek, C., Osborne, J Divi, S., Surcel, A., Will, M. E., Eggert, U.S., Muller-Taubenberger, A., et al. (2010). 14-3-3 coordinates microtubules, Rac, and myosin II to control cell mechanics and cytokinesis. Curr Biol 20, 1881-1889.
3. Liu, Y., and Chen, X. J. (2013). Adenine nucleotide translocase, mitochondrial stress, and degenerative cell death. Oxid Med Cell Longev 2013, 146860.
4. Raman, M., Sergeev, M., Garnaas, M., Lydeard, J. R., Huttlin, E. L., Goessling, W., Shah, J. V., and Harper, J. W. (2015). Systematic proteomics of the VCP-UBXD adaptor network identifies a role for UBXN10 in regulating ciliogenesis. Nat Cell Biol 17, 1356-1369.
5. Kretova, M., Sabova, L., Hodny, Z., Bartek, J., Kollarovic, G., Nelson, B. D., Hubackova, S., and Luciakova, K. (2014). TGF-beta/NF1/Smad4-mediated suppression of ANT2 contributes to oxidative stress in cellular senescence. Cell Signal 26, 2903-2911.
6. Hoffmann, R. F., Zarrintan, S., Brandenburg, S. M., Kol, A., de Bruin, H. G., Jafari, S., Dijk, F., Kalicharan, D., Kelders, M., Gosker, H. R., et al. (2013). Prolonged cigarette smoke exposure alters mitochondrial structure and function in airway epithelial cells. Respir Res 14, 97.
7. Wiegman, C. H., Michaeloudes, C., Haji, G., Narang, P., Clarke, C. J., Russell, K. E., Bao, W., Pavlidis, S., Barnes, P. J., Kanerva, J., et al. (2015). Oxidative stress-induced mitochondrial dysfunction drives inflammation and airway smooth muscle remodeling in patients with chronic obstructive pulmonary disease. J Allergy Clin Immunol 136, 769-780.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of treating lung disease in a subject comprising the steps of: administering to a subject an agent that modulates the expression, the amount, or activity, of adenine nucleotide translocase (ANT) in the lungs of a subject; and enhancing the airway surface (ASL) thickness in a lung of a subject compared to a lung in a reference subject who has not been given the agent, wherein the agent is ANT1 (antibody 1F3H11), ANT2 (antibody 5H7), membrane permeable bongkrekin acid (BKA) or carboxyactractylocide (CART),
wherein the lung disease is selected from the group comprising cystic fibrosis, chronic obstructive pulmonary disease (COPD), or a combination thereof.

2. The method of claim 1 wherein the lung disease is COPD.

3. The method of claim 1 wherein the airway surface liquid (ASL) thickness of the lung of the subject is in the range of 1.2 to 5.0 times greater than that of the reference subject.

4. The method of claim 1 wherein the airway surface liquid (ASL) thickness of the lung of the subject is in the range of 1.5 to 3.5 times greater than that of the reference subject.

5. The method of claim 1 wherein the agent is a vector comprising a adenine nucleotide translocase (ANT) nucleic acid sequence capable of expressing and adenine nucleotide translocase (ANT) protein.

6. The method of claim 5 wherein the vector is selected from the group comprising viral vectors, nonviral vectors, or a combination thereof.

7. The method of claim 6 wherein the viral vectors are selected from the group comprising retroviral, adenoviral, adeno-association vectors (AAV), herpes simplex, pox virus, hybrid adenovirus vector, Ebstein-Bar virus (EBV), lentivirus, herpes simplex virous (HSV), or a combination thereof.

8. The method of claim 6 wherein the nonviral vectors are selected from the group comprising catonic lipids, cationic polymers, lipid-polymers, naked DNA, DNA Bombardant, electroporation, hydrodynamic, ultrasound, cationic lipids, cationic, polymers, lipid-polymer, or a combination thereof.

9. The method of claim 1 wherein the agent enhances ciliary beat frequency of a subject is enhanced in the subject compared to a reference subject.

10. A method of treating lung disease in a subject comprising:
    identifying the subject is identified as suffering from cystic fibrosis, chronic obstructive pulmonary disease (COPD), or a combination thereof
    administering to the identified a subject in need of treatment for a lung disease an effective amount of one or more agents selected from NT1 (antibody 1F3H11), ANT2 (antibody 5H7), membrane permeable bongkrekin acid (BKA) or carboxyactractylocide (CART).

11. The method of claim 10 wherein the subject is identified as suffering from cystic fibrosis and the one or more of the agents is administered to the identified subject.

* * * * *

SEQUENCE LISTING

```
<160> NUMBER OF SEQ ID NOS: 9

<210> SEQ ID NO 1
<211> LENGTH: 49
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 1
aaaaaagtcg acatgtctaa ccaaaagaaa aacgacgtat cttcatttg            49

<210> SEQ ID NO 2
<211> LENGTH: 35
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
aaaaaagcgg ccgcttattc agaaccaaca ccacc                           35

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 3
tggatgattg cccagagtgt                                            20

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4
ggctccttcg tcttttgcaa                                            20

<210> SEQ ID NO 5
<211> LENGTH: 20
<212> TYPE: DNA
```

-continued

```
<213> ORGANISM: Artificial Sequence
<220> FEATURE:
<223> OTHER INFORMATION: Description of Artificial Sequence: Synthetic
      primer

<400> SEQUENCE: 5
ggctttaacg tgtctgtgca                                                   20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 6
ataggaagtc aacccggcaa                                                   20

<210> SEQ ID NO 7
<211> LENGTH: 12
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 7
atccgcccgt cc                                                           12

<210> SEQ ID NO 8
<211> LENGTH: 18
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
cgatggaggg gaagacgg                                                     18

<210> SEQ ID NO 9
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 9

His His His His His His
1               5
```